United States Patent [19] | [11] Patent Number: 4,963,920

Fukushima | [45] Date of Patent: Oct. 16, 1990

[54] COPYING APPARATUS HAVING FUNCTION OF IMPRINTING DATA

[75] Inventor: Shigenobu Fukushima, Osaka, Japan

[73] Assignee: Minolta Camera Kabushiki Kaisha, Osaka, Japan

[21] Appl. No.: 388,691

[22] Filed: Aug. 2, 1989

[30] Foreign Application Priority Data

| | | | |
|---|---|---|---|
| Aug. 2, 1988 | [JP] | Japan | 63-193233 |
| Aug. 2, 1988 | [JP] | Japan | 63-193234 |
| Aug. 2, 1988 | [JP] | Japan | 63-193235 |
| Aug. 2, 1988 | [JP] | Japan | 63-193236 |
| Aug. 23, 1988 | [JP] | Japan | 63-208691 |
| Aug. 23, 1988 | [JP] | Japan | 63-208692 |
| Sep. 19, 1988 | [JP] | Japan | 63-234290 |
| Sep. 21, 1988 | [JP] | Japan | 63-237085 |
| Sep. 21, 1988 | [JP] | Japan | 63-237086 |
| Sep. 21, 1988 | [JP] | Japan | 63-237087 |

[51] Int. Cl.[5] .......... G03B 27/52

[52] U.S. Cl. .......... 355/40; 355/244

[58] Field of Search .......... 355/24, 40, 244, 309, 355/313, 314, 319, 202, 206

[56] References Cited

U.S. PATENT DOCUMENTS

| | | | |
|---|---|---|---|
| 4,169,674 | 10/1979 | Russel | 355/309 |
| 4,494,862 | 1/1985 | Tanaka | 355/244 X |
| 4,551,008 | 11/1985 | Banton | 355/244 X |
| 4,607,948 | 8/1986 | Naito | 355/24 |
| 4,774,546 | 9/1988 | Corona et al. | 355/244 |
| 4,845,525 | 7/1989 | Ito | 355/244 X |

FOREIGN PATENT DOCUMENTS

| | | |
|---|---|---|
| 55-98762 | 7/1980 | Japan . |
| 59-52811 | 12/1984 | Japan . |
| 60-130782 | 7/1985 | Japan . |

*Primary Examiner*—Richard A. Wintercorn

*Attorney, Agent, or Firm*—Burns, Doane, Swecker & Mathis

[57] ABSTRACT

A copying apparatus for imprinting page data and the image of an original document onto a copy sheet. The copying apparatus includes a counting device for counting the number of original documents, a selecting device for selecting a mode for imprinting the page data onto the copy sheet using page data imprinting controlling device, and a device for cancelling a selected page data imprinting mode or indicating unoperative condition when the apparatus is under a state where the page data imprinting can not be completed.

26 Claims, 61 Drawing Sheets

Fig. 1-I
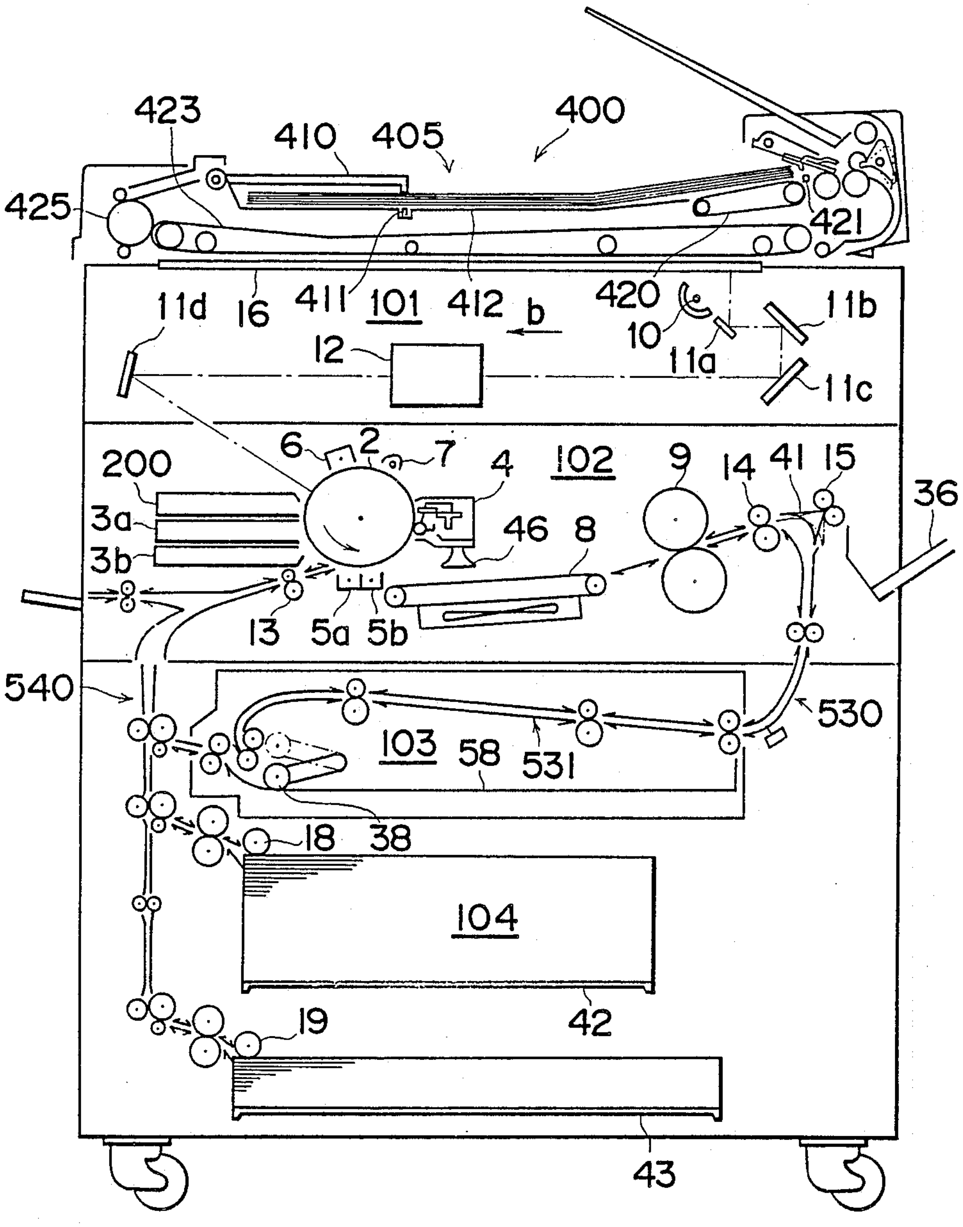

Fig. 1-II
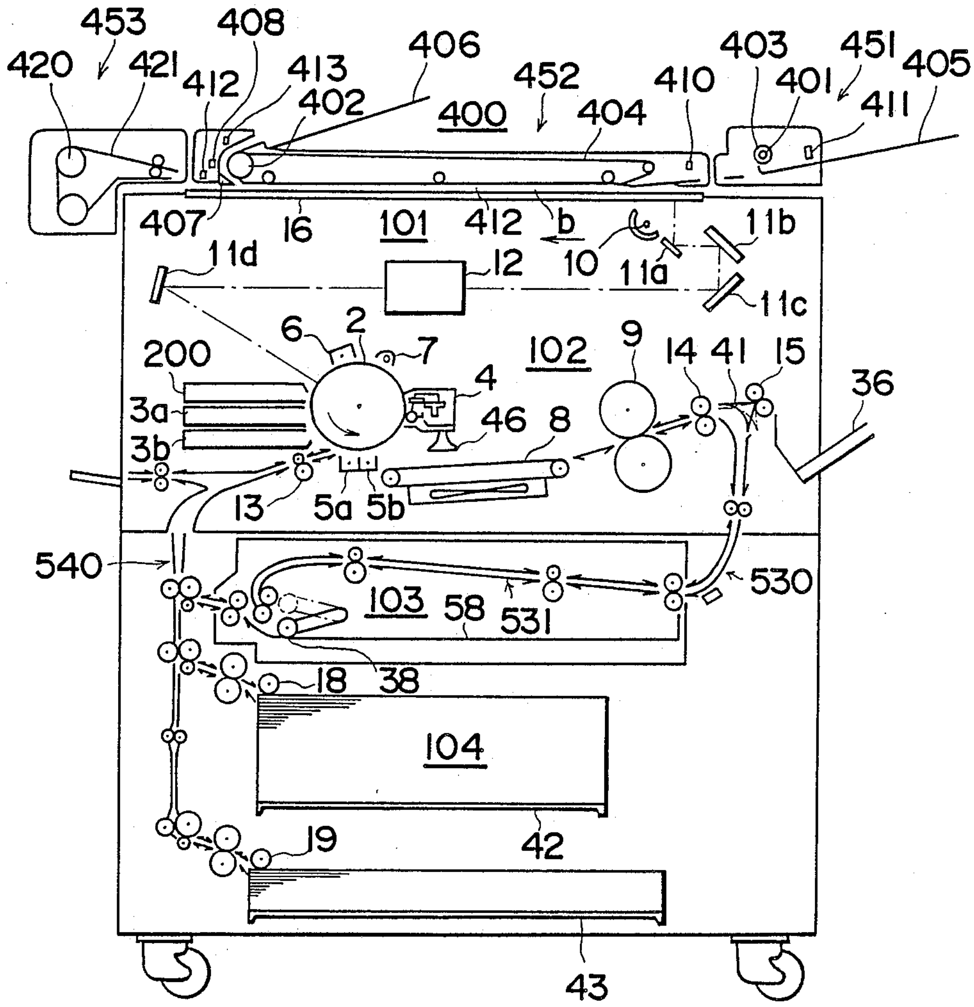

Fig. 7-I
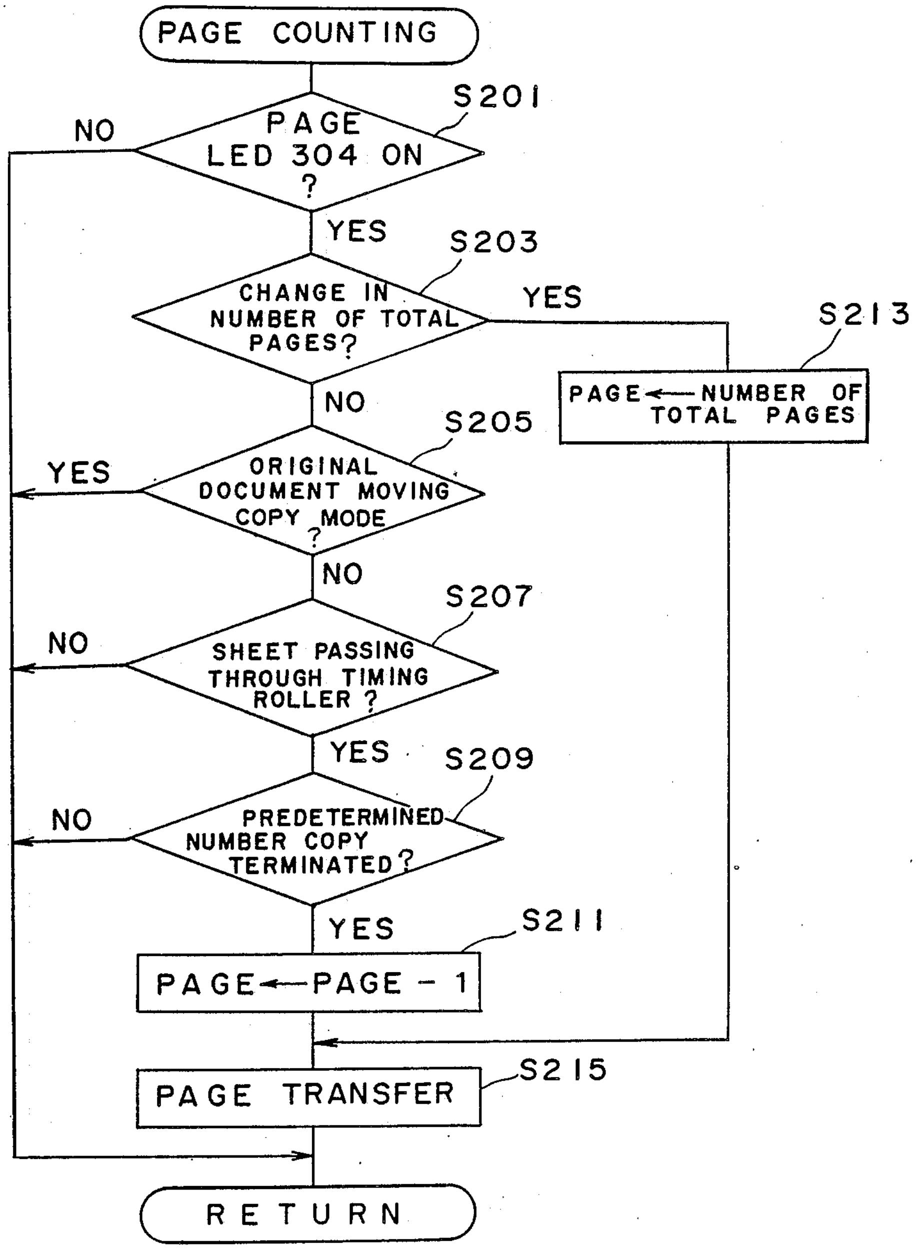

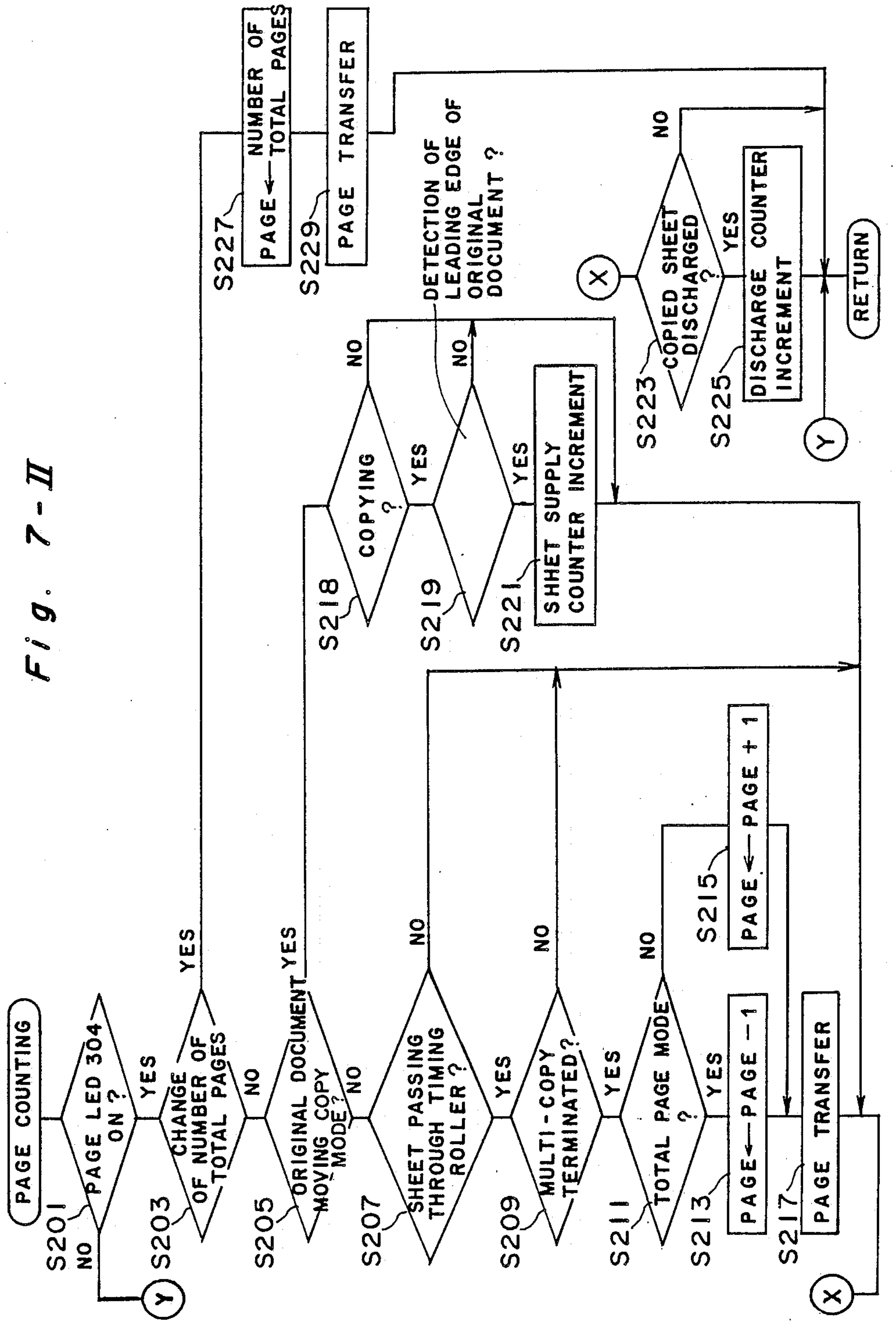
Fig. 7-II

Fig. 7-III
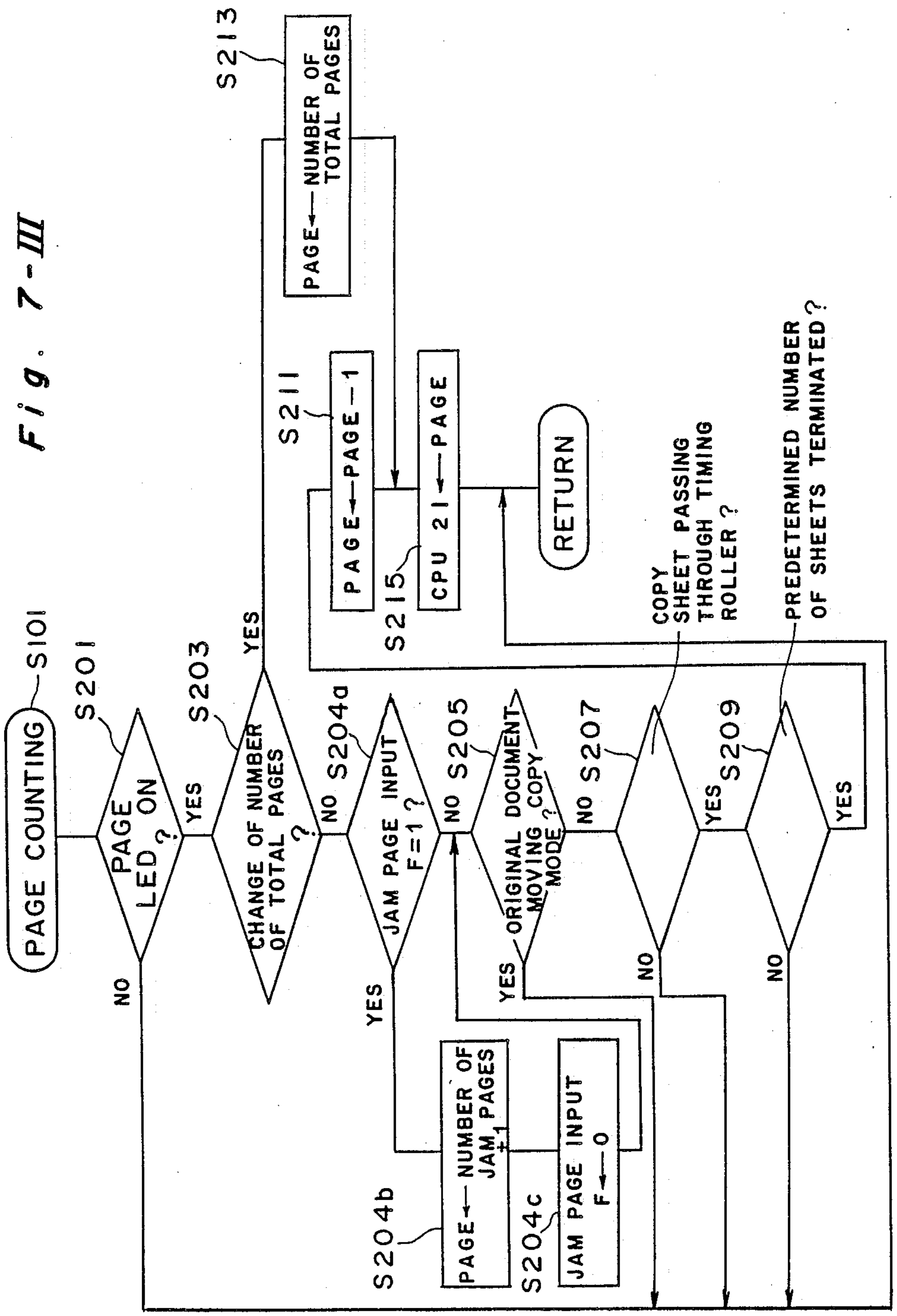

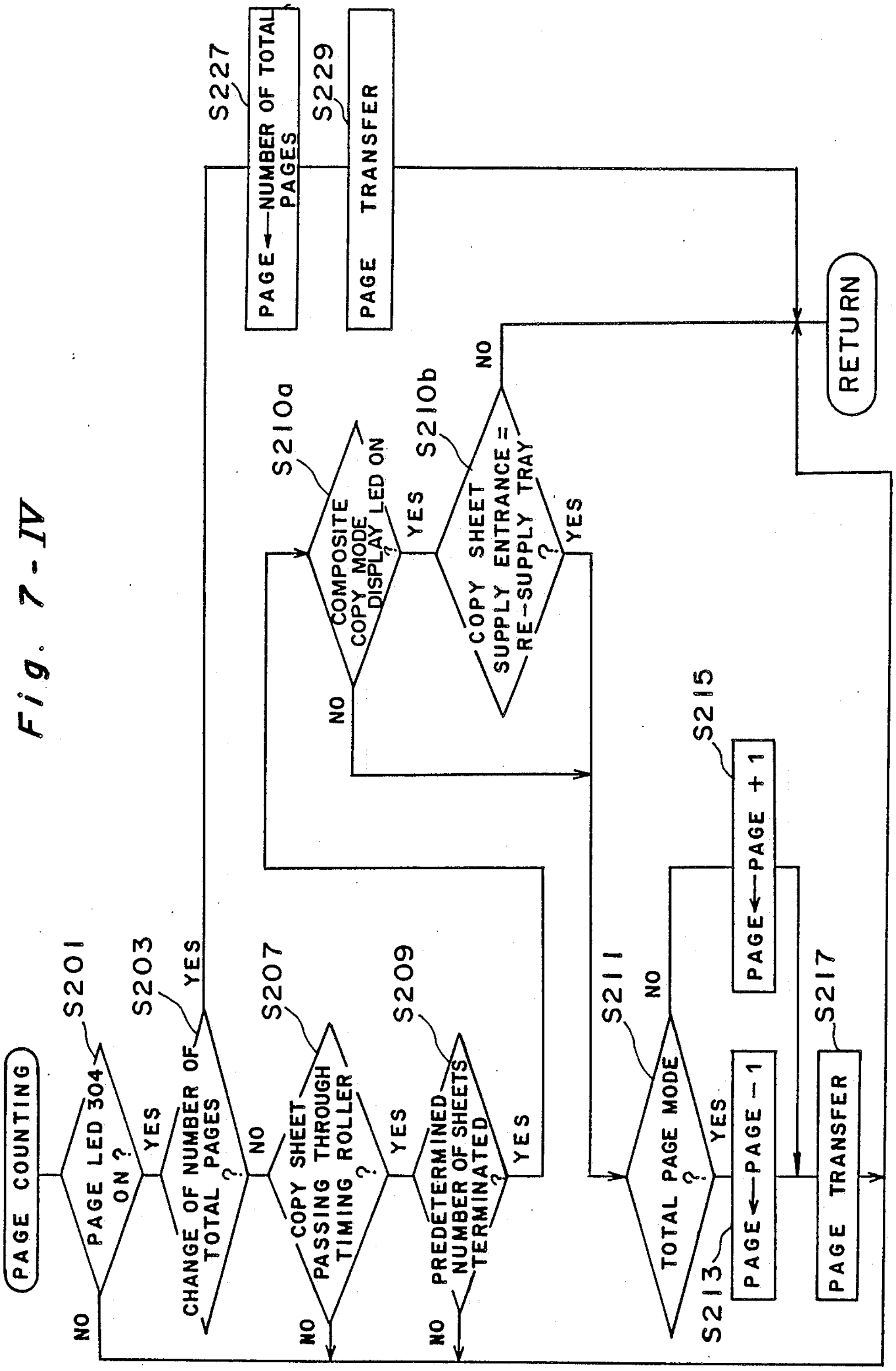
Fig. 7-IV

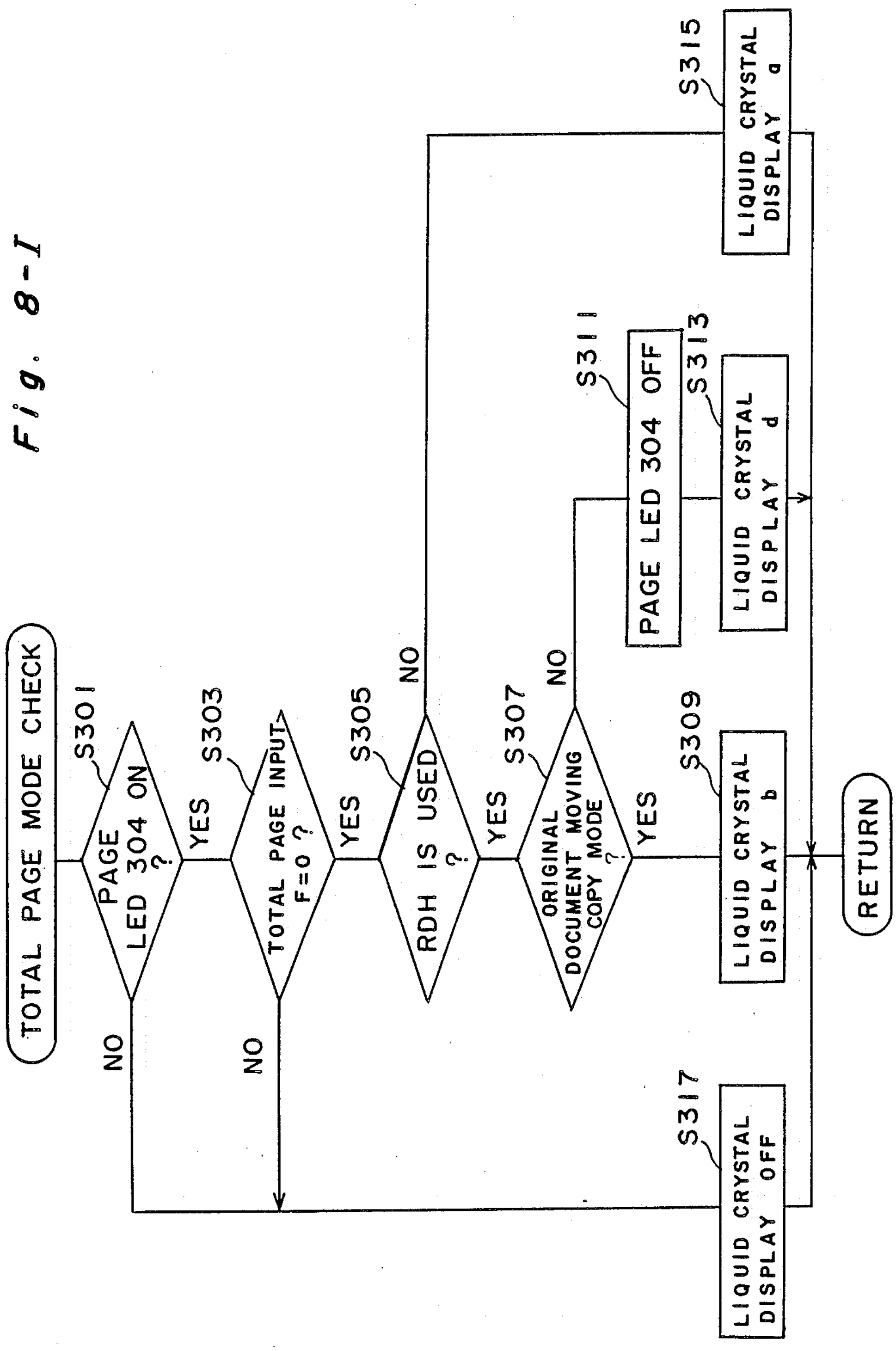
Fig. 8-I

Fig. 8-II
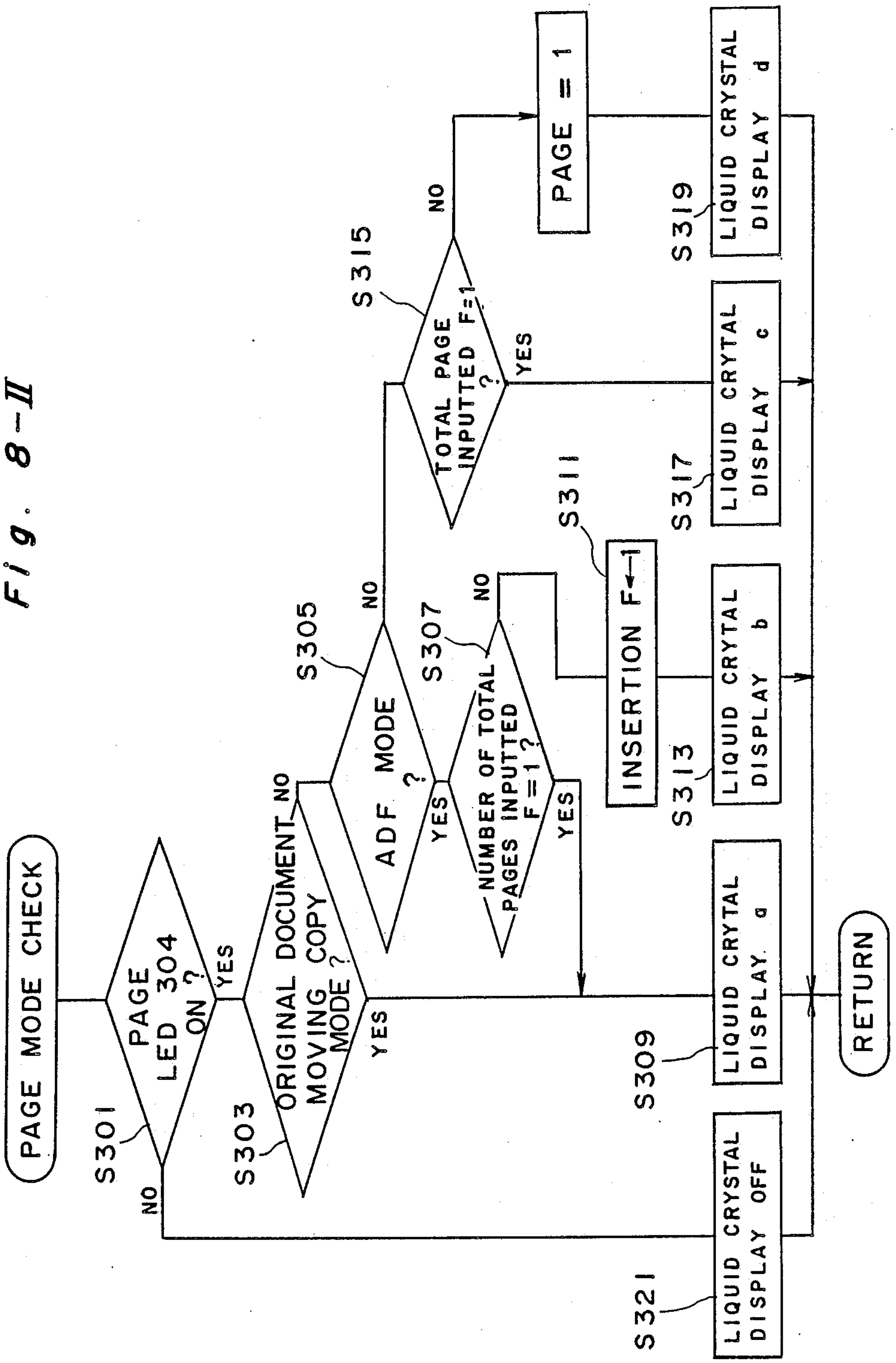

Fig. 9-I
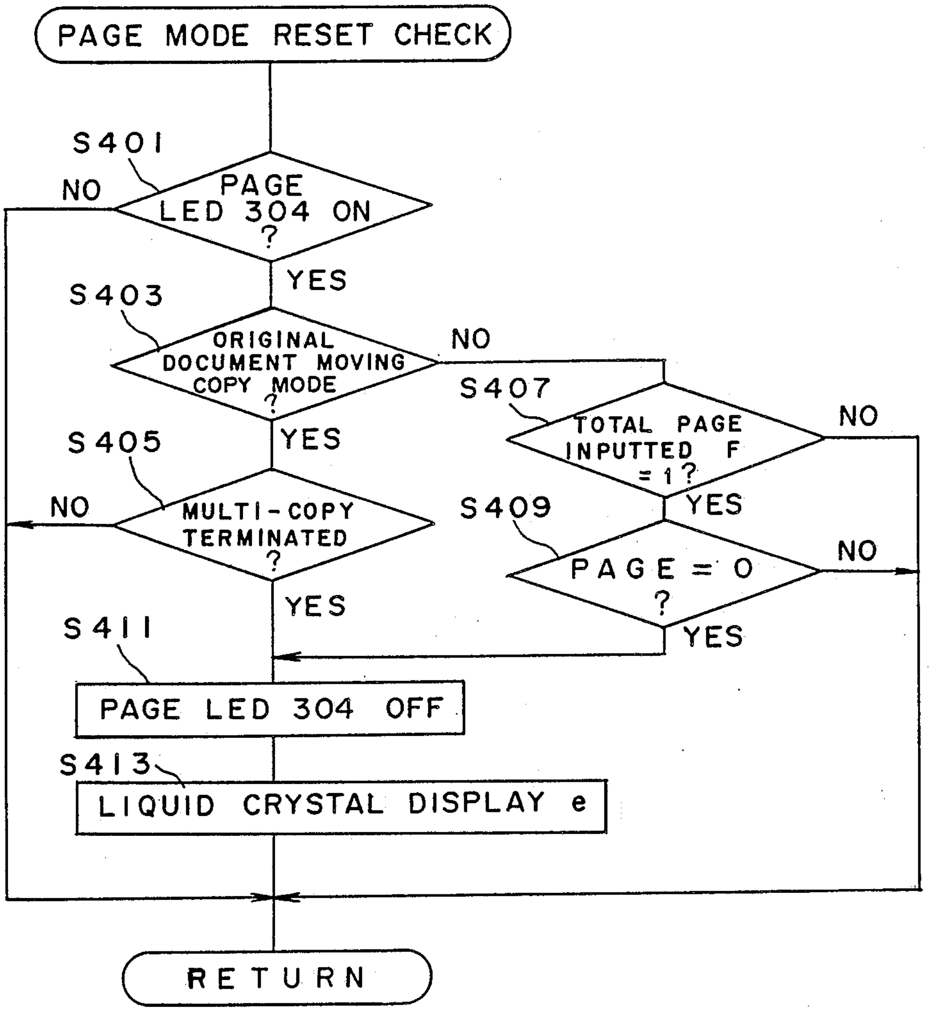

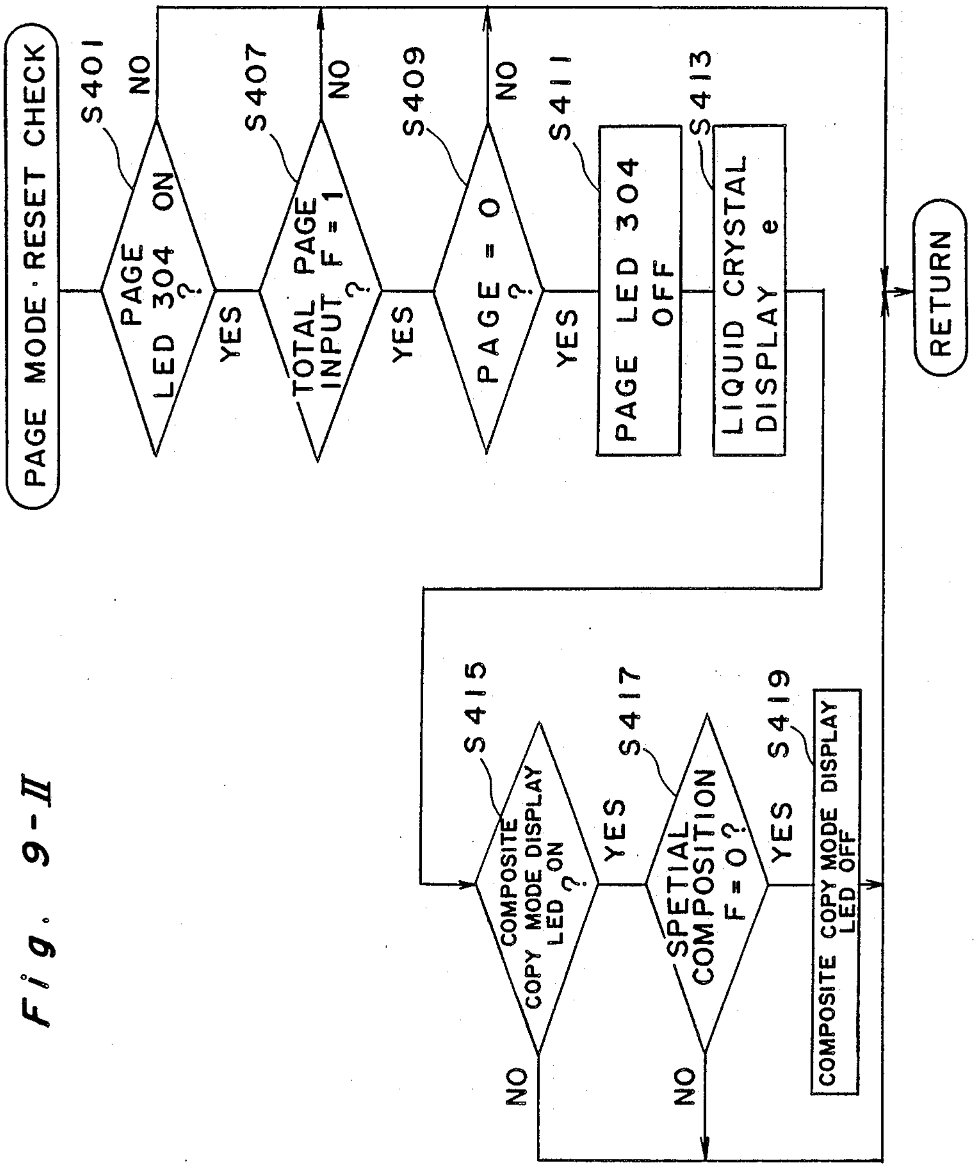
Fig. 9-II

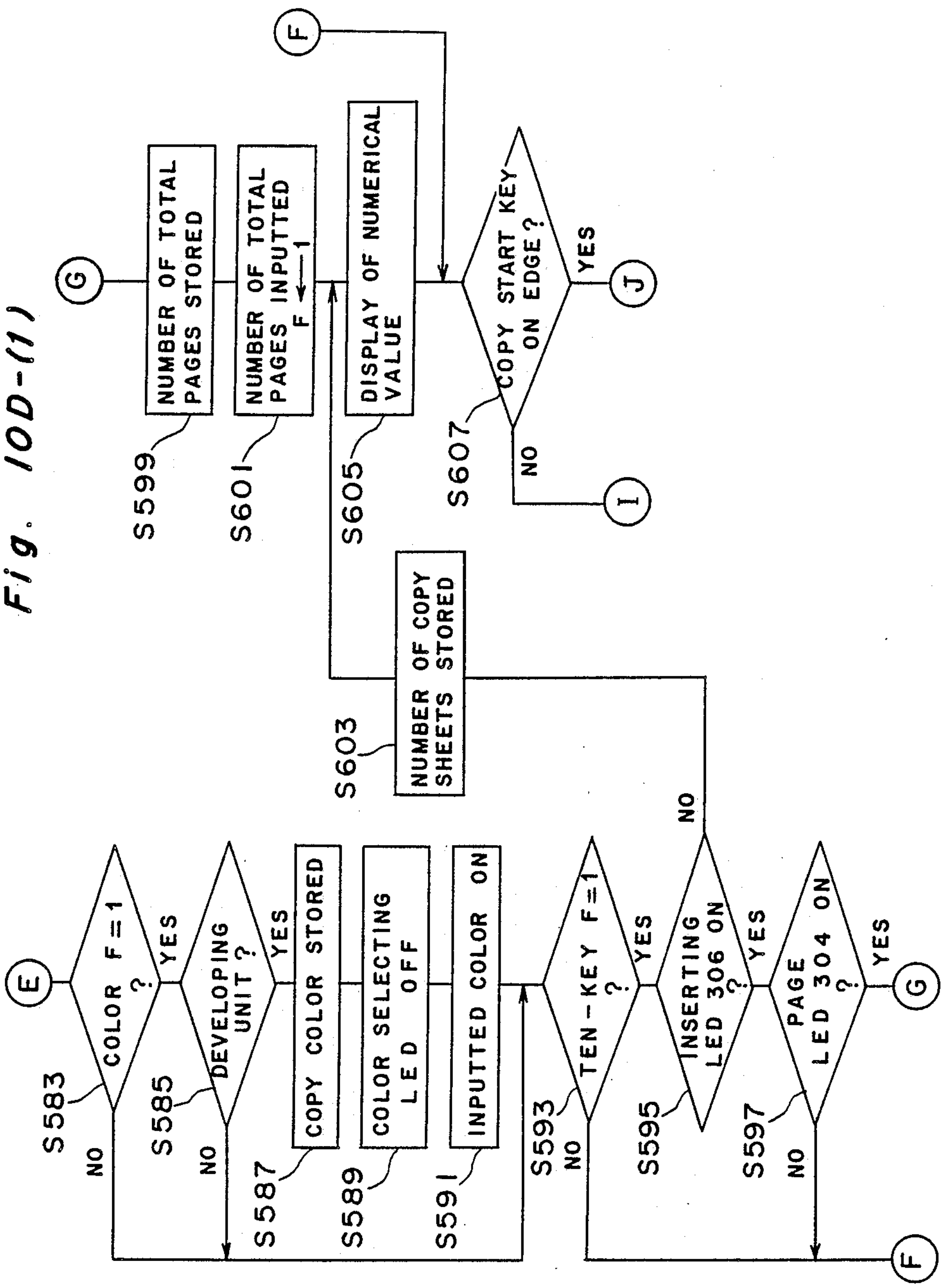
Fig. 10D-(1)

Fig. 10D-(2)
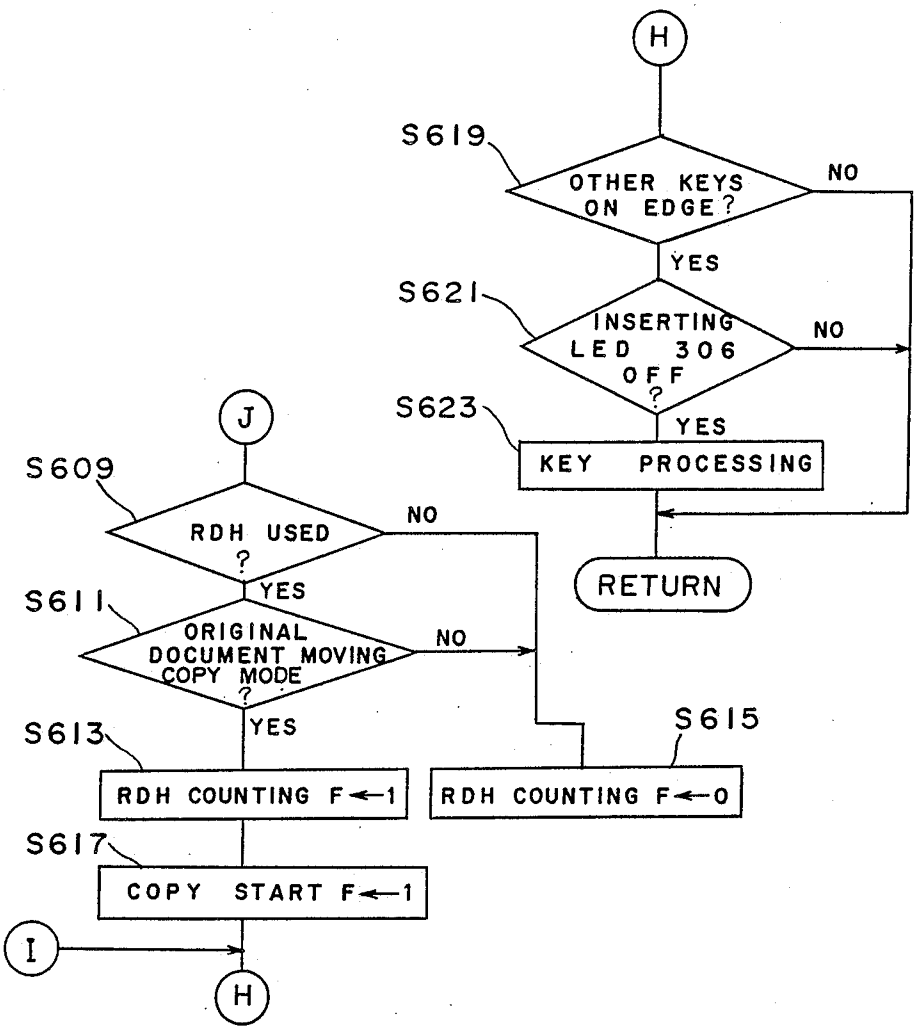

Fig. 10E-(1)
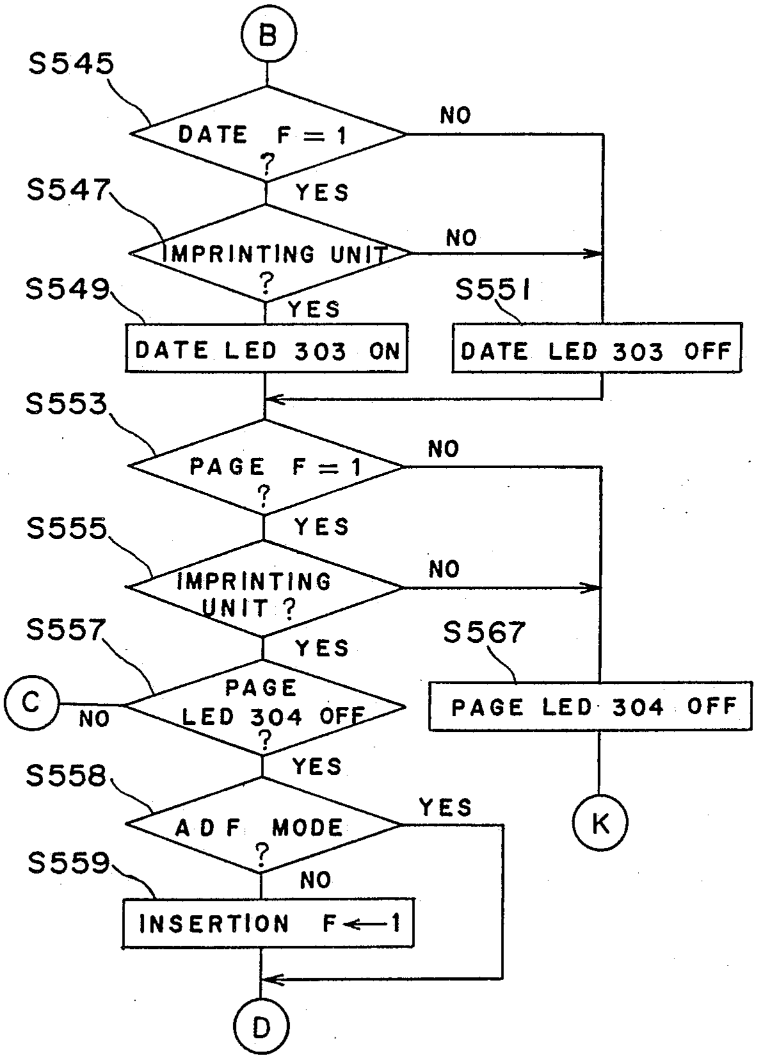

Fig. 10E-(2)
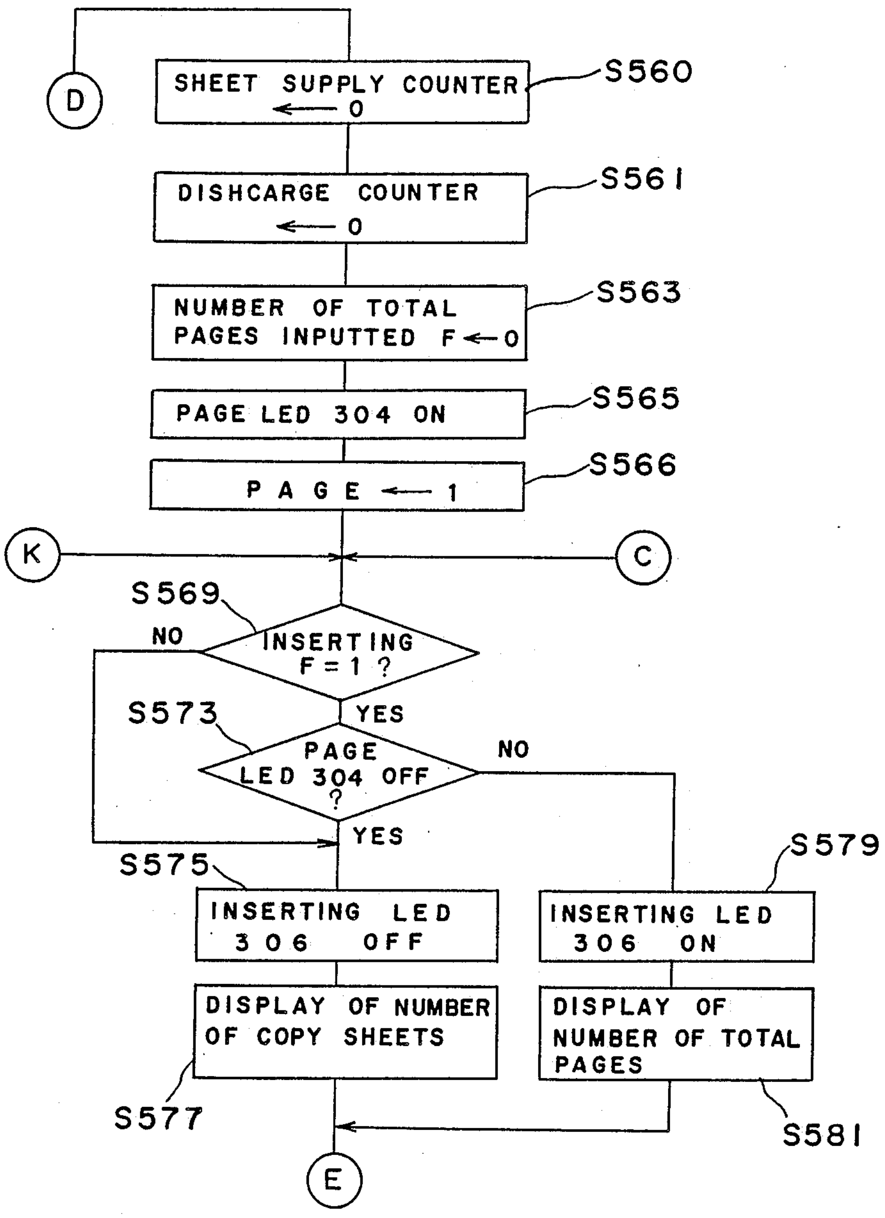

Fig. 10F-(1)
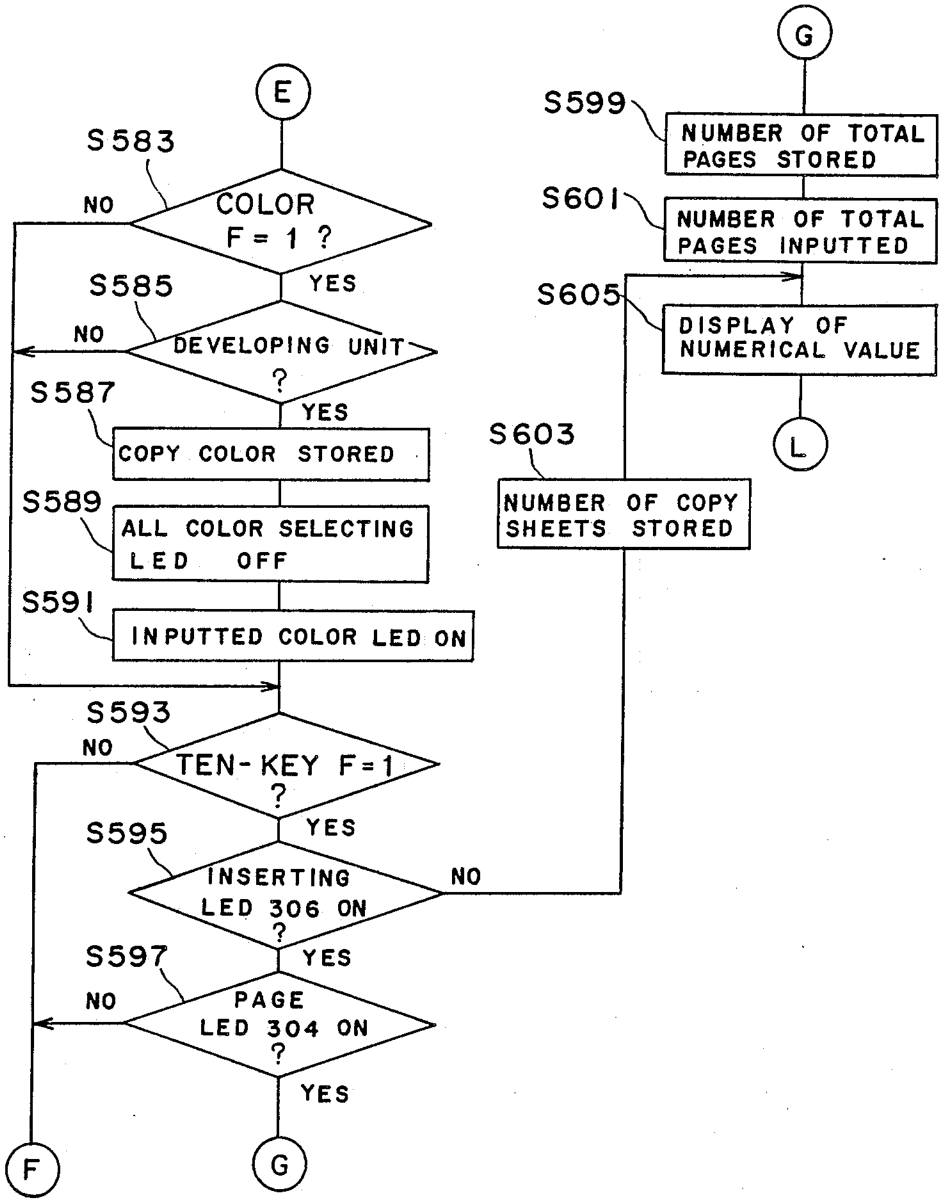

Fig. 10F-(2)
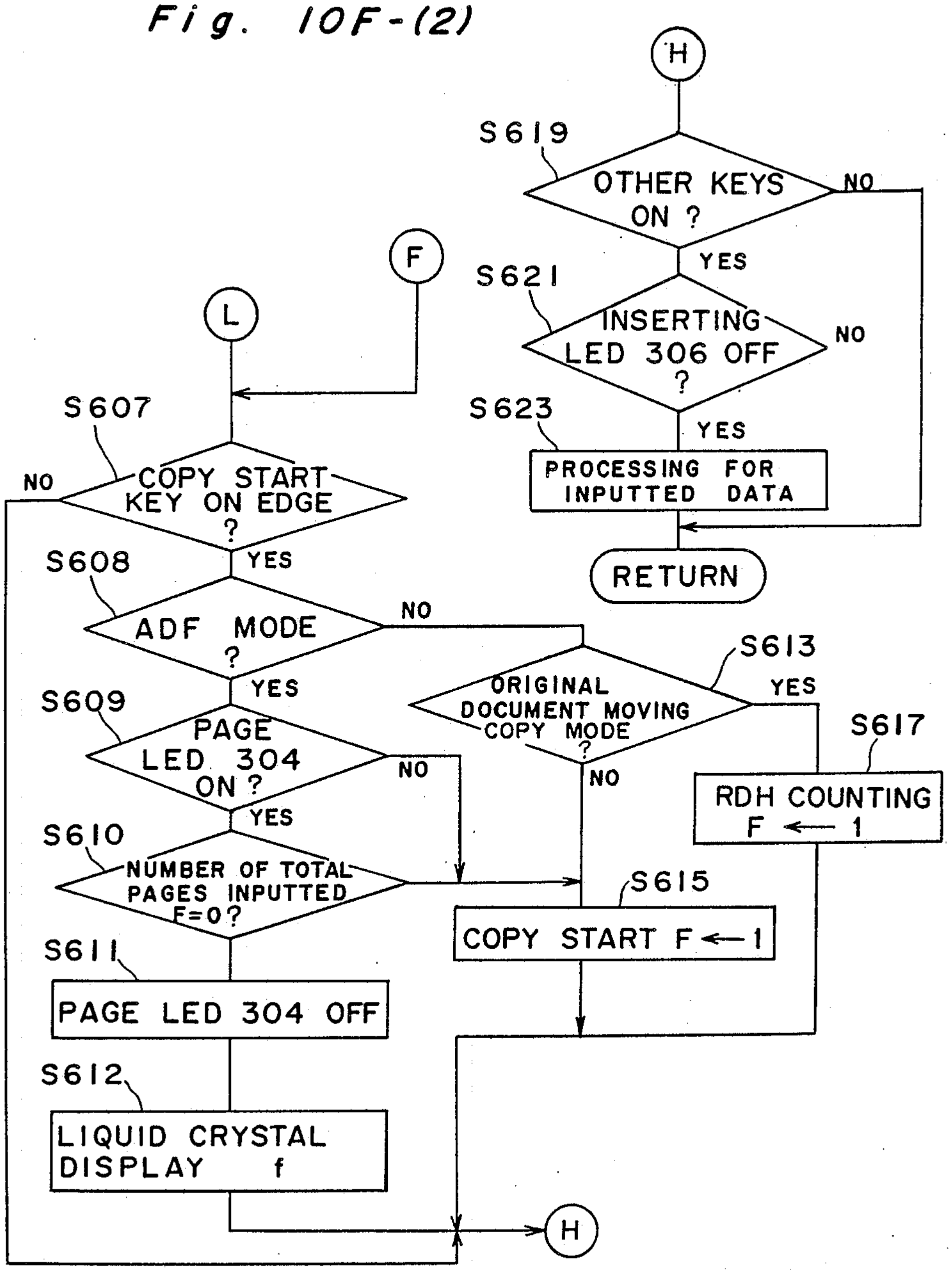

Fig. 10M-(1)
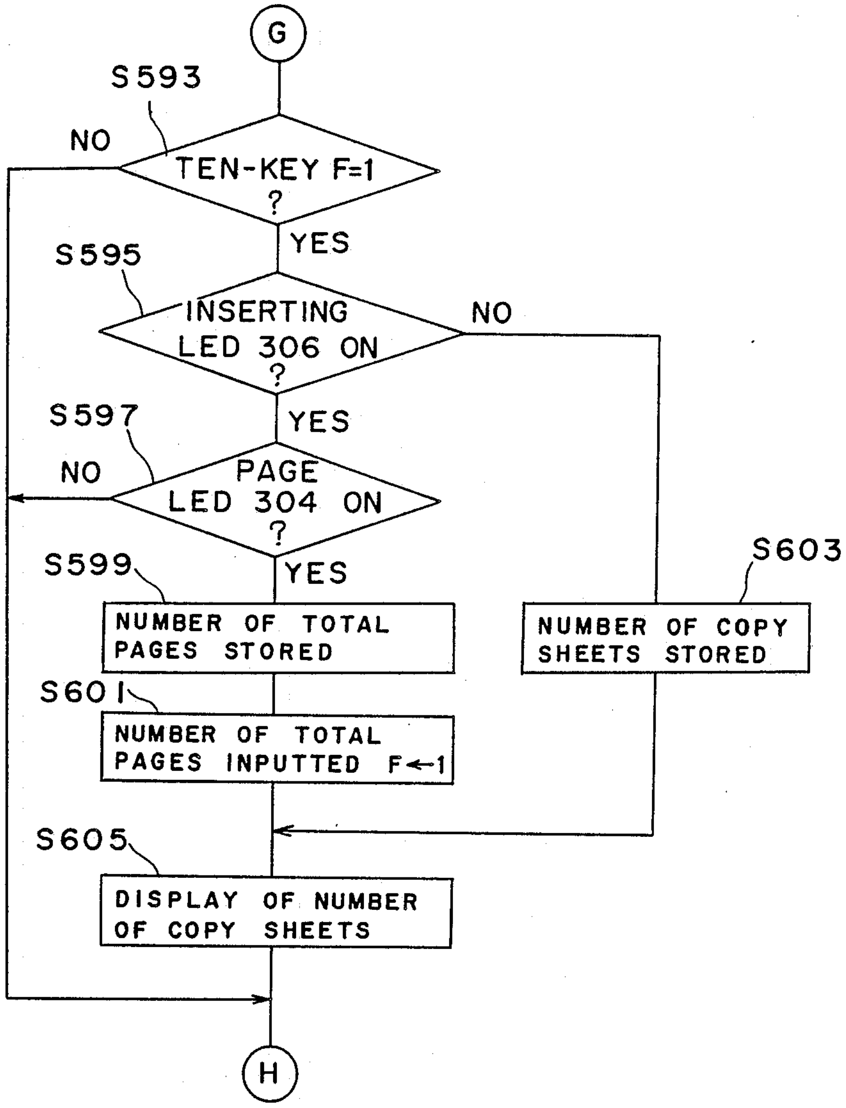

Fig. 10M-(2)
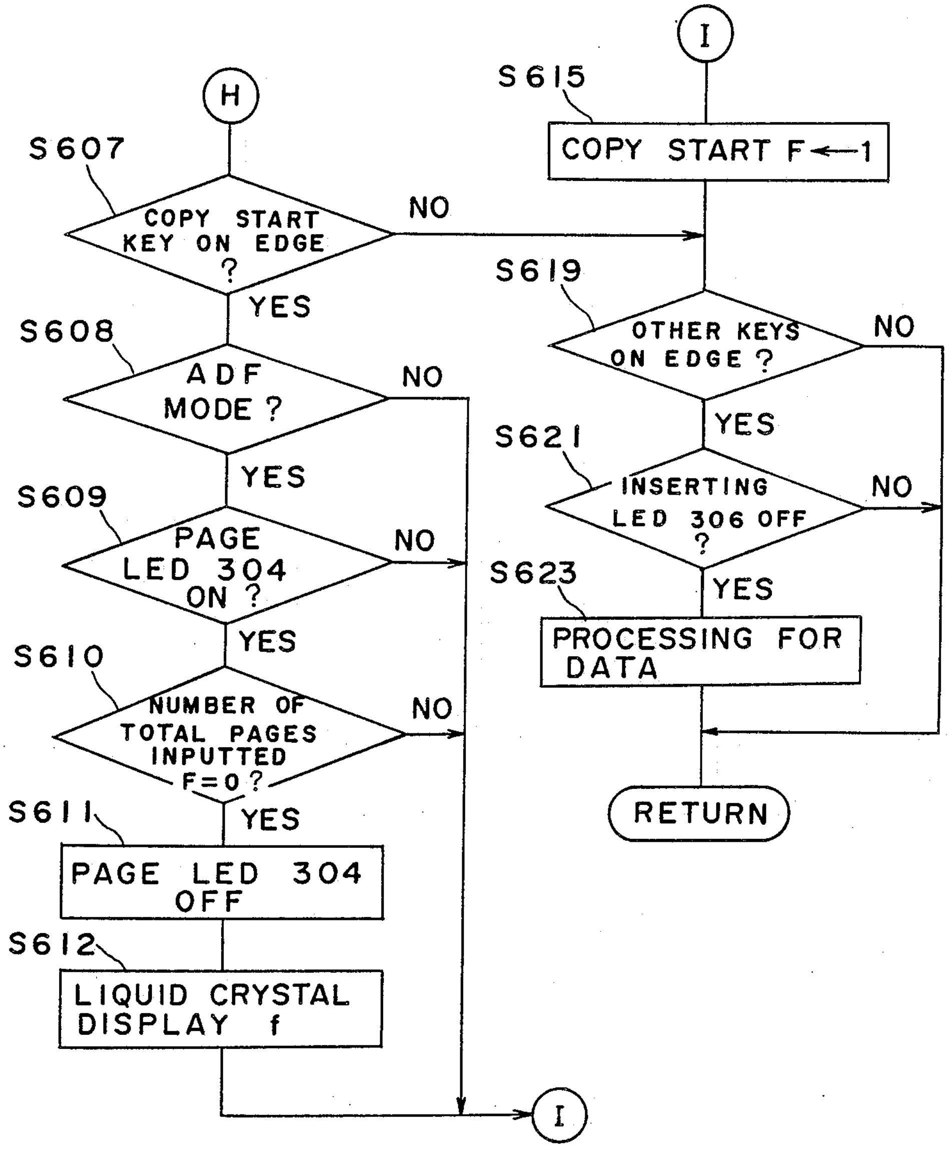

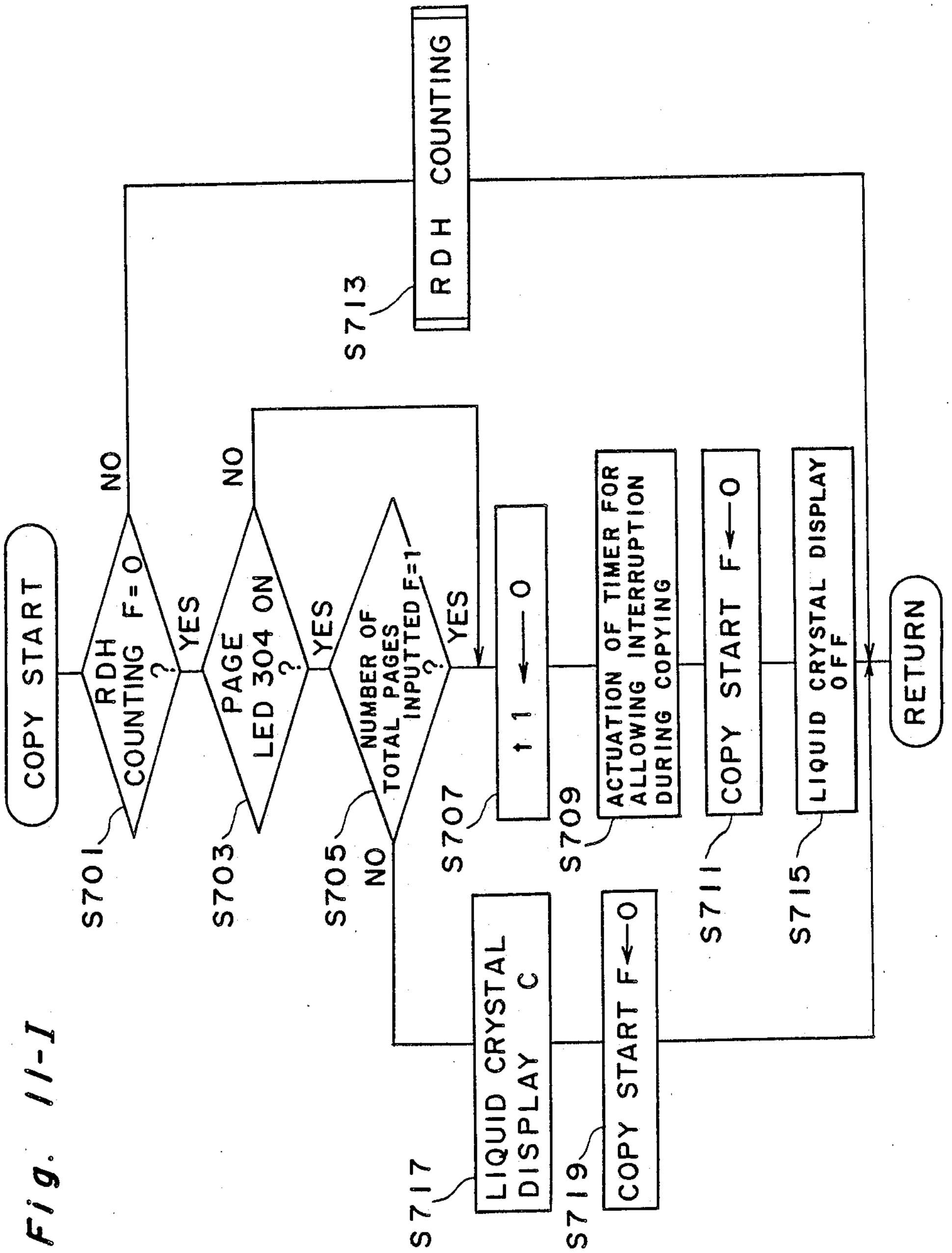
Fig. 11-I

Fig. 11-II
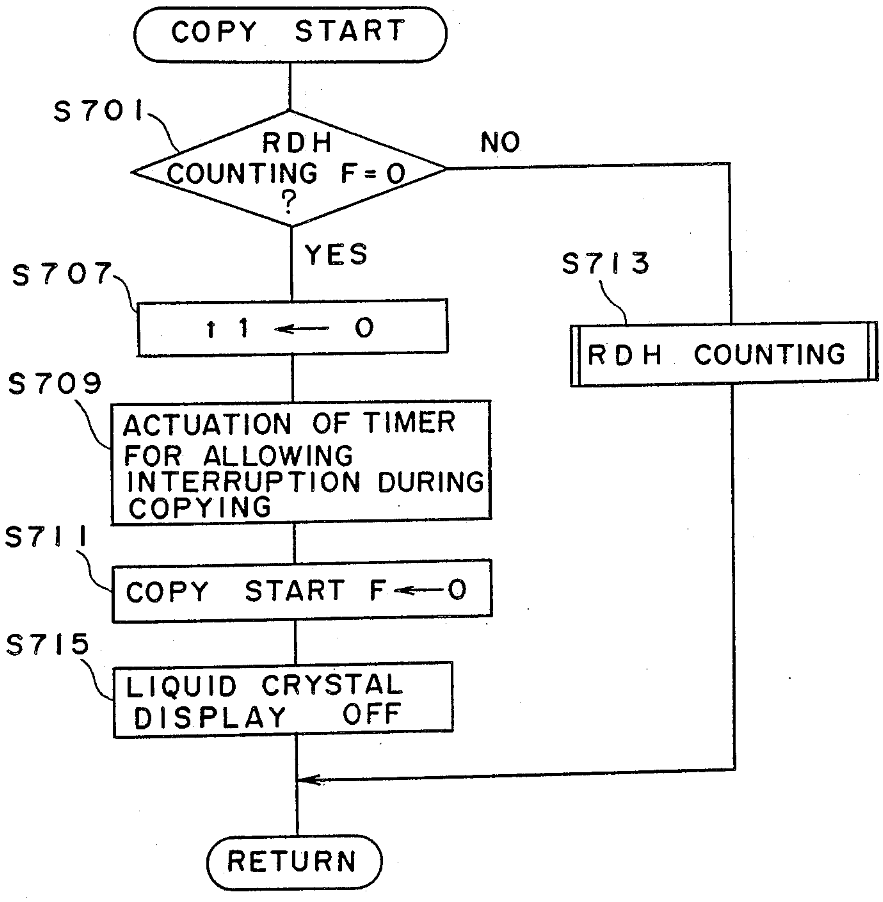

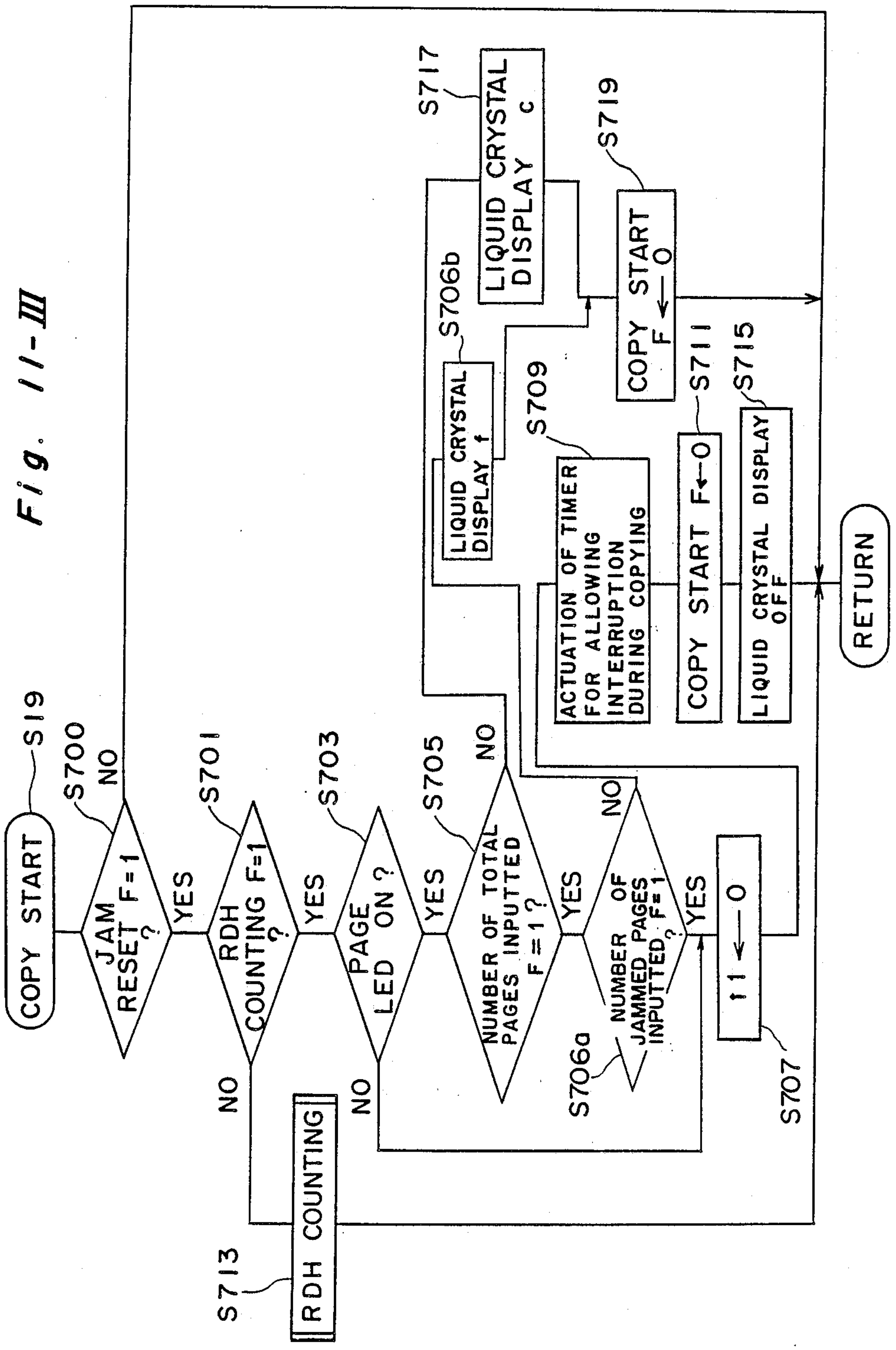
Fig. 11-III

Fig. 11-IV
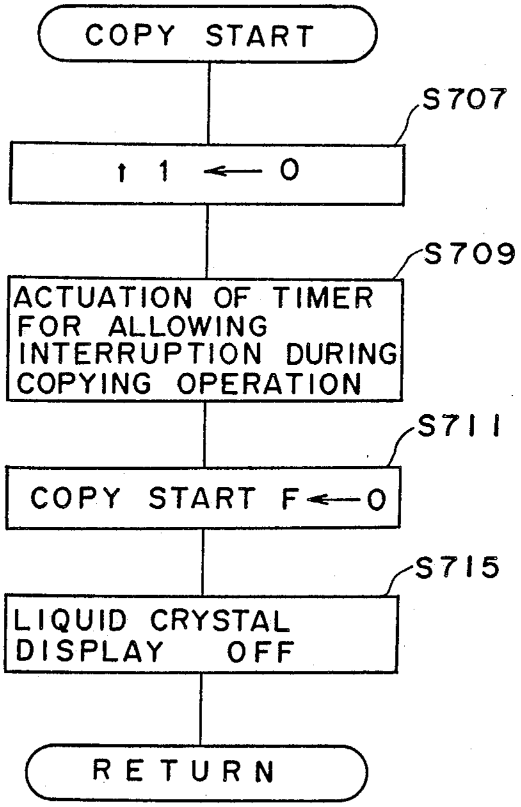

*Fig. 14-I(a)*

INPUT NUMBER OF TOTAL PAGES.
COPY FROM LAST PAGE

*Fig. 14-I(b)*

UNNESSARY FOR INPUTTING TOTAL PAGES.

*Fig. 14-I(c)*

YOU HAVE NOT INPUTTED NUMBER OF TOTAL PAGES. PAGINATION IS IMPOSSIBLE.

*Fig. 14-I(d)*

PAGINATION WITH RDH SHOULD BE IN ORIGINAL DOCUMENT MOVING COPY MODE.

*Fig. 14-I(e)*

TOTAL PAGES HAS BEEN COPIED. PAGE MODE IS CANCELLED.

Fig. 14-II(a)

PAGE MODE COPY
IS POSSIBLE.

Fig. 14-II(b)

ADF PAGE MODE
INPUT NUMBER OF
TOTAL PAGES.

Fig. 14-II(c)

TOTAL PAGE MODE
COPY FROM LAST
PAGE.

Fig. 14-II(d)

PAGE MODE
COPY FROM LAST
PAGE.

Fig. 14-II(e)

TOTAL PAGES SET
HAS BEEN COPIED.
PAGE MODE IS
CANCELLED.

Fig. 14-II(f)

ADF PAGE MODE
TOTAL PAGES HAS
NOT BEEN INPUTTED.

Fig. 14-II(i)

RESET ORIGINAL
DOCUMENT BEFORE
COPY.

Fig. 14-II(ii)

SET ORIGINAL
DOCUMENT.

Fig. 14-II(iii)

PRESS COPY START
KEY. THEN, YOU CAN
RESUME COPYING.

Fig. 14-II(iv)

RESET ORIGINAL
DOCUMENTS TO
BE COPIED.

Fig. 14-II(v)

PRESS COPY START
KEY FOR AUTOMATIC
RESUMPTION. PRESS
OTHER KEYS FOR
UNAUTOMATIC
RESUMPTION.

Fig. 14-III(a)

INPUT NUMBER OF TOTAL PAGES.
COPY FROM LAST PAGE.

Fig. 14-III(b)

UNNECESSARY FOR INPUTTING TOTAL PAGES.

Fig. 14-III(c)

PAGINATION IS IMPOSSIBLE, FOR YOU HAVE NOT INPUTTED TOTAL PAGES.

Fig. 14-III(d)

PAGINATION WITH RDH SHOULD BE IN ORIGINAL DOCUMENT MOVING COPY MODE.

Fig. 14-III(e)

TOTAL PAGES SET HAS BEEN COPIED.
PAGE MODE IS CANCELLED.

Fig. 14-III(f)

JAM HAS OCCUERED.
SET PAGE NUMBER FROM WHICH COPY OPERATION IS STARTED.

*Fig. 14-IV(a)*

PAGE MODE COPY
IS POSSIBLE.

*Fig. 14-IV(b)*

ADF · PAGE MODE
INPUT NUMBER OF
TOTAL PAGES.

*Fig. 14-IV(c)*

TOTAL PAGE MODE
COPY FROM LAST
PAGE.

*Fig. 14-IV(d)*

PAGE MODE
COPY FROM FIRST PAGE.

*Fig. 14-IV(e)*

TOTAL PAGES SET
HAS BEEN COPIED
PAGE MODE IS CANCELLED.

*Fig. 14-IV(f)*

ADF · PAGE MODE
YOU HAVE NOT INPUTTED
NUMBER OF TOTAL PAGES.

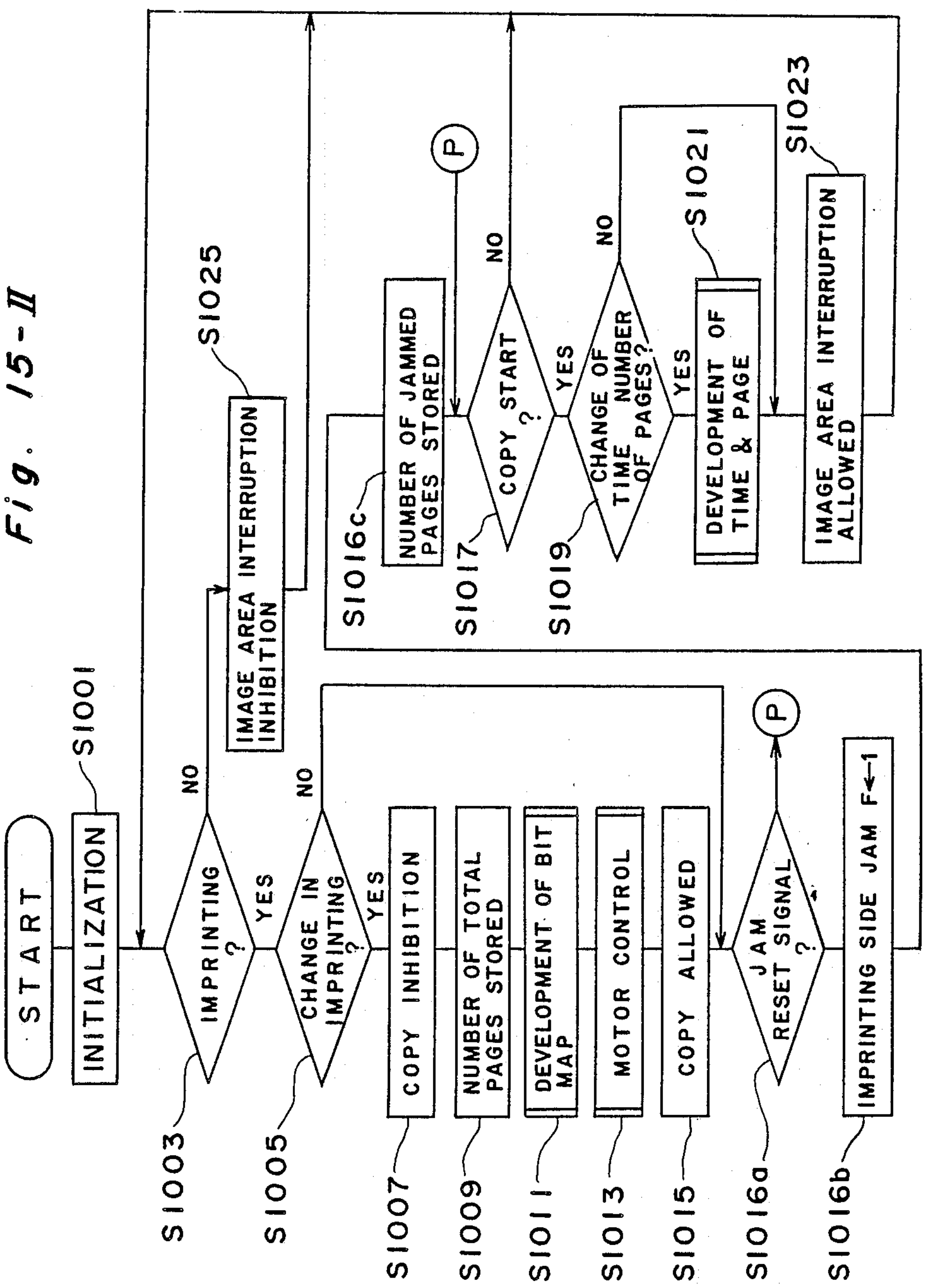
Fig. 15-II

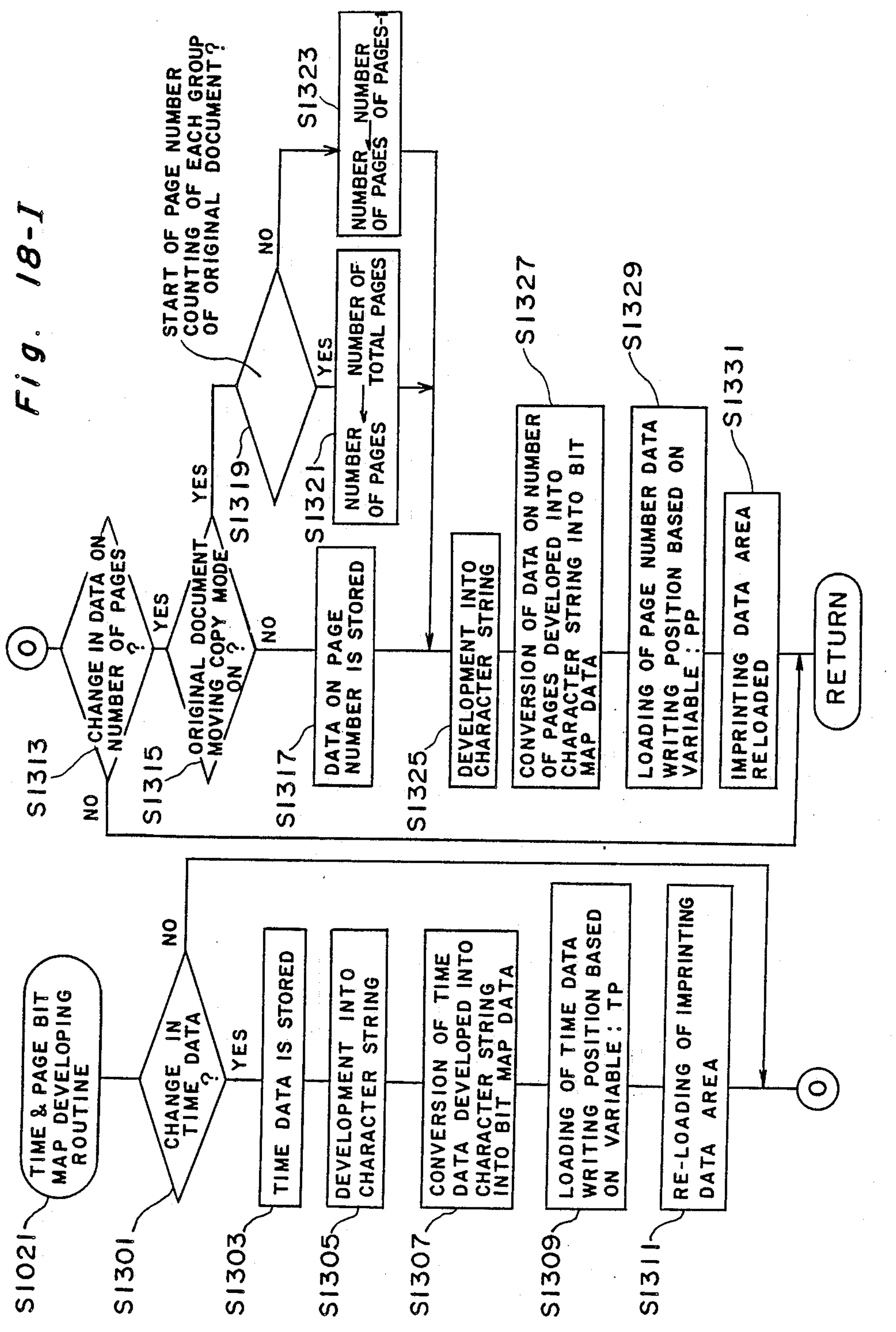
Fig. 18-I

Fig. 18-IIA
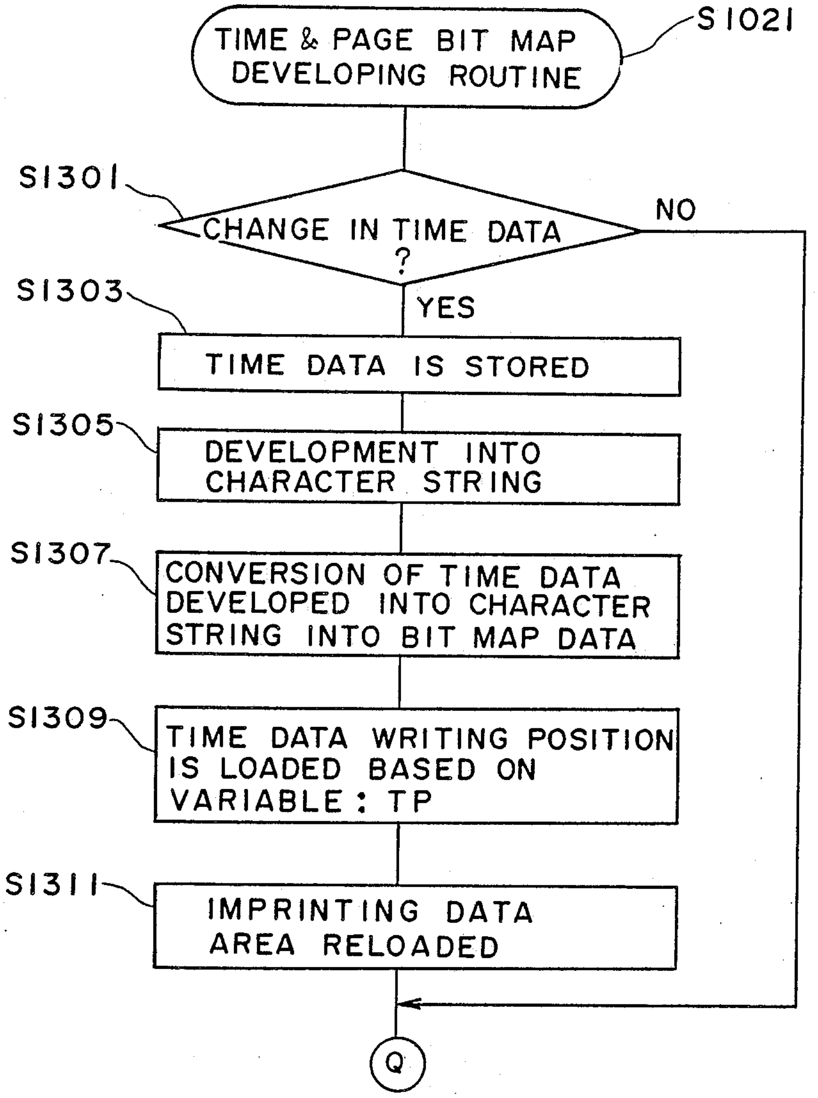

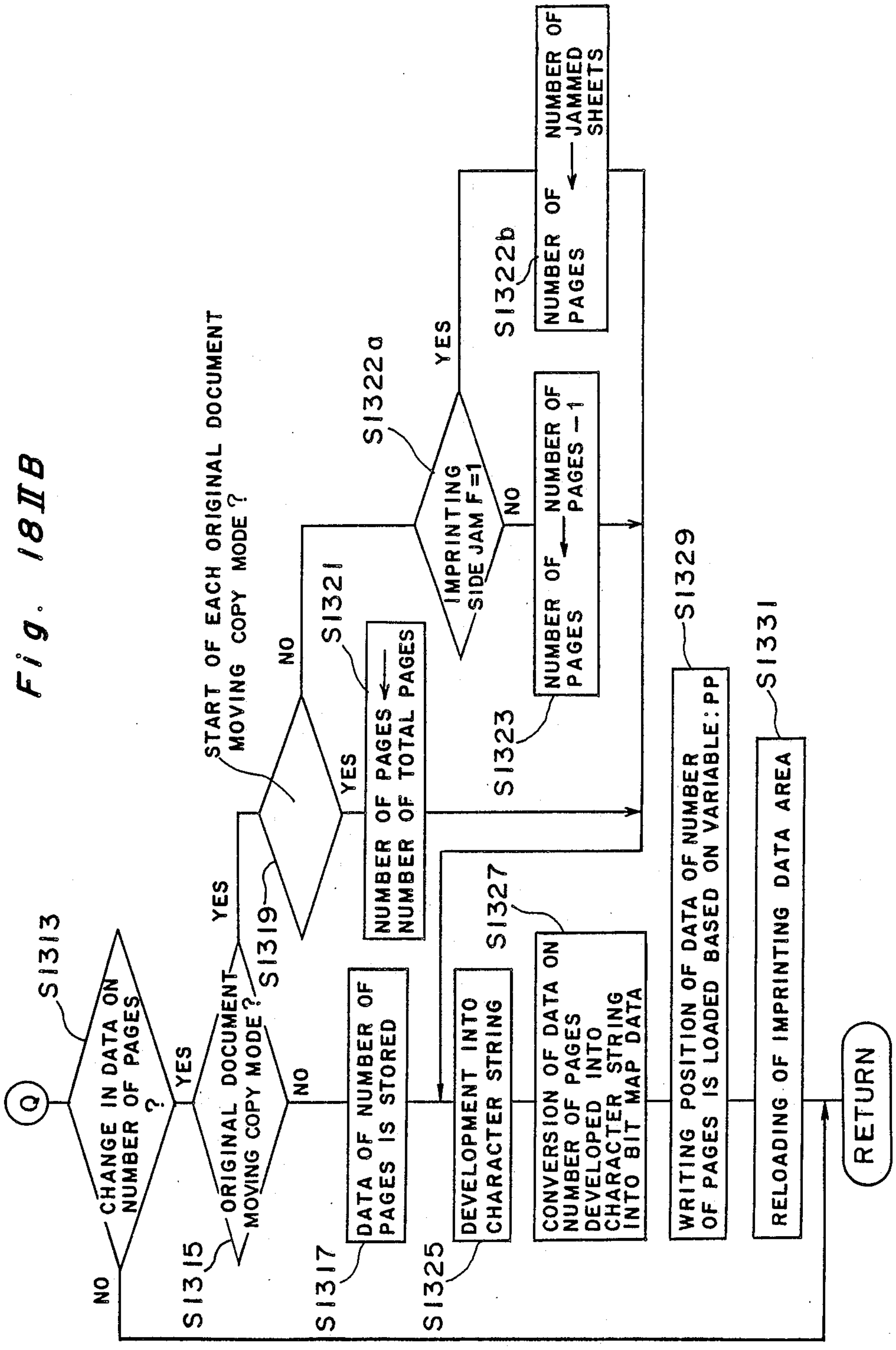
Fig. 18IIB

Fig. 18-III
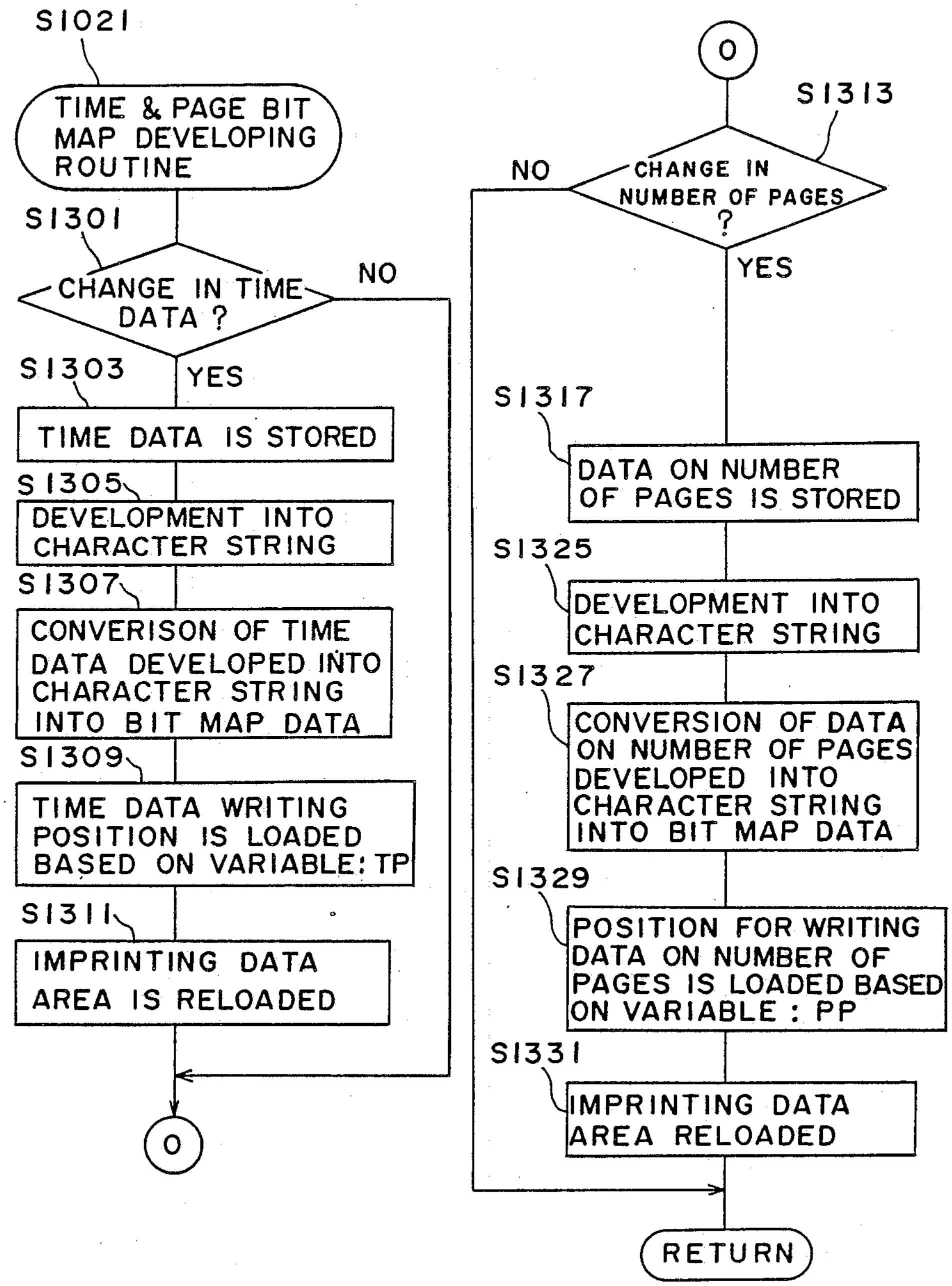

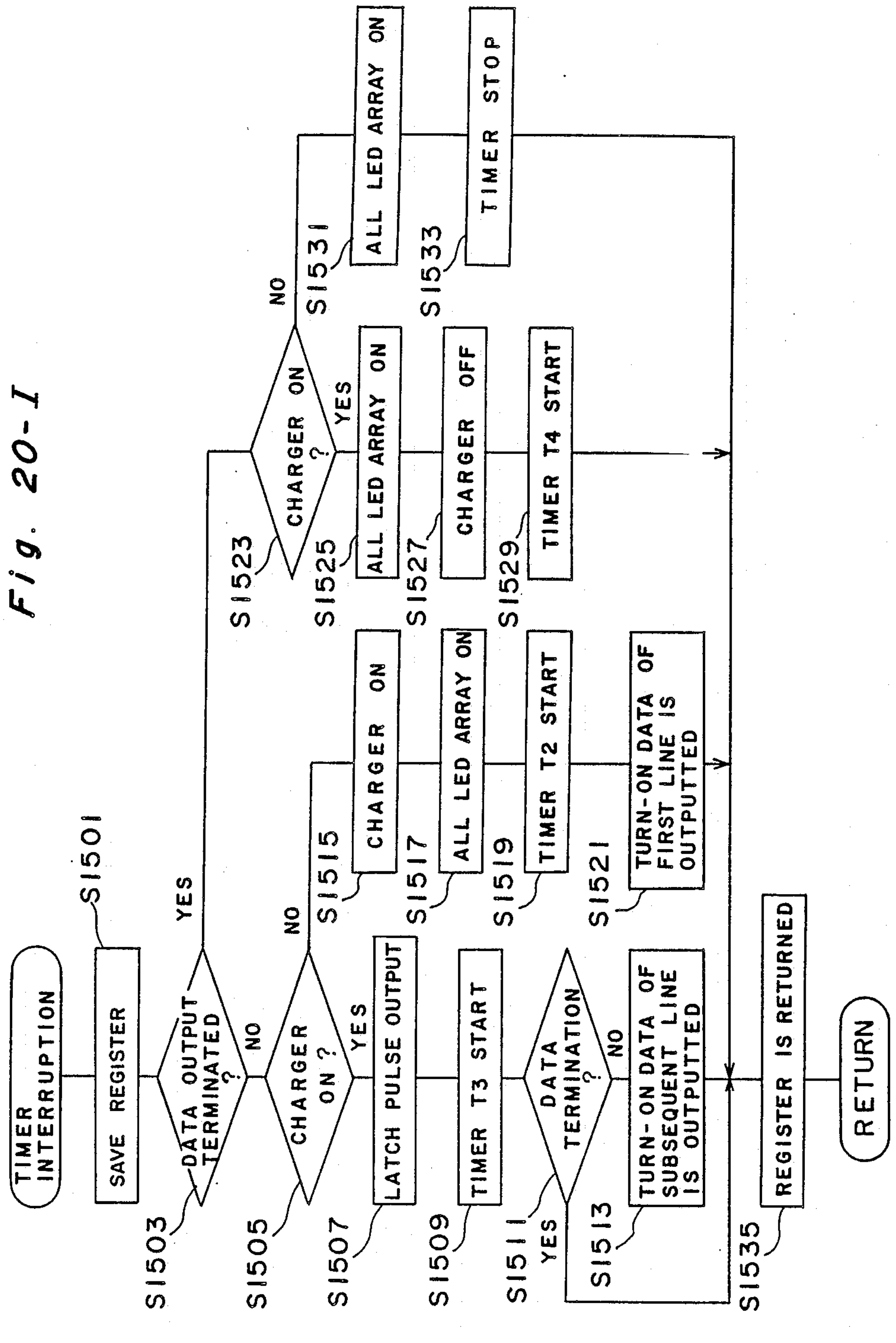
Fig. 20-I

Fig. 20-IIA
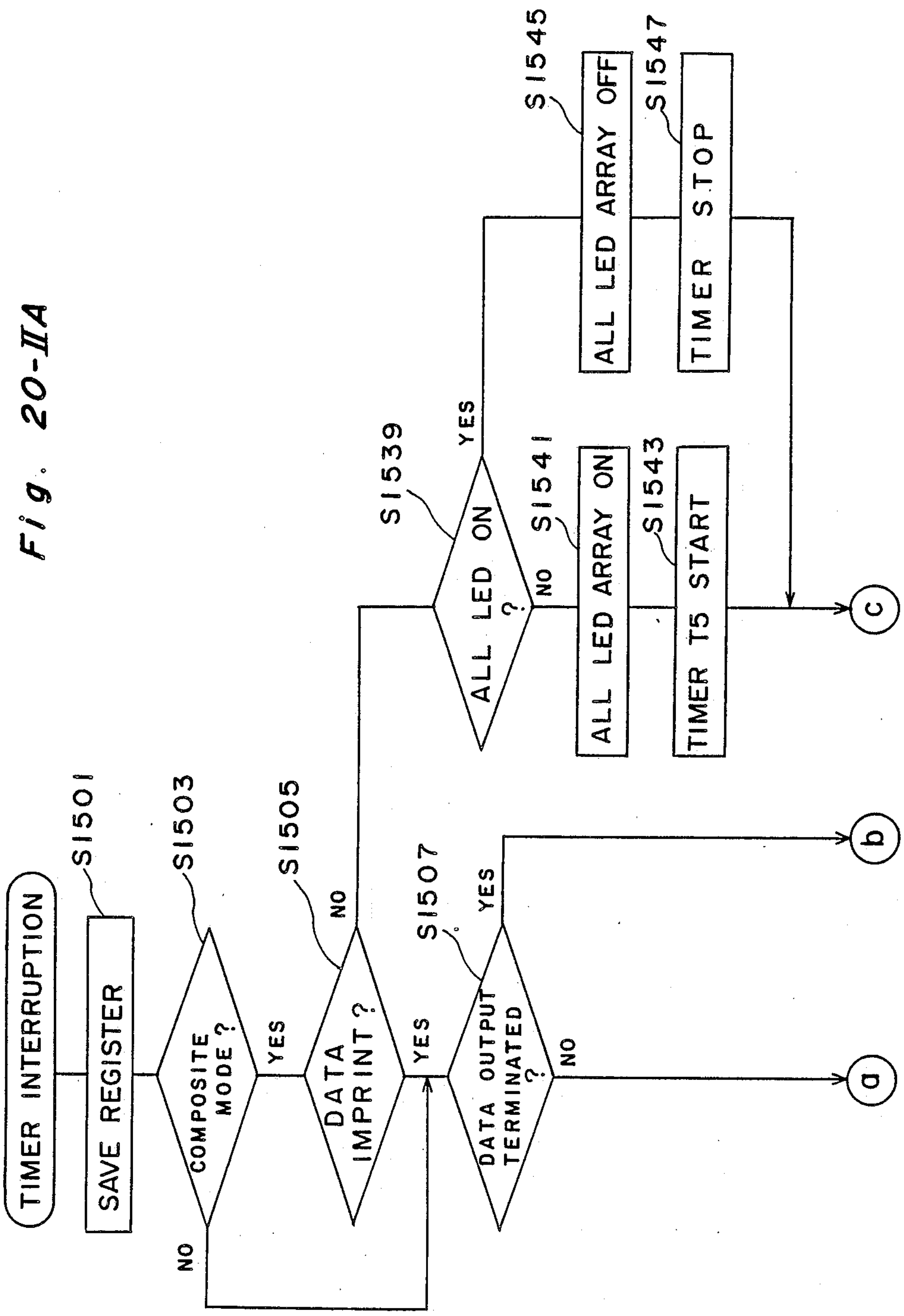

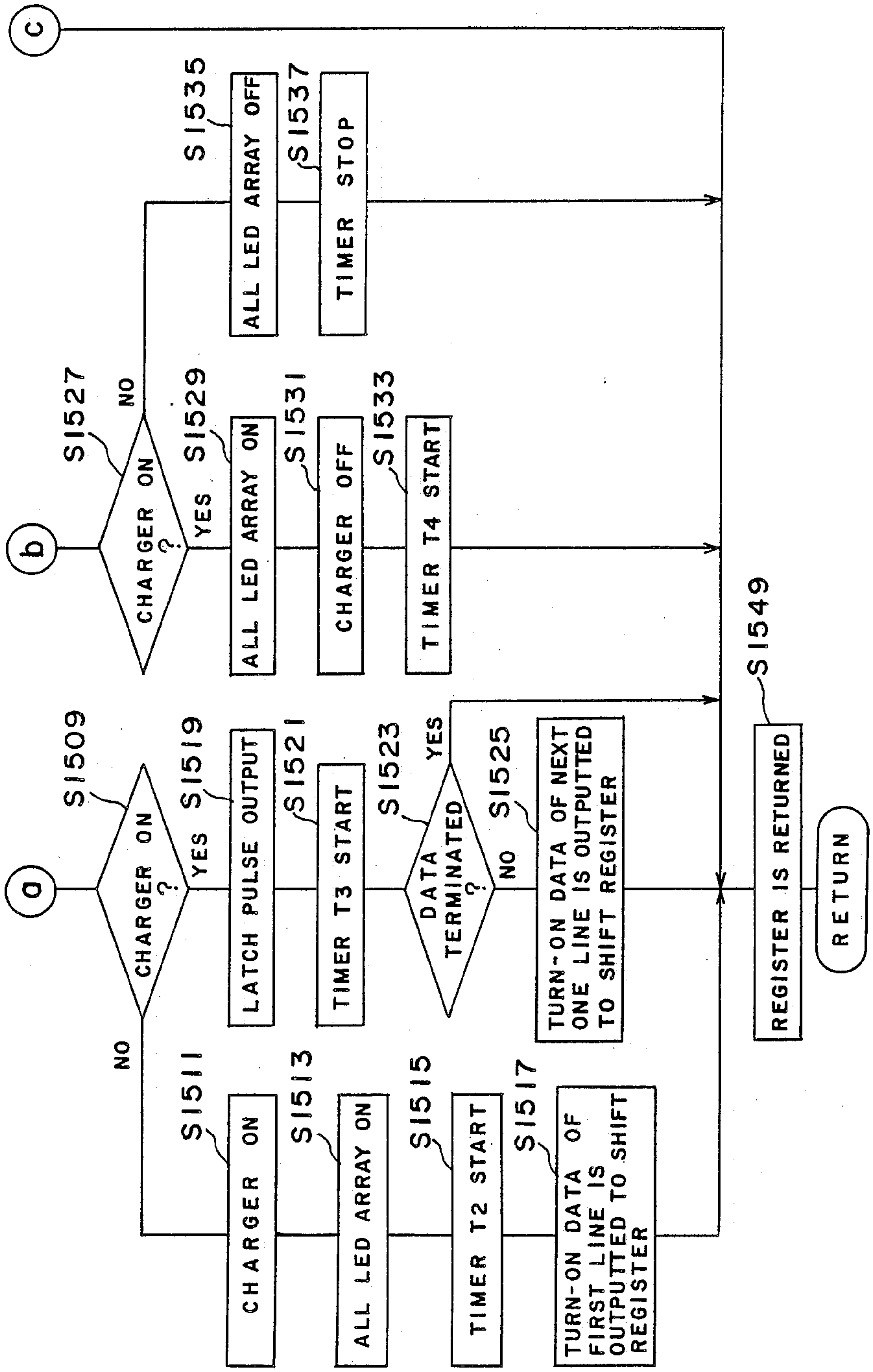
Fig. 20-IIB

Fig. 21-I
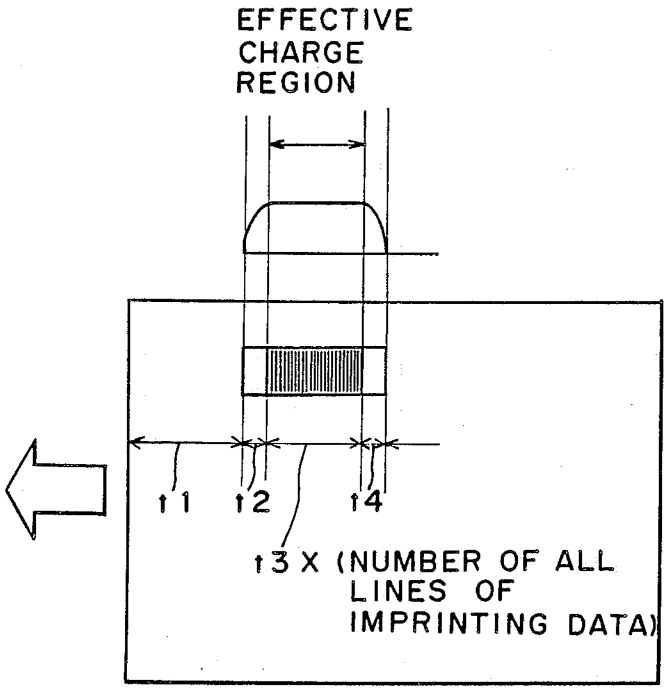

Fig. 21-II
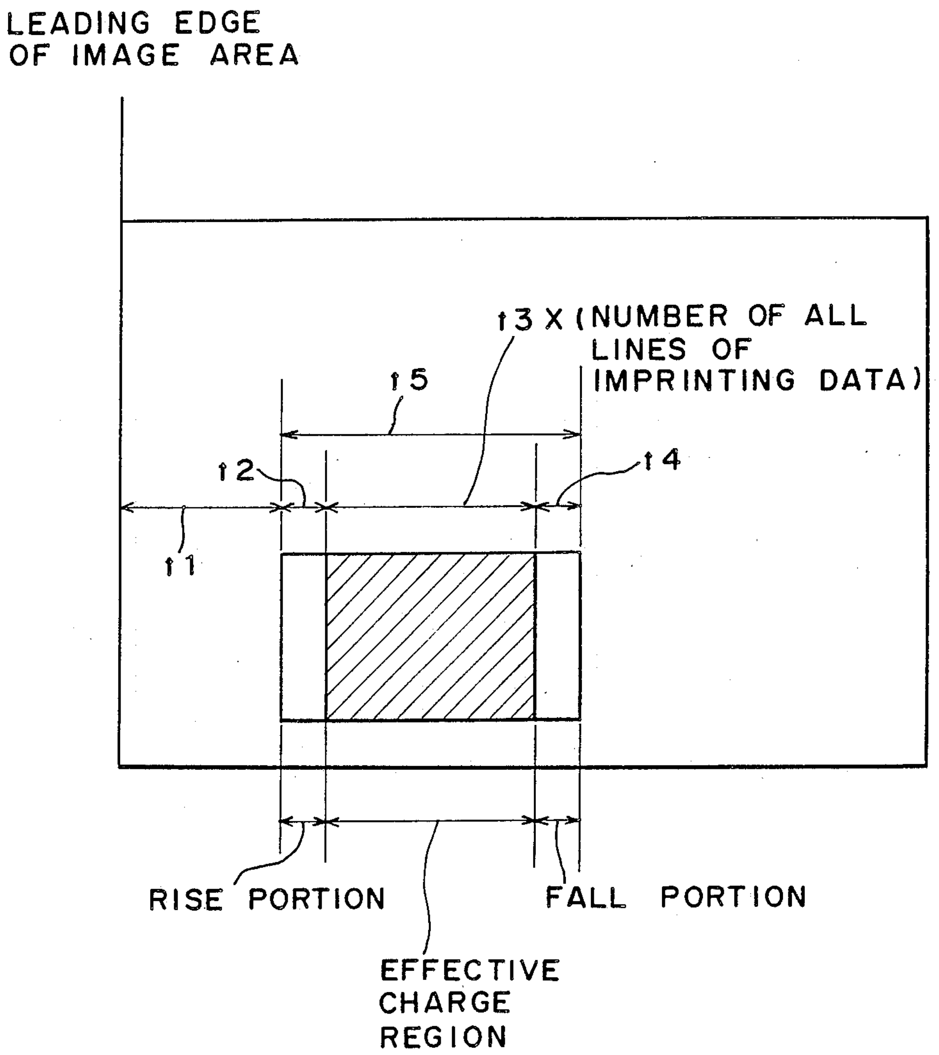

COPYING APPARATUS HAVING FUNCTION OF IMPRINTING DATA

BACKGROUND OF THE INVENTION

1. Field of the Invention

The present invention relates to a copying apparatus having a function of imprinting page numbers of original documents and the number of the total pages thereof.

2. Description of Related Art (1) A copying apparatus capable of imprinting data such as a date, a page number on a copy sheet in addition to the image of an original document is provided or proposed in, for example, Japanese Patent Publication No. 59-52811.

According to the above-described copying apparatus, for example, a region corresponding to data imprinting region is light-intercepted to maintain the initial charge condition of the imprinting region when the image of the original document is exposed and scanned to form on a photosensitive member an electrostatic latent image corresponding to the image of the original document. Thus, data can be imprinted onto the region.

When the imprinting of page number data is carried out in the above-described copying apparatus, normally, a total page, namely, the last page number as well as the numbers of respective of the original documents is copied on copy sheets in the form of, for example, **/## (* denotes the number of respective pages and # denotes the last page number).

(2) A recirculation document handler (hereinafter referred to as RDH) is provided or proposed in, for example, Japanese Patent Laid-Open Publication No. 55-98762.

The RDH removably mounted on the original document setting table of a copying apparatus enables a copying operation in a mode in which the image of an original document is scanned by moving the original document on the original document setting table thereof with the scanning system thereof fixed (this mode is hereinafter referred to as original document moving copy mode).

In a normal copying operation, it takes for a certain period of time for the scanner to return to the initial position thereof. In view of this inefficiency, the original document moving copy mode is employed.

When the RDH is used in the original document moving copying mode, normally, the number of original documents are counted to detect the termination point of the copying operation.

The RDH can be used in an automatic document feeding mode (hereinafter referred to as ADF mode) as well. In the ADF mode, the original document is automatically supplied from the RDH to the original document setting table of the copying apparatus and located at a predetermined position thereon and then, the scanning system of the copying apparatus is driven to scan the image of the original document. Thereafter, the original document is discharged from the original document setting table. Normally, the number of original documents is not counted in the ADF mode because the counting thereof is not required.

The original document feeding portion of the RDH can be opened so that original documents are manually set on the original document setting table.

(3) An automatic document feeder (hereinafter referred to as ADF) is proposed. As described above, according to the ADF, the original document is automatically set on the original document setting table or glass and stationary at a predetermined position thereof while the original document is being scanned by the optical system, thereafter, automatically discharged therefrom.

When page data is imprinted on copy sheets with the RDH employed or in the RDH-used ADF mode, page data is often erroneously imprinted on copy sheets due to various reasons. Further, it is troublesome and takes a considerable long period of time to count the number of original documents and input data of the number of the total pages thereof, namely, the last page number thereof. It also takes a fairly long period of time to imprint the page data on the copy sheets. Furthermore, when a jam occurs during a copying operation, it is very complicated and hard to imprint predetermined page data onto the copy sheets after a jam reset is preformed, i.e., after a condition in which the sheet is jammed is corrected to continue the copying operation. Another problem is that when the images of two original documents or more are copied on the same face or side of a copy sheet by circulating the copy sheet two times or more in the copying apparatus (hereinafter referred to as composite copy mode, it requires a very complicated operation to imprint the page data on the copy sheet.

SUMMARY OF THE INVENTION

It is therefore a principal object of the present invention to provide an RDH or ADF-employed copying apparatus having the function of imprinting onto each of copy sheets page number of each of original documents or the last page number of the original documents in addition to the page number thereof without making an error in imprinting page data.

It is another object of the present invention to count the number of original documents and imprint the last page number thereof easily on a copy sheet.

It is still another object of the present invention to imprint page data onto a copy sheet in a short period of time.

It is a further object of the present invention to accurately set the initial value of page data when a copying operation is resumed after a jam occurs during a copying operation.

It is a still further object of the present invention to imprint desired page data onto a copy sheet accurately even in a composite copy mode.

According to a preferred embodiment of the present invention, a copying apparatus having the following construction is provided.

The copying apparatus for imprinting page data together with an image of an original document on a copy sheet comprises original document feeding means for sequentially supplying original documents from an original document setting tray to an original document setting table and collecting the original documents from the original document setting table; original document count instructing means for actuating the original document feeding means before the image of each of the original documents is copied on a copy sheet; count means for counting the number of all original documents fed by the original document feeding means according to the instruction of the original document count instructing means; image forming means for forming the image of each of the original documents supplied to the original document setting table on a copy sheet corresponding to each of the original documents; page data controlling means for generating page data to be imprinted on each of copy sheets corresponding to each of the original documents according to the number of the original documents counted by the count means; page data imprinting means for imprinting on the copy sheet data generated by the page data controlling means and the image of each of the original documents formed by the image forming means; selecting means for selecting a page data imprinting mode using the page data imprinting means; and cancelling means for cancelling a selected page data imprinting mode when the count means is not operative.

According to the above-described construction, when a counting mode is not set after the page data imprinting mode is selected, the page data imprinting mode is cancelled (the counting mode is set, for example, when the original document moving copy mode is selected).

The above-described construction prevents page data from being erroneously imprinted because a copying operation is not performed if imprinting page data is not determined.

According to another preferred embodiment, a copying apparatus having the following construction is provided.

The copying apparatus for imprinting page data together with an image of an original document comprises original document feeding means for sequentially suppling original documents from an original document setting tray to an original document setting table and collecting the original documents from the original document setting table; original document count instructing means for actuating the original document feeding means before the image of each of the original document is copied on a copy sheet; count means for counting the number of all original documents fed by the original document feeding means according to the instruction of the original document count instructing means; page data controlling means for generating page data to be imprinted on each copy sheet corresponding to each of the original documents according to the number of the original documents counted by the count means; image forming means for forming the image of each of the original documents supplied to the original document setting table on a copy sheet corresponding to each of the original documents; page data imprinting means for imprinting on the copy sheet page data generated by the page data controlling means and the image of each of the original documents formed by the image forming means; selecting means for selecting a page data imprinting mode using the page data imprinting means; and instructing means for instructing an operator to allow the original document count instructing means and the count means to be operational when the page data imprinting mode is selected by the selecting means.

According to the above-described construction, when the page data imprinting means is selected, an operator is instructed to set the original document moving copy mode in which the number of original documents is counted or a mode in which only the number of original documents is counted without performing a copying operation. When the mode for counting the number of original documents is set according to the instruction and a predetermined copying operation starting condition is satisfied, for example, when a copy start key is pressed, the number of original documents is counted before a copying operation is started.

Based on the counted number of the original documents, page data corresponding to each of the original documents and the total page data on the original documents are counted as neccessary, thereby imprinting data being set.

Therefore, according to the copying apparatus of the present invention, it is unnecessary to manually count the number of original documents and press a key to input the number of the total pages thereof.

According to another preferred embodiment, a copying apparatus having the following construction is provided.

The copying apparatus for imprinting page data and the image of an original document on a copy sheet comprises image forming means for forming the image of each of the original documents on a copy sheet corresponding to each of the original documents; page data imprinting means for imprinting on the copy sheet page data generated by the page data controlling means and the image of each of the original documents formed by the image forming means; selecting means for selecting a mode for imprinting page data using the page data imprinting means; and cancelling means for automatically cancelling a page data imprinting mode when the page data imprinting mode is selected by the selecting means and a series of copying operations in connection with a page data imprinting operation are terminated.

According to the above-described construction, when the number of times of copying operations determined according to the number of the total pages of original documents and the number of sheets per page thereof are terminated, the page data imprinting mode is automatically cancelled.

In other words, the page data imprinting mode selected by an operator is cancelled before another operator uses the copying apparatus.

That is, an erroneous copying which otherwise may occur can be prevented.

According to another preferred embodiment, a copying apparatus having the following construction is provided.

The copying apparatus for imprinting page data and the image of an original document on a copy sheet comprises image forming means for forming the image of each of the original documents on the copy sheet; data imprinting means for copying on the copy sheet the image of the original document formed by the image forming means and imprinting data consisting of the combination of variable data which changes each time a copying operation is carried out and fixed data which does not change each time a copying operation is performed; a memory for storing imprinting data in the form of a bit pattern, the memory including a first area for storing the fixed data and a second area for storing the variable data; a first data controlling means for converting the fixed data into a bit pattern before a series of copying operations in connection with a data imprinting operation are performed and storing the bit pattern in the first area of the memory; a second data controlling means for converting the variable data into a bit pattern before respective copying operations are effected and storing the bit pattern in the second area of the memory; and a data processing means for transferring to the data imprinting means the bit pattern stored by the first data controlling means and the bit pattern stores by the second controlling means.

According to the above-described construction, the conversion of data of such as page data into bit map data is carried out for each of the original documents.

The conversion of fixed data such as the total page of a group of original documents into bit map data is performed before the copying operation of the first page of the group of the original documents is carried out. The converted bit map data is held while a series of copying operations are performed.

Accordingly, the period of time required for converting data into the bit map data is shortened. Thus, a series of copying operations can be performed in a greatly reduced period of time.

According to another preferred embodiment, a copying apparatus having the following construction is provided.

The copying apparatus for imprinting page data and the image of an original document on a copy sheet comprises image forming means for forming the image of each of the original documents on the copy sheet; page data imprinting means for imprinting on the copy sheet page data and the image of each of the original documents formed by the image forming means; setting means for setting the number of the total pages of the original documents; page data controlling means for decrementing "1" from the number of the total pages inputted as an initial value each time series of copying operations are terminated, thereby using a decremented numerical value as page data when the number of the total pages of the original documents is set in the setting means and incrementing "1" from an initial value of "1" each time a series of copying operations are terminated, thus using an incremented numerical value as page data when the number of the total pages of the original documents is not set in the setting means.

According to the above-described construction, when data on the number of the total pages of original documents is inputted under the page data imprinting mode (the number of total pages is inputted, for example, by a key operation), a numerical value is decremented from the number of the total pages of the original documents each time a series of copying operations with respect to one original document are terminated. Thus, the decremented value is used as page data.

When data on the number of the total pages of original documents is not inputted, a numerical value is incremented from "1" each time a series of copying operations with respect to one original document are terminated. Thus, the incremented value is used as page data.

That is, the method for changing page data is determined according to whether or not the number of the total pages of original documents is inputted.

Since two different methods for inputting data are not provided in performing a copying operation, no erroneous copying operation occurs.

According to another preferred embodiment, a copying apparatus having the following constructions is provided.

The copying apparatus for imprinting page data and the image of an original document on a copy sheet comprises image forming means for forming the image of each of the original documents on the copy sheet; page data imprinting means for imprinting on the copy sheet page data and the image of each of the original documents formed by the image forming means; selecting means for selecting a mode for imprinting page data using the page data imprinting means; setting means; page data controlling means for decrementing "1" from the number of the total pages of the original documents inputted as an initial value each time a series of copying operations are terminated, thereby using a decremented numerical value as page data when the number of the total pages thereof is set in the means for setting the number of the total pages thereof; and display means for displaying an order of supplying the original documents supplied to an original document setting table either ascendingly or descendingly when the page data imprinting mode is selected by the selecting means.

According to the above-described construction, when the total page mode of original documents is set (the number of the total pages thereof is inputted by a key on the operation panel of the copying apparatus), a numerical value is decremented from the number of the total pages thereof inputted as an initial value each time a series of copying operations with respect to one original document are terminated. Thus, the decremented value is used as page data.

Further, under the total page mode, a display that the last page of the original documents should be supplied first is made.

Therefore, an operator does not make a mistake of supplying original documents in an erroneous order.

According to another preferred embodiment, a copying apparatus having the following constructions is provided.

The copying apparatus for imprinting page data and the image of an original document on a copy sheet comprises image forming means for forming the image of each of the original documents on the copy sheet; page data imprinting means for imprinting on the copy sheet page data and the image of each of the original documents formed by the image forming means; selecting means for selecting a mode for imprinting page data using the page data imprinting means; jam reset means for resetting a jammed condition which has occurred while the image forming means is operating; numerical inputting means; page data storing means for using a numerical value inputted by the numerical value inputting means as imprinting page data; and page data reset means for allowing a numerical value reset means to reset page data after the jammed condition is reset by the jam reset means under the page data imprinting mode selected by the selecting means.

According to the above-described construction, if a jam occurs while a copying operation is being performed in the page data imprinting mode, a mode for inputting the initial value of page data is set after a jam reset is carried out.

Accordingly, an operator can set the initial value of page data in resuming a copying operation in view of various conditions such as a jam-occurrred place, the kind of the jammed copy sheet, the time when the jam has occured, and whether or not a multi-copying operation (the image of one original document is copied on a plural number of copy sheets) is performed.

According to another preferred embodiment, a copying apparatus having the following constructions is provided.

The copying apparatus for imprinting page data and the image of an original document on a copy sheet comprises image forming means for forming the image of each of the original documents on the copy sheet; page data controlling means for generating page data to be copied on each of copy sheets corresponding to each of the original documents; page data imprinting means for imprinting on the copy sheet page data and the image of each of the original documents formed by the image forming means; page data imprinting mode selecting means for selecting a mode for imprinting page data using the page data imprinting means; composite copy selecting means for selecting a composite copy mode in which different images are compositely formed on the same face of a copy sheet by a plural copying operation. The above-described page data controlling means includes means for selecting a mode for generating page data for each of the original documents when the page data imprinting mode is selected and the composite copy mode is not selected and a mode for generating page data for each of copy sheets subjected to the composite copy operation when both the page data imprinting mode and the coposite copy mode are selected.

Accordingly to the above-described construction, a counting for generating page data under the composite copy mode is performed when copy sheets are supplied from a normal sheet supply entrance not when copy sheets are supplied from a sheet re-supply entrance.

That is, the sheet counter counts "1" upon termination of each of the coposite copy operations.

Thus, the number of original documents is not counted but the number of copy sheets is counted under the composite copy mode.

Accordingly, the numerical value thus counted is used as reference data for generating page data.

According to another preferred embodiment, a copying apparatus having the following constructions is provided.

The copying apparatus for imprinting page data and the image of an original document on a copy sheet comprises original document feeding means for sequentially feeding original documents set on an original document setting tray to an original document setting table from the last page of original documents and sequentially collecting the original documents from the original document setting table; image forming means for forming on the copy sheet the image of each of the original documents supplied to the original document setting table; page data imprinting means for imprinting on the copy sheet page data and the image of each of the original documents formed by the image forming means; setting means for setting the number of the total pages of original documents; deciding means for deiciding whether or not original documents are set in the setting means; selecting means for selecting a mode for imprinting page data using the page data imprinting means; and warning means for giving a warning when the page imprinting mode is selected by the selecting means and when the deciding means decides that original documents are not set in the means for setting the number of the total pages of original documents.

According to the above-described construction, when the page data imprinting mode is set with an ADF or an RDH employed, an operator is informed to input the number of the total pages of original documents if the number of the total pages thereof has not been determined.

Owing to this construction, page data is not imprinted unless the number of the total pages of original documents is determined, i.e., unless page data is inputted to the page imprinting means.

According to another preferred embodiment, a copying apparatus having the following construction is provided.

The copying apparatus comprises original document feeding means for sequentially feeding original documents set on an original document setting tray to an original document setting table from the last page of original documents and sequentially collecting the original documents from the original document setting table; image forming means for forming on the copy sheet the image of each of the original documents supplied to the original document setting table on a copy sheet; page data imprinting means for imprinting on the copy sheet page data and the image of each of the original documents formed by the image forming means; setting means for setting the number of the total pages of original documents; deciding means for deciding whether or not original documents are set in the setting means; selecting means for selecting a mode for imprinting page data using the page data imprinting means; and cancelling means for cancelling the page data imprinting mode when the page imprinting mode is selected by the selecting means and when the deciding means decides that original documents are not set in the setting means.

According to the above-described construction, when the page data imprinting mode is set with an ADF or an RDH employed, the page data imprinting mode is cancelled if the number of the total pages of original documents has not been determined.

Owing to this construction, page data is not imprinted unless the number of the total pages of original documents is determined, i.e., unless page data is inputted to the page imprinting means.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1-II a schematic illustration showing a copying apparatus in accordance with a fourth embodiment of the present invention;

FIGS. 7-II, 7-II, 7-III, and 7-IV are flowcharts showing a page counting routine contained in the analyzing routine in accordance with the first through fourth embodiments, respectively;

FIG. 8-I is a flowchart showing a total page mode checking routine contained in the analyzing routine in accordance with the first and third embodiments;

FIG. 8-II is a flowchart showing a page mode check routine to be called in the analyzing routine in accordance with the second and fourth embodiments;

FIG. 9-I is a flowchart showing a page mode reset check routine contained in the analyzing routine in accordance with the first through third embodiments;

FIG. 9-II is a flowchart showing a page mode reset check routine contained in the analyzing routine in accordance with the fourth embodiment;

FIGS. 10A, 10B, 10C, and 10D-(1) and 10D-(2) are flowcharts showing key-input processing routines contained in the main routine of the host CPU in accordance with the first embodiments, FIGS. 10A and 10B also showing the same of the second through fourth embodiements;

FIGS. 10E-(1) and 10E-(2) and 10F-(1) and 10F-(2) are flowcharts showing key-input processing routines contained in the main routine of the host CPU in accordance with the second embodiment;

FIGS. 10K, 10L, and 10M-(1) and 10M-(2) are flowcharts showing key-input processing routines contained in the main routine of the host CPU in accordance with the fourth embodiment;

FIGS. 11-I, 11-II, 11-III, and 11-IV are flowcharts showing a copy start routine to be called in the main routine of the host CPU;

FIGS. 14-I(a–e), 14-II(a–f and i,ii,iii,iv nd v), 14-III(a–f), and 14-IV(a–f) are illustrations showing the patterns of a liquid crystal display on the operation panel in accordance with the first through fourth embodiments, respectively;

FIG. 15-II is a flowchart showing the main routine of an imprinting control CPU in accordance with the second and fourth embodiments;

FIG. 18-I is a flowchart showing a time.page bit map developing routine contained in the main routine of the imprinting control CPU in accordance with the first and second embodiments;

FIGS. 18-IIA and 18-IIB are flowcharts showing time.page bit map developing routines contained in the main routine of the imprinting control CPU in accordance with the third embodiment;

FIGS. 18-III is a flowchart showing time.page bit map developing routines to be called in the main routine of the imprinting control CPU in accordance with the fourth embodiment;

FIG. 20-I is a flowchart showing a timer interruption routine in accordance with the first through third embodiment;

FIGS. 20-IIA and 20-IIB are flowcharts showing a timer interruption routine in accordance with the fourth embodiment;

FIG. 21-I is an illustration showing the relationship between a timer interruption period and a charge condition in accordance with the first through third embodiments;

FIG. 21-II is an illustration showing the relationship between a timer interruption period and a charge condition in accordance with the fourth embodiment.

DETAILED DESCRIPTION OF THE INVENTION

Figure 2:
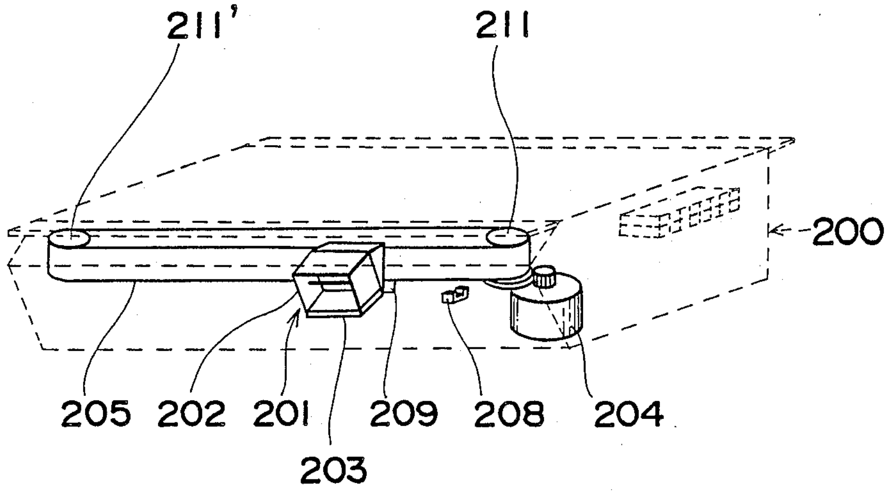
FIG. 2 is a diagram showing principal portions of the movement mechanism of an imprinting head mounted on the copy apparatus in accordance with the first through fourth embodiments.

Before the descrition of the present invention proceeds, it is to be noted that like parts are designated by like reference numerals throughout the accompanying drawings. First embodiment The first embodiment of the present invention is described with reference to FIGS. 1-I, 2, 3, 4, 5, 6, 6A, 7-I, 8-I, 9-I, 10A, 10B, 10C, 10D, 11-I, 12, 13, 14-I, 15-I 16, 17, 18-I, 19, 20-I, and 22.

Description of the whole mechanism of the copying apparatus

Figures 1, 15:
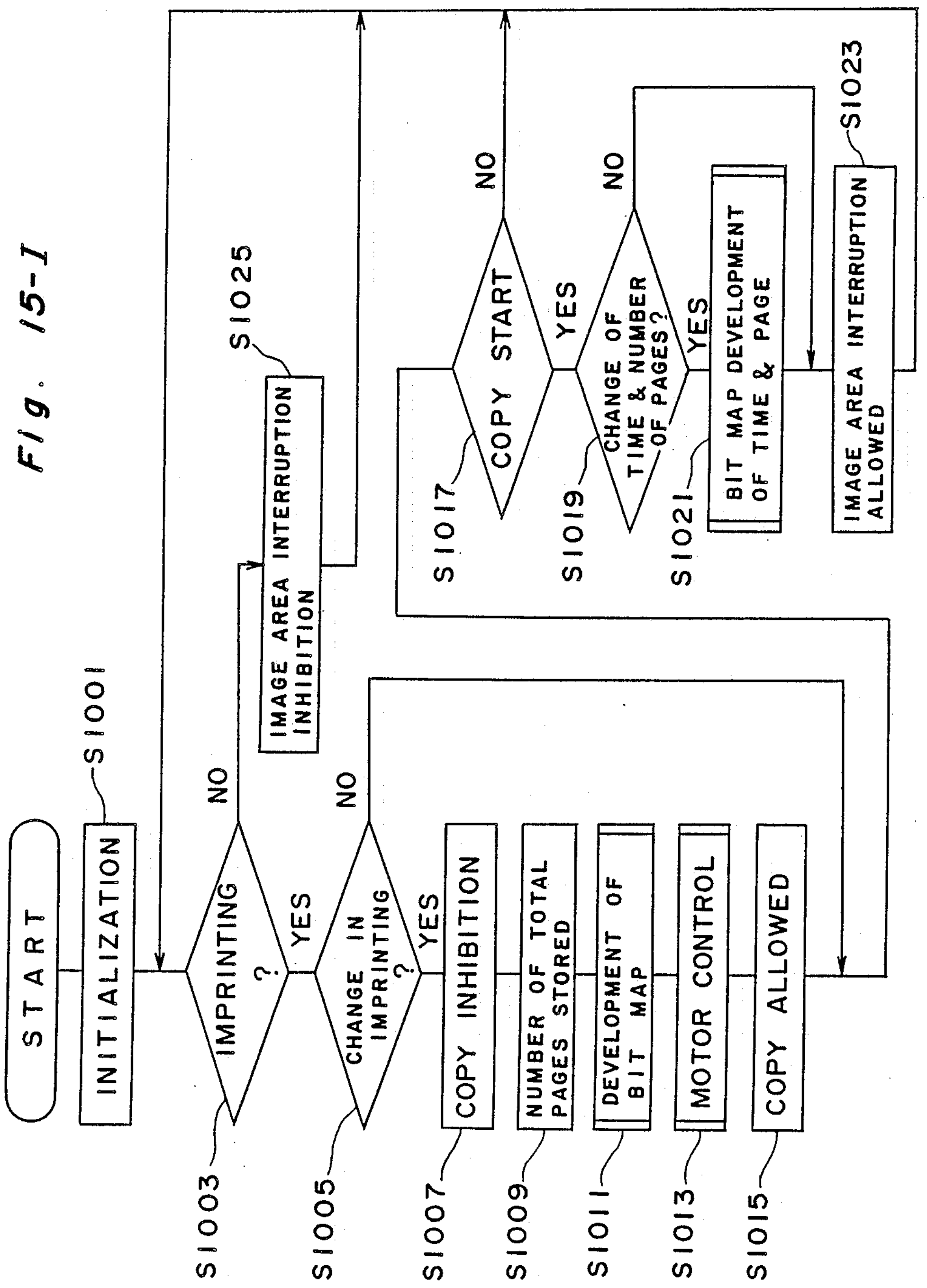
FIG. 1-I is a schematic illustration showing a copying apparatus in accordance with a first through third embodiments of the present invention.
FIG. 15-I is a flowchart showing the main routine of an imprinting control CPU in accordance with the first through third embodiment.

Referring now to the drawings, there is shown in FIG. 1-I a copying apparatus including a main body and a recirculation document handler (hereinafter referred to a RDH) in accordance with the first embodiment of the present invention.

The main body of the copying apparatus comprises an optical system 101 disposed in the upper portion thereof, an image forming arrangment 102 disiposed in the middle portion thereof, a sheet re-supply unit 103 disposed in the lower portion thereof, and a sheet supply unit 104 disposed in the lowermost portion thereof. The RDH 400 is removably mounted on an original document setting table 16.

(1) Optical system 101

First, the optical system 101 is described hereinbelow. The optical system 101 including an exposing lamp 10, a reflecting mirror 11*a*, 11*b*, 11*c*, 11*d*, and a lens 12 exposes and scans an original document set on the original document setting table 16 or an original document which is moving thereon, thus guiding a light reflected from the image of the original document to the electrophotoreceptor drum 2 of the image forming arrangement 102. Thus, an electrostatic latent image is formed on the surface of the electrophotoreceptor drum 2.

Original documents are set on the original document setting table 16 manually or under an automatic document feeding mode (hereinafer referred to as ADF mode) with the RDH mounted on the copying apparatus. A copying operation can also be effected by moving or circulating an original document. This method for performing a copying operation is hereinafter referred to as original document moving copy mode.

Under a normal copy mode, namely, the mode except an original document moving copy mode, the exposing lamp 10 and the reflecting mirror 11*a* reciprocate at a speed of V/N (V: periheral speed of the electrophotoreceptor drum 2 and N: copying magnification) along the bottom surface of the original document setting table 16. The reflecting mirror 11*b* and 11*c* reciprocate at a speed of V/2N along the bottom surface of the original document setting table 16. Thus, the original document is exposed and scanned.

Under the original document moving copy mode employing the RDH 400, the exposing lamp 10, the reflecting mirrors 11*a*, 11*b*, and 11*c* are fixed to the reference positions thereof and the original document is moved at a constant speed toward the left in FIG. 1-I along the original document setting table 16 so that the original document is exposed and scanned.

A copying magnification is set by adjusting the position of the lens 12. An image forming position is corrected by adjusting the angle of the reflecting mirror 11*d*.

(2) Image forming arrangement 102

Referring to FIG. 1-I, an image forming is accomplished in the image forming arrangment 102 by an electrophotographic process. That is, an electrostatic latent image formed on the electrophotoreceptor drum 2 is developed into a toner image which is transferred and then fixed to a copy sheet. Then, the copy sheet is discharged from the copying apparatus.

As shown in FIG. 1-I, the image forming arrangment 102 comprises electrophotoreceptor drum 2 rotatable counterclockwise in FIG. 1-I and the following members disposed in the periphery thereof: an erasing lamp7, a charger 6, a data imprinting unit 200, a developing unit 3*a* (accommodating a black toner in the embodiment), another developing unit 3*b* (accommodating the red toner in this embodiment), transfer charger 5*a*, a separating charger 5*b*, a cleaning unit 4, a belt 8 for transporting a copy sheet to which a toner image has been transferred, and a fixing unit 9 for fixing the toner image transferred to the copy sheet and transported thereto by a belt 8. The data imprinting unit 200 will be described in detail later.

A pair of timing rollers 13 transports a copy sheet supplied thereto to the space between the electrophotoreceptor drum 2 and the transfer charger 5*a* in synchronization with the rotation of the electrophotoreceptor drum 2 at a predetermined interval. Two pairs of roller 14 and 15 discharge from the image forming arrangement 102 the copy sheet to which the toner image has been fixed. According to a change-over lever 41 to be operated by a solenoid (not shown), the copy sheet is discharged from the image forming arrangement 102 either to a sheet discharge tray 36 or to a sheet re-supply tray 58 which will be described later.

(3) Sheet re-supply unit 103

The sheet re-supply unit 103 is used to carry out either of the following two copying methods: one is that an image is formed on the same side or face of a copy sheet by a two-time successive image forming process (hereinafter referred to as composite copy) and the other is that an image is formed on both sides of a copy sheet by a two-time consecutive image forming process (hereinafter referred to as both-faced copy.)

In a composite copy, a copy sheet to which a toner image has been transferred and fixed is discharged into the sheet re-supply tray 58 through a sheet transporting path 530. In the both-faced copy, a copy to which a toner image has been transferred and fixed sheet is discharged into the sheet re-supply tray 58 through the sheet transporting paths 530 and 531. That is, in the composite copy, the copy sheet is accommodated in the sheet re-supply tray 58 with the face on which the image has been copied downward, and in the both-surface copy, the sheet is accommodated in the sheet re-supply tray 58 with the face on which the image has been copied upward. Thereafter, the copy sheet is fed from the sheet re-supply tray 58 and then transported to a pair of the timing roller 13 through the sheet supply path 540. Then, the copy sheet is supplied at a predetermined timing to the space between the electrophotoreceptor drum 2 and the transfer charger 5*a*. Thereafter, as described previously, a toner image is transferred to the copy sheet and the toner image transferred thereto is fixed. In performing the composite copy, the face on which the image has been formed faces the electrophotoreceptor drum 2. In carrying out the both-surface copy, the face on which the image has been formed faces the transfer charger 5*a*. *(*4) Sheet supply unit 104

The sheet supply unit 104 has an upper sheet supply tray 42 and a lower sheet supply tray 43 which accommodate copy sheets of different sizes. Each of copy sheets accommodated in the trays 42 or 43 is fed therefrom by the sheet supply roller 18 or the sheet supply roller 19 is transported to a pair of the timing rollers 13 of the image forming arrangement 102 by an automatic sheet supply mechanism. Thereafter, the copy sheet is transported to the gap between the electrophotoreceptor drum 2 and the transfer charger 5*a* in response to the predetermined timing signal outputted from the optical system 101 or the RDH 400 and in synchronization with the rotation of the electrophotoreceptor drum 2. Consequently, the toner image is transferred thereto.

(5) Recirculation document handler (RDH) 400

The recirculation document handler (RDH) 400 removably mounted on the original document setting table 16 serves as a means for successively supplying original documents set on an original document setting tray 412 from the right side in FIG. 1-I to the original document setting tables 16 and transporting the original documents toward the left side in FIG. 1-I at a constant speed, then, collecting the original documents from the left side to the original document setting tray 412. The RDH 400 is used both in the original document moving copy mode and original document unmoving copy mode (ADF mode).

The RDH 400 transports original documents follows:

First, original documents piled one on the other on the original document setting tray 412 with the face having images thereon upward are successively fed therefrom from bottom to top to the original document setting table 16 through the sheet supply belt 420. A sensor 421 detects an original document every time the original document passes therethrough.

The original document which has passed the sensor 421 is handled in a different manner according to the original document moving copy mode and the original document unmoving copy mode (ADF mode).

(i) Original document moving copy mode

After a predetermined period of time elapses, an original document is transported from the entrance (right in FIG. 1-I) into the original document setting table 16 toward the left in FIG. 1-I along the original document setting table 16 at a constant speed due to the friction between the transporting belt 423 and the original document. During the transportation, the original document is exposed to and scanned by the exposing lamp 10.

In this copy mode, the exposing lamp 10, the reflecting mirror 11*a*, 11*b*, and 11*c* of the optical system 101 remain fixed at the reference positions thereof as described previously.

That is, in the original document moving copy mode, the image of the original document is exposed and scanned not by the movements of the members of the optical system 101 but by the movement of the original document.

Thereafter, the original document is discharged from the exit (left end portion in FIG. 1-I) by a discharge roller 425 and then collected by the original document setting tray 412 on the surface thereof.

In the original document moving copy mode, it is necessary to clarify the number of original documents before a copying operation is started to prevent excessive copy sheets from being supplied from the copy sheet supply unit 104 when the last original document has been detected by the sensor 421. This is because the period of time between the supplies of two consecutive copy sheets is very short. In view of this situation, original documents are counted by the sensor 411 by circulating original documents between the original document setting tray 412 and the original document setting table 16 without performing a copying operation.

In counting the number of original documents, the original document which is first collected by the original document setting tray 412, namely, the original document supplied therefrom to the original document setting table 16 first is not piled on the uppermost original document set on the original document setting tray 412. A lever 410 for detecting the last original document is mounted on the original docuemnt setting tray 412.

That is, the top end portion (right in FIG. 1-I) of the lever 410 is set on the uppermost original document set on the original document setting tray 412. The top end portion of the lever 410 lowers as the thickness of the original documents gradually reduces as a result of the supplied from the original document setting tray 412 to original document setting table 16. When the last original document is fed from the original document setting tray 412, the top end portion of the lever 410 is brought into contact with a sensor 411, whereby the discharge of the last original document from the original document setting tray 412 can be detected.

As will be described later, the detection of the discharge of the last original document from the original document setting tray 412 serves as the data necessary for counting the number of original documents, the partitioning of one group from another in taking a plural number of copies (hereinafter referred to as muti-copy) from one sheet of an original document, and terminating a copying operation.

As understood from the foregoing description, since the copying operation in the original document moving copy mode is performed by stopping the scanner, the period of time required for the scanner to return to its original position can be saved. Therefore, compared with the copying operation under the normal mode (original document unmoving copy mode), the interval between consecutive copying operations can be shortened, hence a high speed copying operation.

(ii) Original document unmoving copy mode (mode in which the RDH 400 is used as the automatic document feeder, namely, ADF mode)

In this mode, an original document which has passed the sensor 421 is stopped at a predetermined position on the original document setting table 16 so that the original document is scanned by traveling the scanner.

In a condition in which the original document is stoped on the original document setting table 16, the exposing lamp 10, the reflecting mirror 11*a* of the optical system 101 and the reflecting mirror 11*b*, 11*c* thereof travel at the speed of V/N AND V2N, respectively along the bottom surface of the original document setting table 16 so as to expose and scan the original document.

After the original document is exposed and scanned (after exposure and scannings corresponding to the number of copies are completed when the multi-copy is performed), the original document set at the predetermined position is fed toward the left in FIG. 1-I along the original document setting table 16 by the frictional force between the transporting belt 423 and the original document. Thereafter, the original document is discharged from the exit (left in FIG. 1-I) of the original document setting table 16 by the discharge roller 425, thus being collected by the original document setting tray 412.

(iii) The RDH 400 can be opened. That is, an operator can open the original document feeding section 405 upward to set an original document manually on the original document setting table 16.

[Data imprinting unit 200]

Referring to FIG. 2, the construction of the data imprinting unit 200 is described hereinbelow.

As shown in FIG. 2, the LED head 201 of the data imprinting unit 200 is movable in the axial direction of the electrophotoreceptor drum 2.

The LED head 201 is moved as follows : a driving pulley 211 is driven by a stepping motor 204. Thus, a belt 205 spanned between the driving pulley 211 and a driven pulley 211' is rotated.

As shown in FIG. 1-I, the LED head 201 comprising an LED array 203 and a charger 202 integrated with each other is fixed to the belt 205. Therefore, with the rotation of the belt 205, the data imprinting head 201 moves in the axial direction of the electrophotoreceptor drum 2.

A sensor 208 detects a reference position of the data imprinting head 201, namely a reference position for counting of counters CNTR1 and CNTR2 which are described later. That is, the sensor 208 detects the reference position when a light intercepting plate 209 projecting from the data imprinting head 201 intercepts a light which is to pass through the concave portion of the sensor 208.

the data imprinting unit 200 carrying the data imprinting head 201 is removably mounted on the copying apparatus and interchangeable with a developing unit.

As described previously, according to the embodiments, the data imprinting head 201 is shorter than the electrophotoreceptor drum 2 and movable so that data can be formed on any desired portions of the electrophotoreceptor drum 2. However, in accordance with the present invention, the length of the data imprinting head 201 is not limited. That is, the position of data to be formed on the electrophotoreceptor drum 2 can be set by controlling the turn-on and turn-off of the LED element even though the data imprinting head 201 may be as long as the electrophotorecptor drum 2.

[Operation panel]

Figure 3:
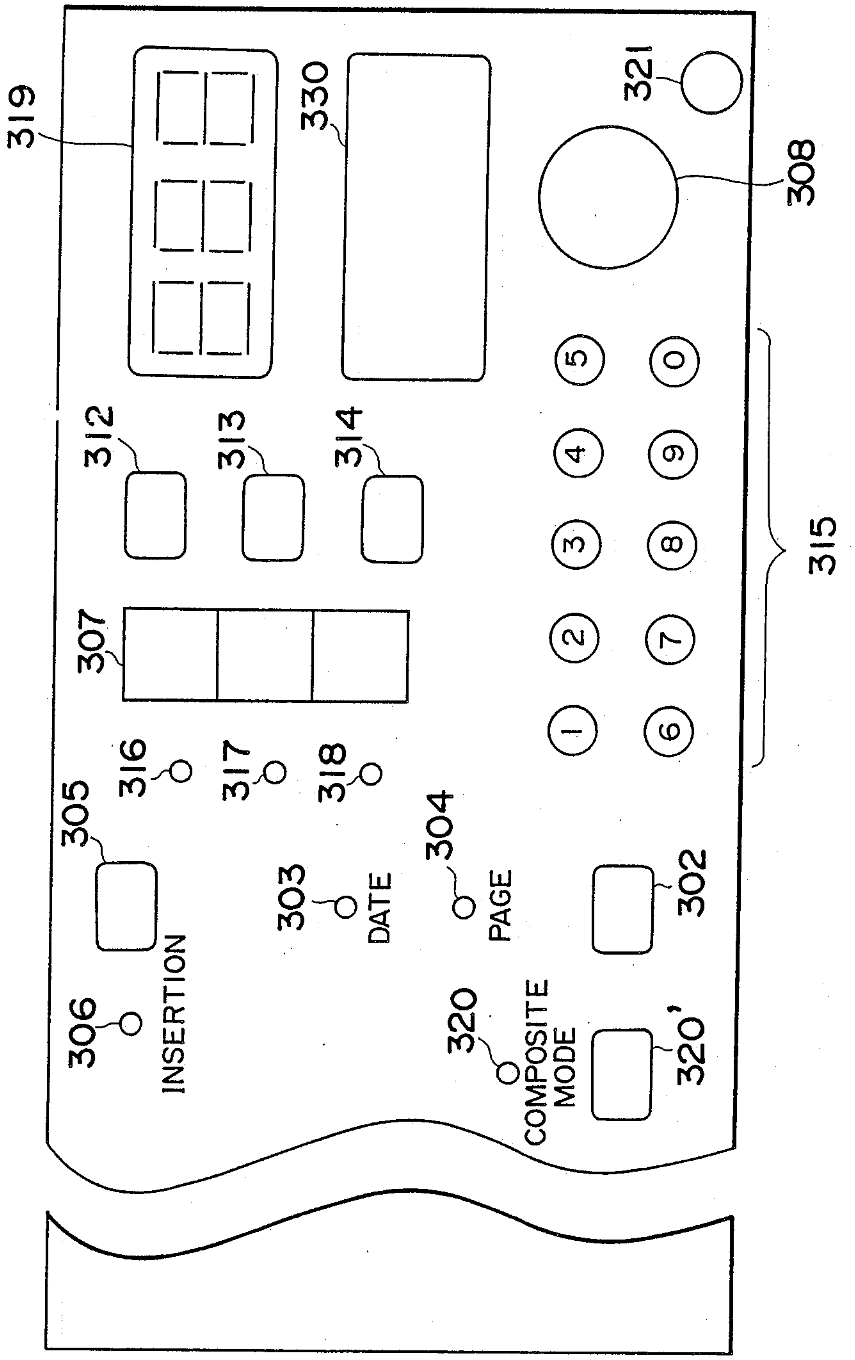
FIG. 3 is an illustration showing the operation panel of the copying apparatus in accordance with the first through fourth embodiments.

Referring FIG. 3, the operation panel of the copying apparatus is described hereinbelow.

The operation panel comprises ten-keys 315 for setting the numerical values such as the number of sheets to be copied, the number of total pages or the number of jammed pages (numerical value paginated in resuming a copying operation after a jam resetting is carried out, the detail of which is described later), an all resetting key 321 for setting all modes to the initial condition, a copy starting key 308 for instructing the start of a copying operation, a display section 319 for segmentally dislaying the numerical values such as the number of sheets to be copied or the number of total pages, an imprinting key 302 for instructing the setting of the imprinting mode of a date and/or a page, a date LED 303 for displaying that the imprinting mode of a date has been set, a page LED 304 for displaying that the imprinting mode of page has been set, an insertion key 305 for instructing the setting of an insertion mode for accepting the designation of information (data-imprinting color and total number of pages) added to imprinting data previously inputted, an inserting LED 306 for displaying that the insertion mode has been set, color designating keys 312 through 314, display LEDs 316 through 318 for displaying that the color corresponding to a color designated by the designating keys 312 through 314 has been selected, a writing space 307 for writing a color corresponding to the color designated by the color designating keys 312 through 314, and a liquid crystal display section 330 for displaying various messages regarding a page mode, a composite mode key 320' for instructing the setting and release of the composite copy mode of the main body of the copying apparatus, and a composite mode displaying LED 320 for displaying that the composite mode has been set.

The data imprinting color described above means a color to be printed on a copy sheet according to imprinting data inputted through the imprinting key 302. When the data of the number of total pages is inputted the following is printed on a copy sheet: */** in which * is a current page and ** is the number of total pages.

The color designating key 312 corresonds to a toner color accommodated in a developing unit disposed in the uppermost stage of the copying apparatus (in the embodiment, the data imprinting unit 200 is mounted uppermost instead of the developing unit). The color designating key 313 corresponds to a toner color accommodated in the developing unit *3a* disposed in the middle stage thereof. The color designating key 314 corresponds to a toner color accommodated in the developing unit *3b* disposed in the lowermost stage thereof.

[Control Circuit]

Figure 4:
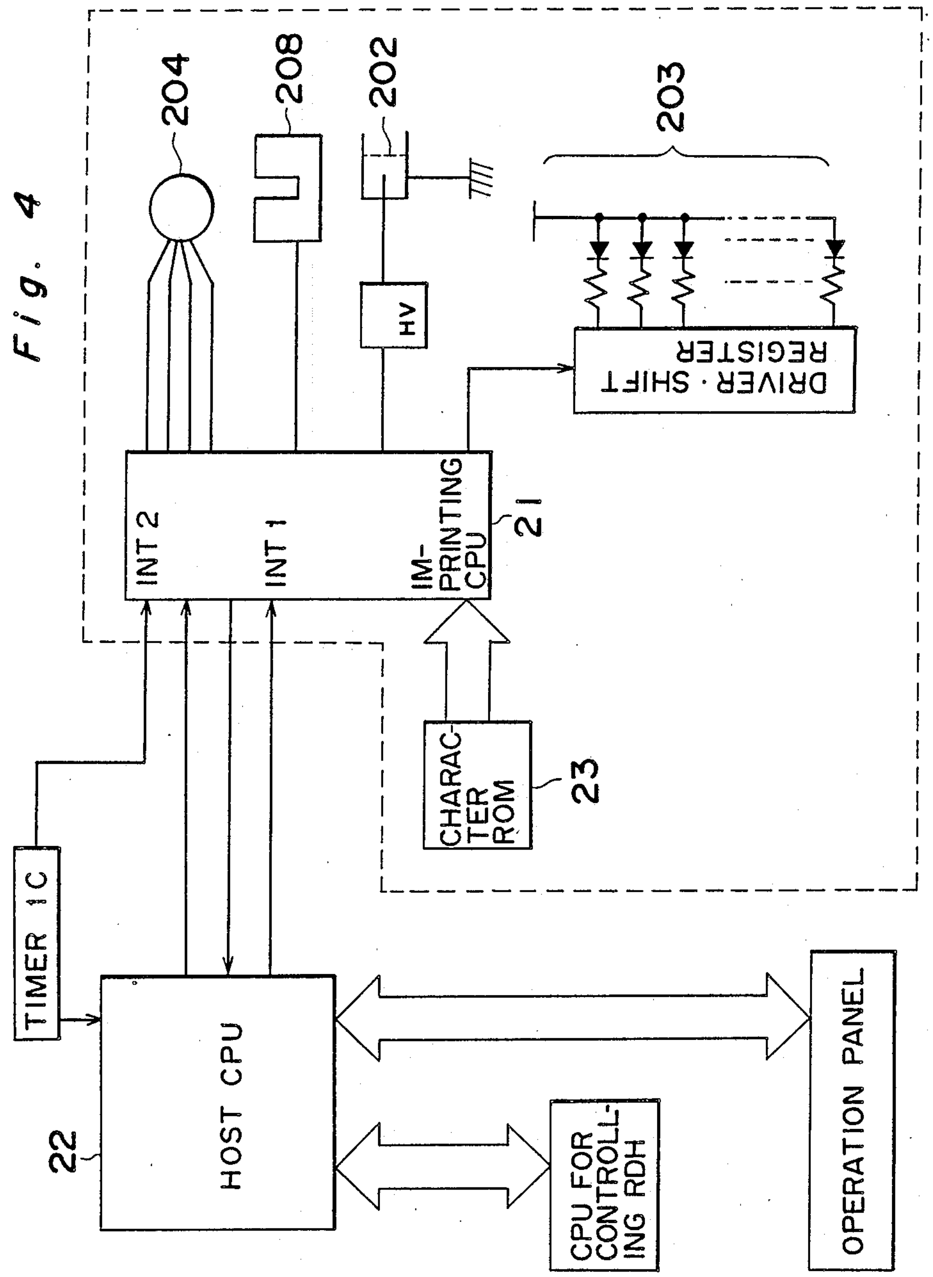
FIG. 4 is a block diagram showing a control circuit of the copying apparatus in accordance with the first through fourth embodiments.

The construction of the control circuit of the copying apparatus is described hereinbelow referring to FIG. 4.

the control circuit essentially comprises a host CPU 22 for controlling the operation of the copying apparatus and a data imprinting CPU 21 for controlling the data imprinting unit 200.

The following data and signals are inputted to the host CPU 22: signals produced by the pressing of keys of the operation panel, time data outputted from a timer IC, timing data outputted from the imprinting CPU 21, data (mode data such as the original document moving copy mode) outputted from a CPU which controls the RDH 400, and signals outputted from unshown various sensors disposed in the copying apparatus.

The following data and signals are outputted from the host CPU 22: a display signal to the operation panel, imprinting data (position data, image data or the like) to the imprinting CPU 21, an image area interruption request signal to the imprinting CPU 21, a signal to the CPU which controls the RDH 400, control signals to the controller provided with unshown various members (scanner, developing units, fixing unit or the like) disposed in the copying apparatus.

The following data and signals are inputted to the imprinting CPU 21: a signal outputted from the host CPU 22, a timer interruption request signal outputted from the timer IC, font data outputted from a character ROM 23, and a reference position data outputted from a photosensor 208.

The following data and signals are outputted from the imprinting CPU 21: signal to the host CPU 22, a drive control signal to the stepping motor 202, a drive control signal to the charger 202, and ON/OFF data to the driver of the LED array 203.

[Processing performed by Central Processing Units]

The operation of the apparatus as described above is described hereinbelow based on the processings to be executed by the CPUs.

(A) Outline (1) Main routine of the host CPU 22

Figure 5:
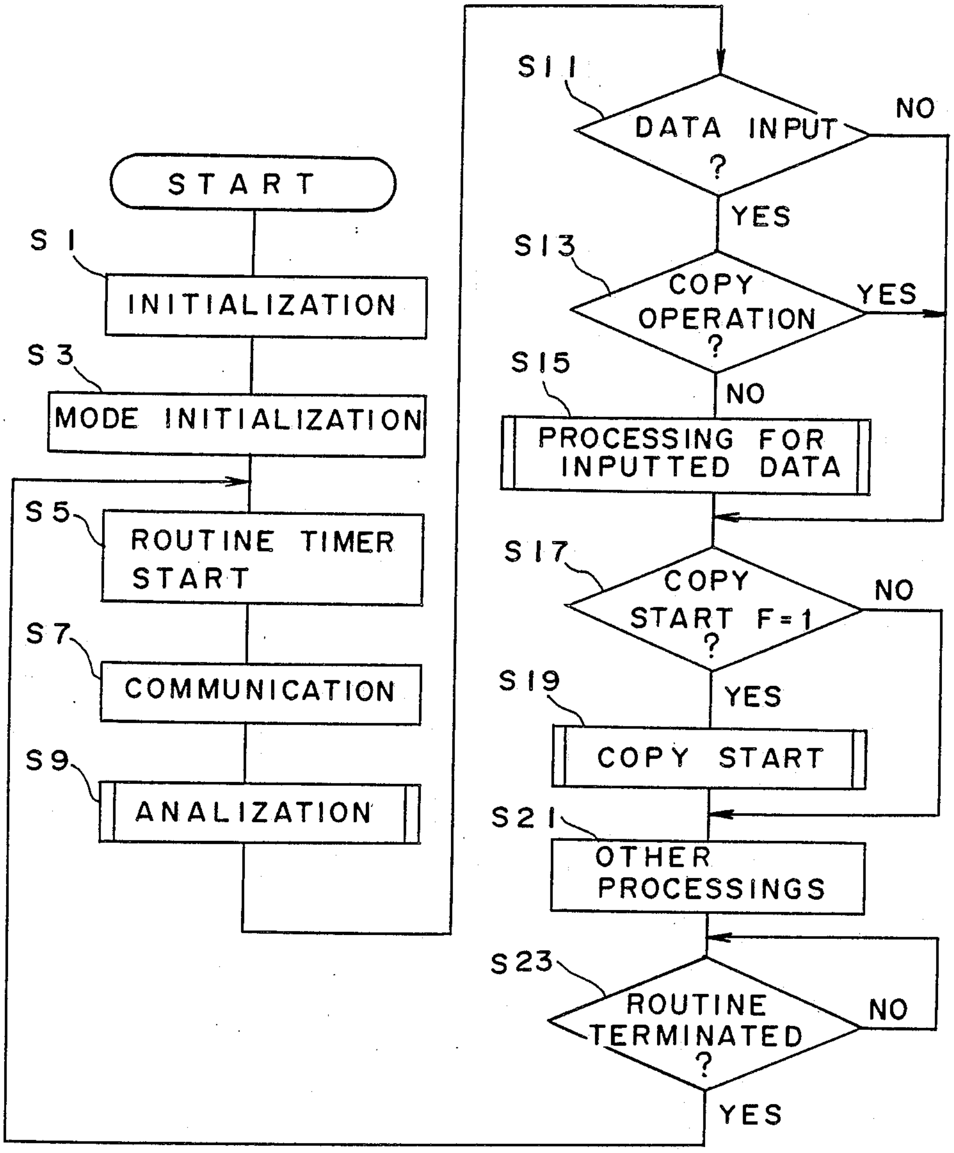
FIG. 5 is a flowchart showing the main routine to be processed by a host CPU in accordance with the first through fourth embodiments.

FIG. 5 is a flowchart showing the main routine of the processing to be executed by the host CPU 22. Before describing the flowcharts, "ON edge" is defined. The "ON edge" means the changes of the conditions or switches, sensors, signals and the like, namely, from OFF to ON.

The CPU 22 initiates the execution of processings by the turn-on of the power switch, thus initializing register flags and the like at step S1 and respective modes at step S3.

At step S5, a routine timer which sets the period of time of one routine is started.

At step S7, the CPU 22 executes a data communication with the data imprinting CPU 21. At step S9, an analyzing routine is executed.

If any key on the operation panel is pressed at step S11 and if it is detected at step S13 that a copying operation has not started yet, the program goes to step S15 at which a routine for processing data imputted through the key is executed.

If it is detected at step S17 that a copy start flag is set to carry "1", a copy start routine for starting a copying operation is executed at step S19.

At step S21, other processings are executed. The detailed descriptions of the other processings are omitted because these processings are not directly relevant to the gist of the present invention.

At step S23, the CPU 22 waits for the termination of the execution of the routine timer, then the program returns to step S5 so as to repeat the executions of the processings described above.

The detailed descriptions of the analyzing routine (step S9), the routine for processing data inputted through keys (step S15), and the copy start routine (step S19) are made later.

(2) Main routine of the imprinting CPU 21

FIG. 15-I is a flowchart showing the main routine of the processing to be executed by the data imprinting control CPU 21.

The CPU 21 initiates the execution of processings by the turn-on of the power switch. First, at step S1001, the CPU 21 initializes register flags and the like.

At step S1003, it is detected whether or not data is to be imprinted, i.e., whether a data imprinting mode is selected. If no, at step S1003, CPU 21 is disabled for the image area interruption request which controls the start timing of a data imprinting at step S1025. Thereafter, the program returns to step S1003.

If yes at step S1003, the program goes to step S1005.

At step S1005, it is detected whether or not imprinting data and imprinting position data are changed.

If no at step S1005, the program jumps step S1007 through step S1015, thus going to step S1017.

If yes at step S1005, a processing corresponding to the change is executed through step S1007 through step S1015.

That is, at step S1007, the CPU 21 inhibits the execution of a copying operation and at step S1009, stores the data on the number of total pages transmitted from the host CPU 22. Next, at step S1011, a bit map of fixed imprinting data is developed at step S1011. At step S1013, a motor control routine for controlling the position of the data imprinting head 201 is executed. Thereafter, at step S1015, a copying operation is permitted.

It is detected at step S1017 whether or not a copying operation for an individual original document can be started.

If no, the program jumps step S1019 through S1023, thus returns to step S1003.

If yes, it is detected at step S1019 whether or not imprinting time data and page number data are changed. If yes, the bit map development of the changed data is executed at step S1021.

Thereafter, the image area interruption is allowed at step S1023, then the program returns to step S1003.

The bit map developing routine (step S1011), the motor controlling routine (step S1013), and the routine (S1021) for developing time-page data (step S1021) are described in detail later.

(B) Detailed descriptions of respective subroutines

<1> Subroutine of host CPU 22 (1) Analyzing routine (step S9)

Figure 6:
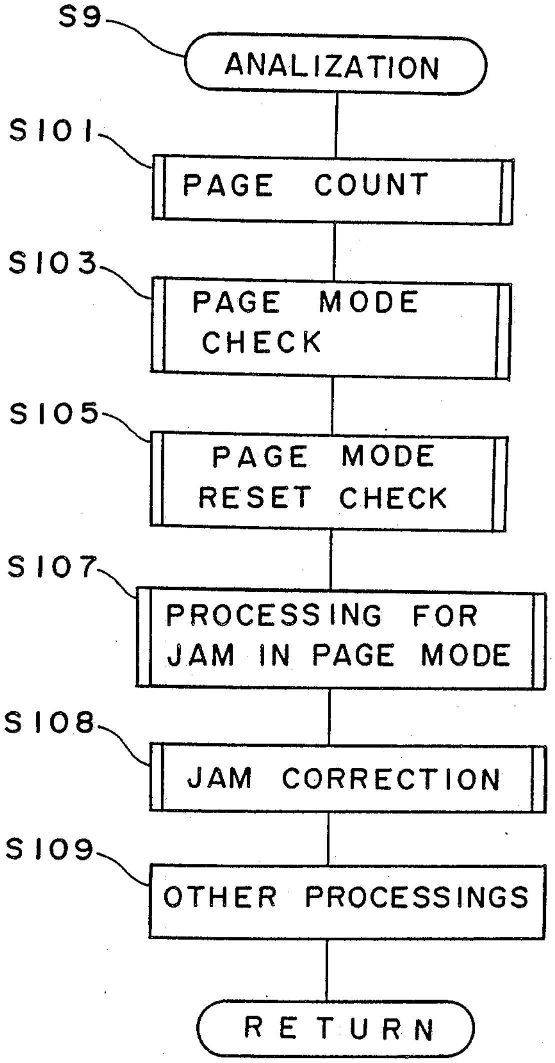
FIG. 6 and 6A are flowcharts of an analyzing routine contained in the main routine of the host CPU in accordance with the first through fourth embodiments.

FIG. 6 is a flowchart of an analyzing routine (step S9) contained in the main routine of the host CPU 22.

In this routine, processings in the page data imprinting mode is executed based on data received at step S7 as a result of the communication executed with the CPU 21 at step S7.

That is, the following routines are executed: a page counting routine for managing a page number to be imprinted (step S101); a page mode checking routine for managing the input of the number of total pages (step S103); a page mode reset checking routine (step S105) for resetting the page data imprinting mode when the copying of designated number of pages is terminated; a page mode jam processing routine (step S107) for managing page data after a processing for a jam is completed under the page data imprinting mode; a jam correcting routine (S108) for managing page data after a jam processing is executed in the page data imprinting mode; and a jam correction routine (step S108) for managing page data after a processing for a jam is executed in the page data imprinting mode. In addition to these routines, the analyzing routine executes other processings.

Figure 6B:
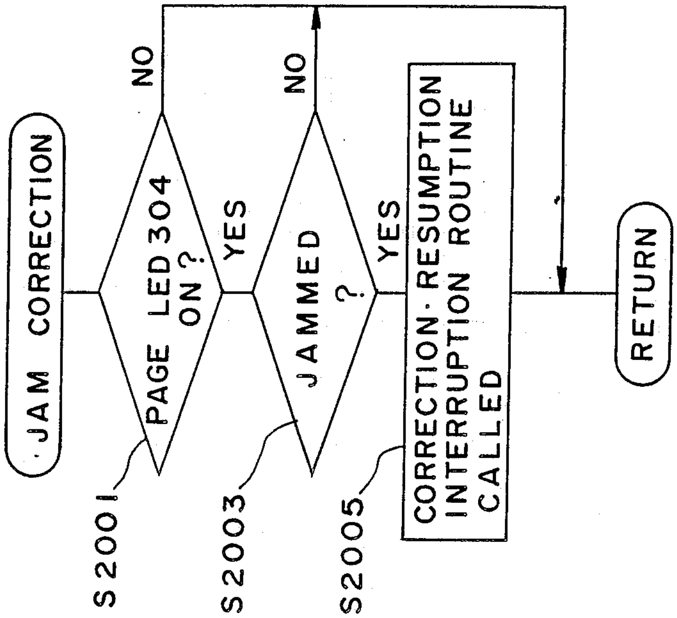
FIG. 6B is a flowchart showing a jam correcting routine contained in an analyzing routine in accordance with the second embodiment.
Figure 6A:
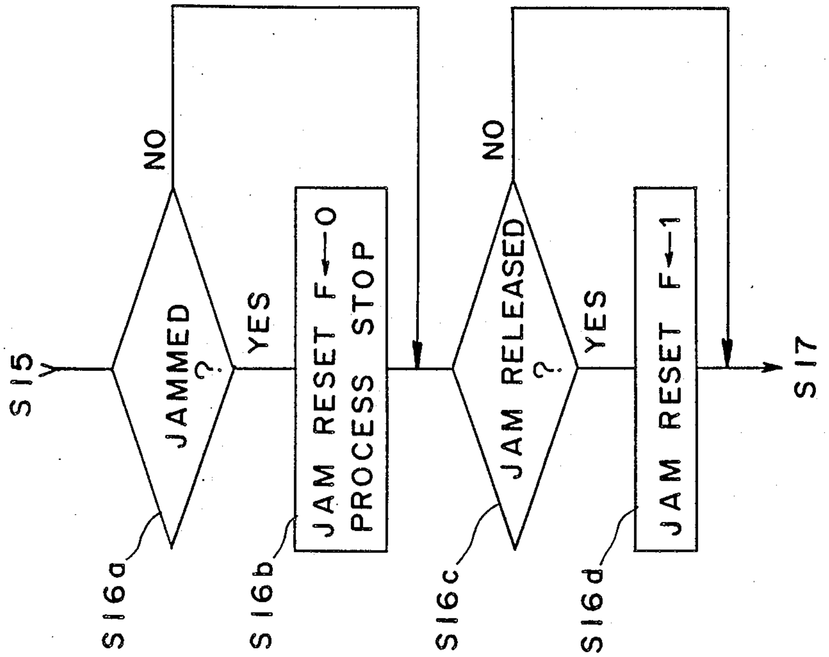

Step S16*a* through step S16*d* in FIG. 6A show the subroutine of step S107 at which the processing for the jam in the page mode is executed. If it is detected at step S16*a* that a jam occurs, the program goes to step S16*b* at which at jam reset flag is reset to "0" so as to stop the processing. It is detected at step S16*c* whether or not the jam is released. If yes, the jam reset flag is set to "1 1" at step S16*d*. Since the jam detecting and jam releasing means of the copying apparatus are known, the descriptions thereof are omitted.

The detailed descriptions of the page counting routine (step S101), the page mode checking routine (step S103), and the page mode reset checking routine (step S105) are made hereinbelow.

<Page counting routine (step S101)>

FIG. 7-I is a flowchart showing the page counting routine contained in the analyzing routine (step S9).

The page number to be imprinted in the page mode is controlled in this page counting routine. If the page number is controlled by the host CPU 22 under the original document moving copy mode, a data transfer speed cannot be accomplished at a high speed. Accordingly, the page number to be imprinted is controlled by the data imprinting control CPU 21 which is described later.

First, it is detected at step S201 whether or not the page LED 304 in ON.

If the page LED 304 is not ON, that is, the page data imprinting mode is not selected, the program returns to the analyzing routine (step S9) without executing this routine.

If yes, that is, if the page data imprinting mode is selected, the program goes to step S203 at which it is detected whether or not the number of total pages is changed, i.e., it is detected whether or not new data of the number of total pages is inputted or the number of total pages is established by counting the number of original documents when the RDH 400 is used, which is described later.

If yes, the changed number of total pages is substituted into an internal variable PAGE at step S213. Then, the program goes to step S215 at which the transfer of the PAGE data is executed.

If no, the program goes to step S205 at which it is detected at step S205 whether or not the original document moving copy mode is selected employing the RDH 400.

If no, the program goes to step S207 at which it is detected whether or not a copy sheet has passed the timing roller 13.

If yes, the program goes to step S207 at which it is detected whether or not the copy sheet which has passed the timing roller 13 is the last sheet of original documents to be copied.

If yes, the data of the internal variable PAGE is decremented at step S211. Then, the program goes to step S215 at which the transfer of the PAGE data is executed.

On the other hand, if it is detected at step S205 that the original document moving copy mode is selected or it is detected at step S207 that a copy sheet does not pass the timing roller 13 or it is detected at step S209 that the multi-copying operation is not terminated, the program returns to the analyzing routine (step S9).

<Total page mode check routine (step S103)>

FIG. 8-I is a flowchart showing a total page mode check routine contained in the analyzing routine (step S9).

First, at step S301, it is detected whether or not the page LED 304 is ON.

If no, i.e., if the page data imprinting mode is not selected, the program goes to step S317 at which the liquid crystal display 330 (refer to FIG. 14-I) is turned off. Then the program returns to step S9.

If yes, i.e., if the page data imprinting mode is selected, the program goes to step S303 at which it is detected whether or not a flag indicating that the number of total pages is inputted is reset to "0".

If it is decided that the flag is set to "1", the program goes to step S317 at which the liquid crystal display 330 is turned off. Then, the program returns to step S9.

If it is decided that the flag is reset to "0", i.e., if the number of the total pages is not established, the program goes to step S305 at which it is detected whether or not the mode for using the RDH 400 is used.

If no, the display pattern (a) (refer to FIG. 14-I) is displayed on the liquid crystal display 330 of the operation panel so as to inform the operator that the number of the total page be inputted. Then, the program returns to the analyzing routine (step S9).

If it is decided at step S305 that the mode for using the RDH 400 is used is selected, the program goes to step S307 at which it is detected whether or not the mode for using the RDH is selected under the original document moving copy mode.

If yes, it is unnecessary to input the number of the total pages because in the embodiment, prior to the copying operation, the number of total pages is counted by feeding original documents from the original document setting tray 412 to the original document setting table 16 (hereinafter referred to as page number counting operation.) Thus, in this case, a display pattern (b) (refer to FIG. 14-I) is made on the liquid crystal display section 330 at step S309. Then, the program returns to the analyzing routine (step S9).

If no, i.e., if it is decided that the RDH 400 is used in ADF mode, the page LED 304 which displays the page data imprinting mode is selected is turned off at step S311 so as to cancel the page imprinting mode because the imprinting of page data cannot be executed in the embodiment. At step S313, a display pattern (d) (refer to FIG. 14-I) is displayed on the liquid display section 330 so as to inform the operator that the page imprinting mode has been cancelled and that the original document moving copy mode be selected. Thereafter, the program returns to the analyzing routine.

As described above, in the embodiment, the page number counting operation is preformed in the original document moving copy mode so as to count the number of pages of the original documents. Therefore, it is detected at step S307 whether or not the original document moving copy mode is selected. In performing a copying operation in the original document moving copy mode, if an operator desires to selectively set "a mode for counting the number of original documents by performing the page number counting operation prior to the copying operation (mode (A))" or "a mode for carrying out a copying operation by feeding original documents from the original document setting tray 412 to the original document setting table 16 without effecting the page number counting operation (mode (B)", the following is possible. At a step, it is detected whether or not mode (A) is selected. If the mode (B) is selected, the LED 304 is turned off. Then, the mode (A) is selected or the number of total pages is inputted by a key on the operation panel. This method is fundamentally based on the above-described concept.

<Page mode reset check routine (step S105)>

FIG. 9-I is a flowchart showing a page mode reset check routine contained in the analyzing routine (step S9).

In this routine, the page mode is cancelled in response to the termination of a series of copying operations under the page mode.

First, at step S401, it is detected whether or not the page LED 304 is ON.

If no, i.e., if the page data imprinting mode is not selected, the program returns to step S9 without executing this routine.

If yes, i.e., if the page data imprinting mode is selected, it is detected at step S403 whether or not the RDH is used in the original document moving copy mode.

If yes, the program goes to step S405 at which it is detected whether or not the multi-copy operation is terminated under the original document moving copy mode, i.e., it is detected whether or not the copying operation of the total number of copy sheets (number of total pages of original documents × the number of copies) is terminated. If yes, the program goes to step S411. If no at step S403, the program goes to step S407 at which it is detected whether or not flag for indicating the number of total pages has been inputted is set to "1". If yes, the program goes to step S409 at which it is detected whether or not the internal PAGE is set to "0". If yes, the program goes to step S411.

If these conditions are all satisfied, i.e., if it is admitted that a series of copying operations are terminated under the page mode, the page LED 304 is turned off at step S411 so as to reset the page mode and at step S413, a display pattern (e) (refer to FIG. 14-I) is displayed on the liquid display section 330 on the operation panel in order to inform the operator that the page mode has been reset.

After the above-described processings are terminated, the program returns to the analyzing routine (step S9).

(2) Key-inputted data processing routine (step S15)

FIG. 10A through 10D are flowcharts showing a key-inputted data processing routine (step S15) contained in the main routine of the host CPU 22.

<Flag control>

Figure 10A:
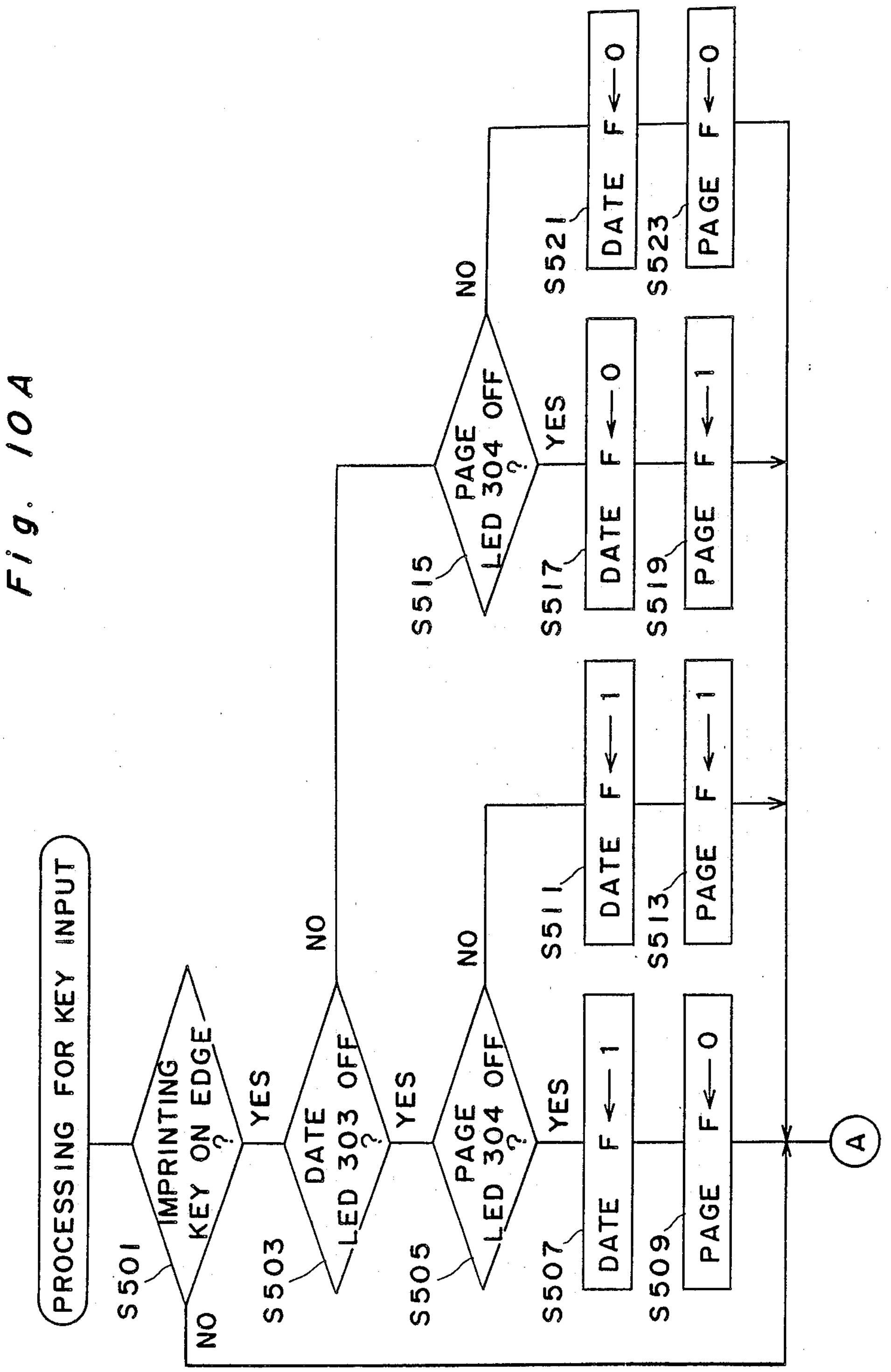

At step S501 through step S523 shown in FIG. 10A, the executions of date imprinting flag and the page imprinting flag are set or reset in response to the ON of the data imprinting key 302.

That is, when it is detected at step S501 that the imprinting key 302 is at ON edge, it is detected at step S503 whether or not the date LED 303 is OFF. At step S505 and step S515, it is detected whether or not the page LED 304 is OFF. According to the detected result, the date imprinting flag and the page imprinting flag are set or reset.

For example, if it is decided at step S503 that the date LED is OFF and that the page LED 304 is OFF at step S505, the date flag is set to carry "1" at step S507 and the page flag is reset to carry "0" at step S509.

Similarly, if it is decided at step 503 that the date LED 303 is OFF and that the page LED 304 is ON at step S505, both the date flag and the page flag are set to carry "1" at steps S511 and step S513, respectively.

Similarly, if it is detected at step S503 that the date LED 303 is ON and that the page LED 304 is OFF at step S515, the date flag is reset to carry "0" at step S517 and the page flag is set to carry "1" at step S519.

If it is decided at step S503 that the date LED 303 is ON and that the page LED 304 is ON at step S505, both the date flag and the page flag are reset to carry "0" at steps S521 and S523, respectively.

Figure 10B:
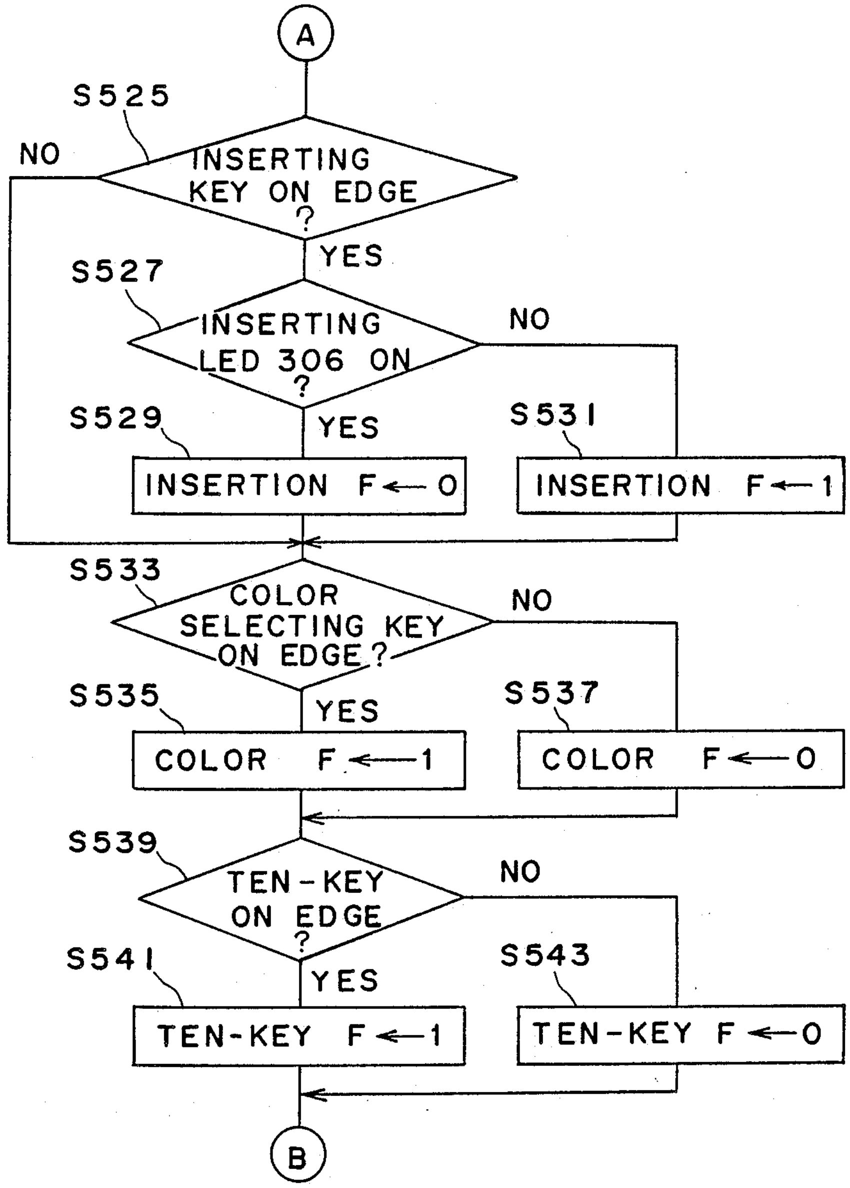

Referring to FIG. 10B, at step S525 through step S531, if the insertion mode is set at step S527 by the ON-edge of the insertion key 305, the insertion flag is reset to carry "0" at step S529. If the insertion mode is not set at step S527, the insertion flag is set to carry "1" at step S531.

In the insertion mode, additional information of imprinting data, for example, the number of total pages in the page imprinting mode is set. Whether or not the insertion mode is selected is displayed by the inserting LED 306.

At step S533, it is detected that the color selecting keys 312, 313, and 314 are at ON edges.

If it is detected at step S533 that any of the color selecting keys 312, 313, and 314 is at an ON edge S533, the color flag is set to "0" at step S535. If it is detected at step S533 that none of the color selecting keys 312 through 314 is at on ON edge, the color flag is reset to "0" at step S537.

If any color selecting key is pressed, the color flag makes an indication of the pressing thereof.

At step S539, it is detected whether or not any of the ten-keys 315 is at an ON edge.

If it is detected at step S539 that any of the ten-keys 315 is at an ON edge, the ten-key flag is set to "0" at step S541. If it is detected at step S539 that none of the ten-keys 315 is not at an ON edge, the ten-key flag is reset to "0" at step S543.

If any of the ten-keys 315 is pressed, the ten-key flag makes an indication of the pressing thereof.

<Mode control>

Figure 10C:
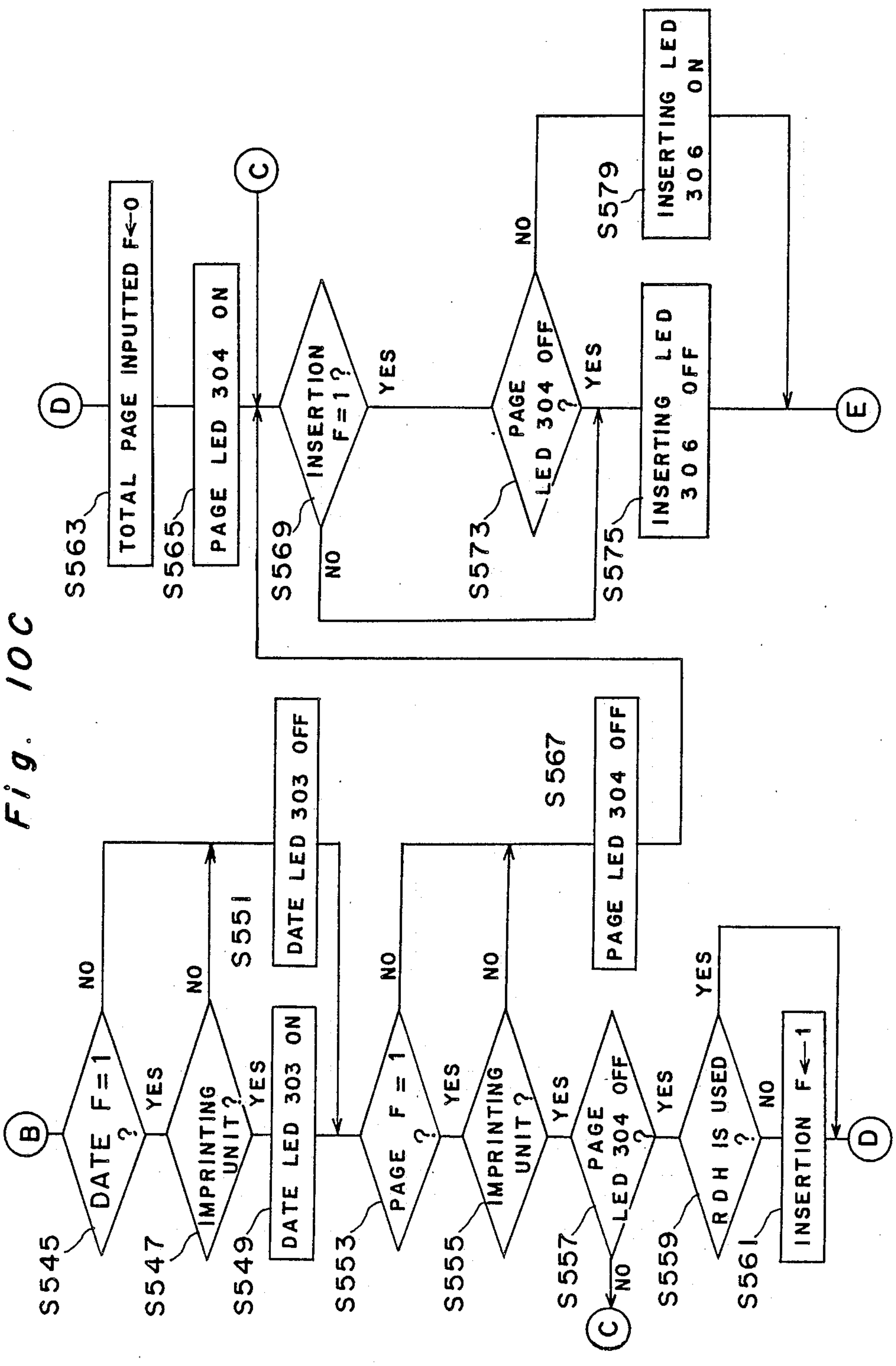
Figure 10G:
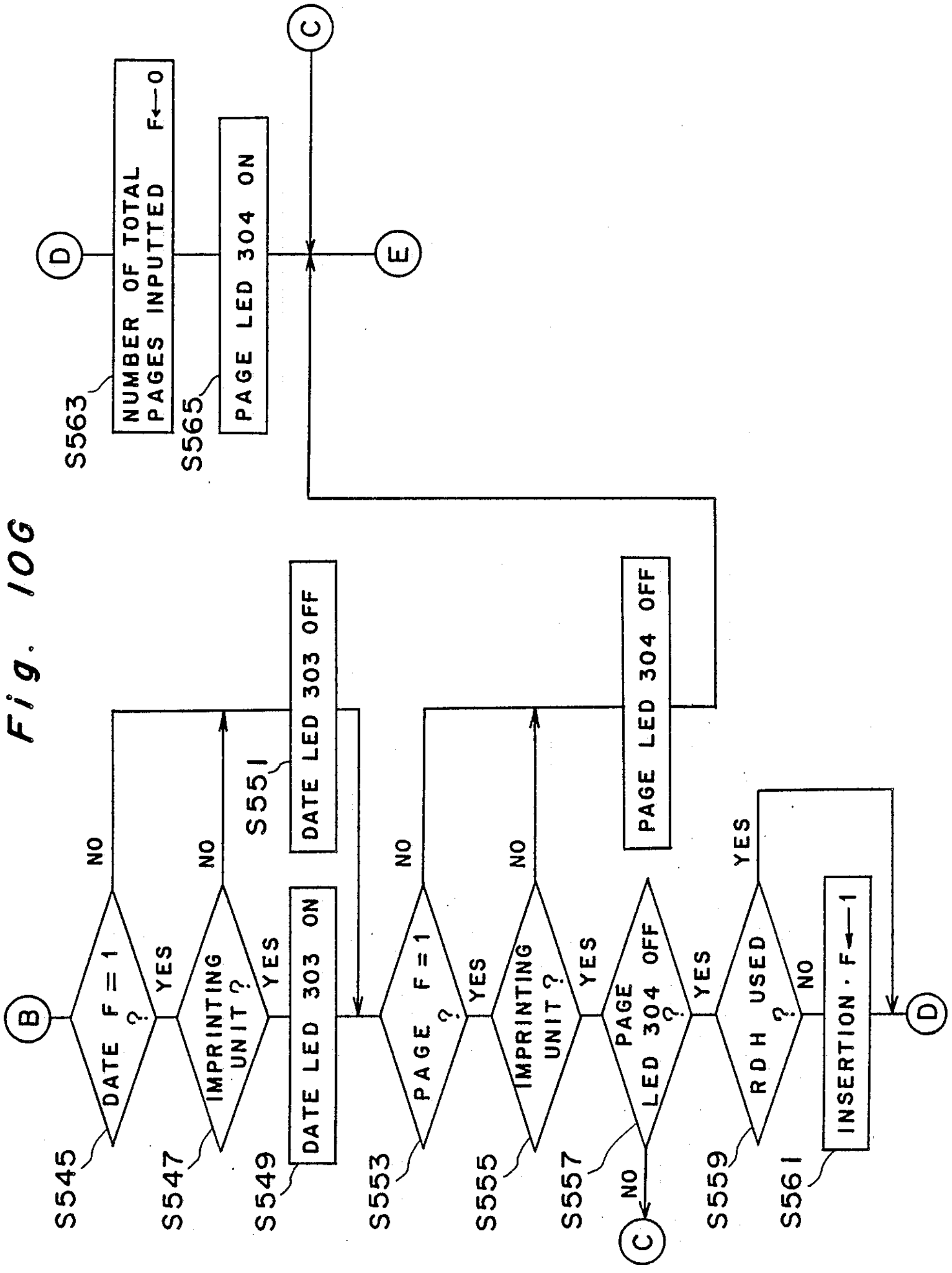
FIGS. 10G, 10H, 10I, and 10J are flowcharts showing key-input processing routines contained in the main routine of the host CPU in accordance with the third embodiment.
Figure 10H:
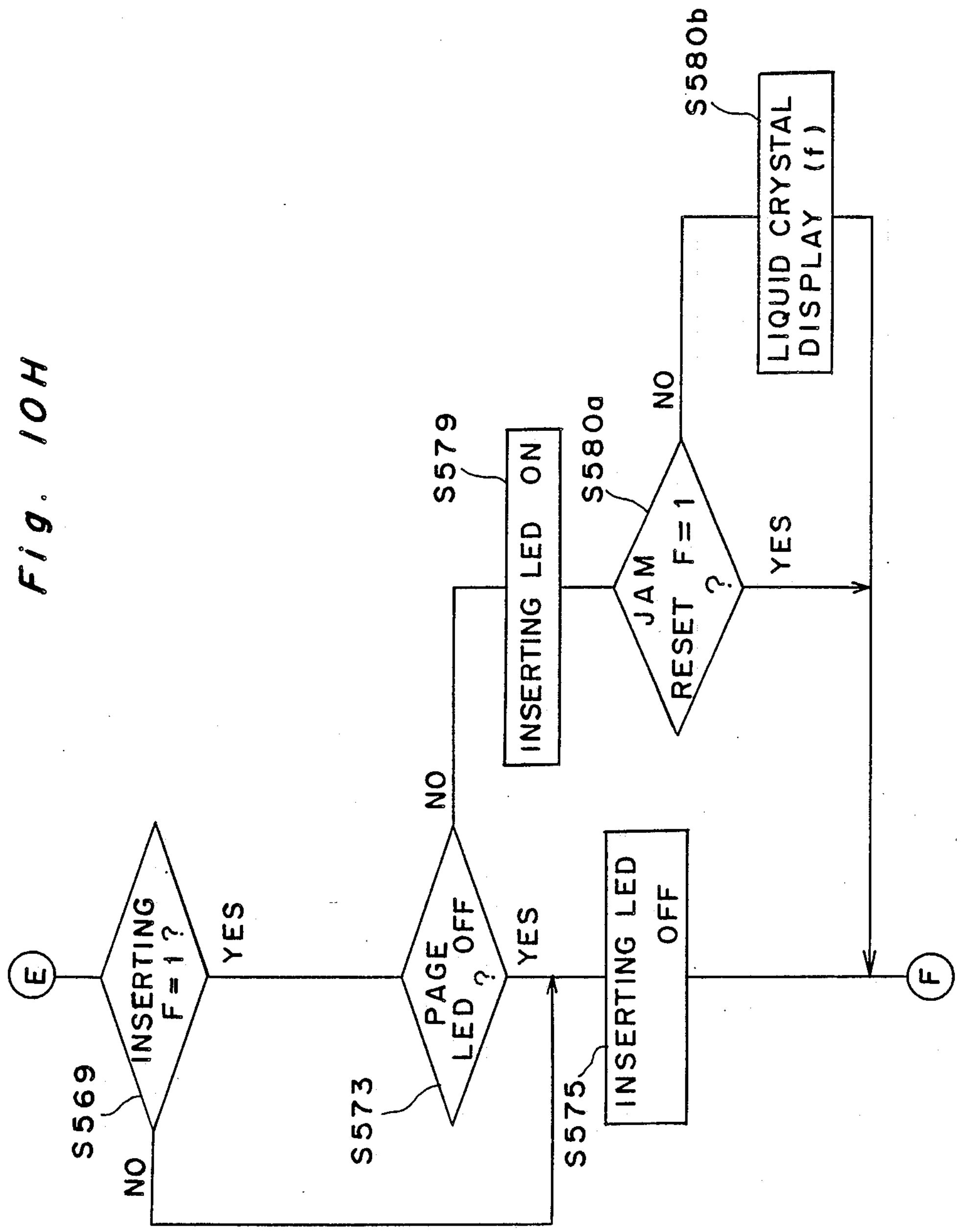

Referring to FIG. 10C, it is detected at step S545 whether or not the date flag set to "1".

If yes, the program goes to step S547 at which it is detected whether or not the data imprinting unit 200 is mounted on the copying apparatus. If yes, the date LED 303 is turned on at step S549. If the date data is selected as imprinting data, i.e., if the date imprinting mode is set, the LED 303 makes an indication of the selection.

If no at step S545 or it is detected at step S547 that the data imprinting unit 200 is not mounted on the copying apparatus, the date LED 303 is turned off at step S551.

At step S553, it is detected whether or not the page flag is set to "1".

If yes at step S553, the program goes to step S557 providing that it is decided at step S555 that the data imprinting unit 200 is mounted on the copying apparatus. At step S557, it is detected whether or not the page LED 304 is OFF. If the page number data is selected as imprinting data, i.e., if the page imprinting mode is set, the page LED 304 displays the selection.

If yes, the page imprinting mode is set. That is, it is detected at step S559 whether or not the RDH is used. If no, the insertion flag is set to carry "1" at step S561 because the data of the number of total pages is required to be inputted. Since the data on the number of total pages is not established, the flag indicating that the data of the number of total pages has been inputted is reset to "0" at step S563. Thereafter, the page LED 304 is turned on at step S565. Thus, the page imprinting mode is set.

If it is decided at step S553 that the page flag is reset to "0" or if it is decided at step S555 that the data imprinting unit 200 is not mounted on the copying, the page LED 304 is turned off at step S567 because the page data is not inputted (cannot be inputted). Thus, the page imprinting mode is cancelled.

It is detected at step S569 whether or not the insertion flag is set to "1".

If it is decided at step S569 that the insertion flag is set to "1", it is detected at step S573 whether or not the page LED 304 is OFF. If it is decided at step S573 that the page LED 304 is ON, the inserting LED 306 is turned on at step S579. The inserting LED 305 displays whether or not the insertion mode is selected.

If it is decided at step S569 that the insertion flag is set to "0" or if it is decided that the page LED 304 is OFF at step S573, the inserting LED 306 is turned off at step S575. Thus, the insertion mode is cancelled.

Referring to FIG. 10D-(1), (2), it is detected at step S583 whether the color flag is set to "1".

If yes, it is detected at step S585 whether or not a color developing unit mounted on the copying apparatus corresponds to a selected color. If yes, at step S587, the selected color is stored in the variable COPY COLOR and the display LED 316 through 318 are turned off at step S589. Then, at step S591, a display LED which corresponds to the selected color is turned on.

At step S593, it is detected whether or not the ten-key flag is set to "1".

If yes, the program goes to step S595 at which it is detected whether or not the insertion mode is set, that is, it is detected whether or not the inserting LED is ON.

If no, the inputted numerical value is stored at step S603 because the data on the number of sheets to be copied has been inputted.

If it is detected at step S595 that the insertion mode is selected, it is detected at step S597 whether or not page number data imprinting mode is selected. If yes, the inputted numerical value is stored as the number of total pages at step S599 and the flag indicating that the number of total pages has been imputted is set to carry "1" at step S601.

Thereafter, at step S605, the stored numerical value is displayed on the numerical value display section 319 as the number of total pages or the number of sheets to be copied.

<Other processings>

It is detected at step S607 whether or not the copy start key 308 for allowing the start of a copying operation is at an ON edge.

If yes, it is decided whether or not it is necessary to count the number of original documents employing the RDH 400.

That is, it is detected at step S609 whether or not the RDH is used and it is detected at step S611 whether or not the RDH is used in the original document moving copy mode. If yes, an RDH counting flag is set to "1" at step S613. According to the RDH counting flag, original documents are counted by the RDH 400.

If it is decided at step S609 that the RDH 400 is not used or if it is decided at step S611 that the RDH 400 is used in the ADF mode, the RDH counting flag is set to "0" at step S615.

Thereafter, the copy starting flag is set to "1". The copy start flag does not control the start of each of copying operations, but controls the start of series of copying operations.

At step S619 through step S623, processings to be executed in response to the input of data by keys other than the keys referred to at step S501 through step S617 are executed.

That is, if it is detected at step S619 that any key is at an ON edge, the program goes to step S621 at which it is detected whether or not the insertion mode is set. If no, a processing corresponding to data inputted by the key is executed at step S623.

After the above-described processings are executed, the program returns to the main routine.

(3) Copy start routine (step S17)

FIG. 11-I is a flowchart showing a copy start routine (step S19) contained in the main routine of the host CPU 22. As described previously, this routine is called if the copy start flag is set to "1" at step S17 and controls the start of a series of copying operations, not the start of each of copying operations.

At step S701, it is detected whether or not the RDH counting flag is reset to "0".

If yes, the RDH counting routine is executed at step S713. As will be described later, in the RDH counting routine, the page number counting operation is performed prior to a copying operation.

That the RDH counting flag is set to "0" at step S701 means the case in which the RDH 400 is not used, the RDH 400 is used in the ADF mode or the counting of the number of original documents is terminated in the RDH counting routine. If the RDH counting flag is set to "0", the program goes to step S703 at which it is detected whether or not the page LED 304 is ON.

If it is detected at step S703 that the page imprinting mode is selected, the program goes to step S705 at which it is detected whether or not the flag for indicating that the data on the number of total pages has been inputted is set to "1". If yes, a timer counting variable t1 is set to "0" at S707 and a timer for allowing a timer interruption during a copying operation is operated at step S709. Thus, "timer interruption processing during copying operation" which is described later is actuated, whereby a copy operation processing is started. Thereafter, the program goes to step S711 at which the flag for starting a copying operation is set to carry "0" at step S711. Then, at step S715. the liquid crystal display section 330 (refer to FIG. 14-I) is turned off.

If it is decided at step S705 that the flag for indicating that the number of total pages has been inputted is set to "0", that is, if the RDH 400 is not used or the data on the number of total pages is not inputted although the page data imprinting mode is selected with the RDH 400 used in the ADF mode, a pattern (c) (refer to FIG. 14-I) is displayed on the liquid crystal display section 330 of the operation panel at step S717 and the flag for starting a copying operation is set to "0" at step S719 so that the start a copying operation is cancelled.

If it is detected at step S703 that the page LED 304 is OFF, the program jumps step S705. Then, the host CPU 22 executes processings at step S707 through step S715. In this case, a copy operation is carried out without performing a data imprinting.

Thereafter, the program returns to the main routine.

<RDH counting routine (step S713)>

Figure 12:
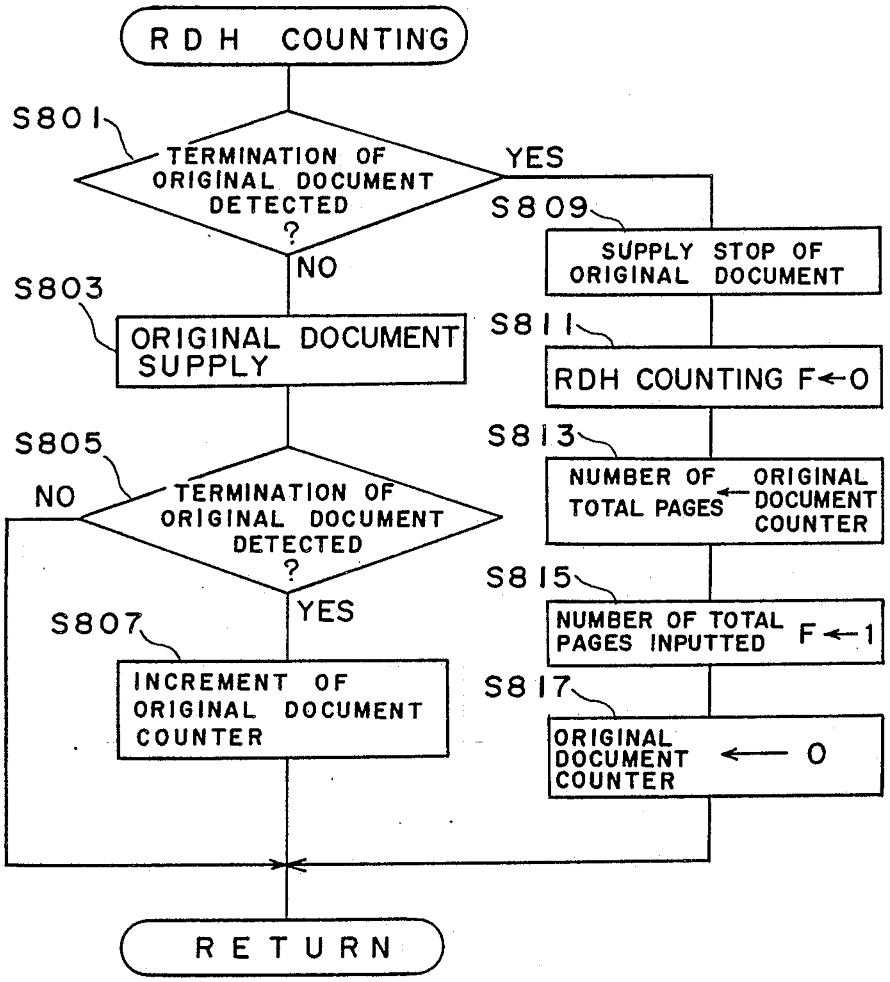
FIG. 12 is a flowchart showing an RDH counting routine contained in a copy start routine in accordance with the first through third embodiment.

FIG. 12 is a flowchart showing a RDH counting routine (step S713) contained in the copy starting routine.

It is detected at step S801 whether or not the termination of a series of copying operations is detected by the original document detecting lever 410 and the sensor 411 of the RDH 400.

If no, a subsequent original document is supplied to the original document setting table 16 at step S803. Then, the program goes to step S805 at which it is detected whether or not the rear edge of the subsequent original document is detected by the sensor 421. If yes, the original document counter is incremented at step S807.

If yes, the first sheet of the next group of original documents is not supplied at step S809. At step S811, the RDH counting flag is set to "0". At step S813, the numerical value counted by the original document counter in this routine is substituted into the variable NUMBER OF TOTAL PAGES. Then, at step S815, the flag indicating that the number of total pages has been inputted is set to "1". Thereafter, at step S817, the original document counter is reset to "0".

Thereafter, the program returns to the copy starting routine.

(4) Timer interruption routine during copying operation

Figure 13:
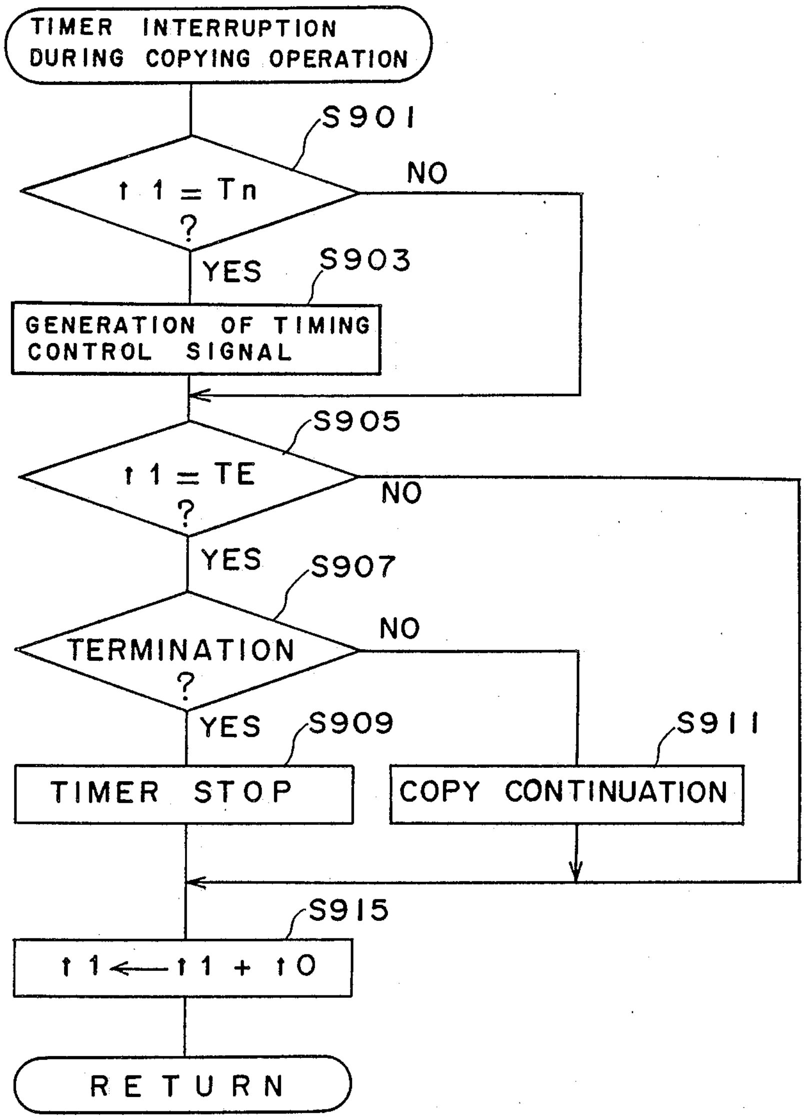
FIG. 13 is a flowchart showing a timer interruption during copying operation routine, for controlling various copying operations, in which hardware interruption processings are executed by the host CPU in response to a timer interruption request signal outputted from an interruption ruption timer IC in accordance with the first through fourth embodiments.

FIG. 13 is a flowchart showing a timer interruption routine during a copying operation for controlling various copying operations in which hardware interruption processings are executed by the host CPU 22. The interruption timer is actuated at step S709 in the copy starting routine.

When the timer interruption request signal is inputted from the interrupting timer IC to the host CPU 22, the CPU 22 saves the content of the registers (not shown), thus allowing the control to be performed in this routine.

Next, at step S901, it is detected whether or not the value of a variable Tn (n) which presets the value counted by the timer according to various copying operation control timings equals to a variable t1 counted by the timer. Reference numeral (n) is incremented correspondingly with various copying operations as follows: 1, 2, . . . .

If yes, a signal for controlling the copying operation corresponding to (n) is produced at step S903 so that the signal is transmitted to the controller corresponding to the counted value t1. The signals transmitted from the host CPU 22 according to the processings executed at steps S901 and S903 include an image area interruption request signal for controlling a data imprinting start timing. In response to the image area interruption signal, the image area interruption routine is actuated in the CPU 21.

It is detected at step S905 whether or not the value of the variable TE which sets the timer-counted value of the termination of a copying operation equals to a timer count value variable t1.

If yes, the program goes to step S907 at which it is detected whether or not a series of the copying operations is terminated. If yes, the counting of the timer is stopped at step S909 so as to stop the generation of the timer interruption request signal. If no, the control processing for performing the following copying operation is executed at step S911. For example, the timer count variable t1 is set to an appropriate value.

At step S915, t0 which sets the timer interruption period is added to the timer count variable t1. Thereafter, the registers (not shown) which has been saved are allowed to be operable. Thereafter, the CPU 21 resumes the processing executed prior to the timer interruption.

<2> Subroutine of imprinting CPU 21

(1) Bit map developing routine

Figure 16:
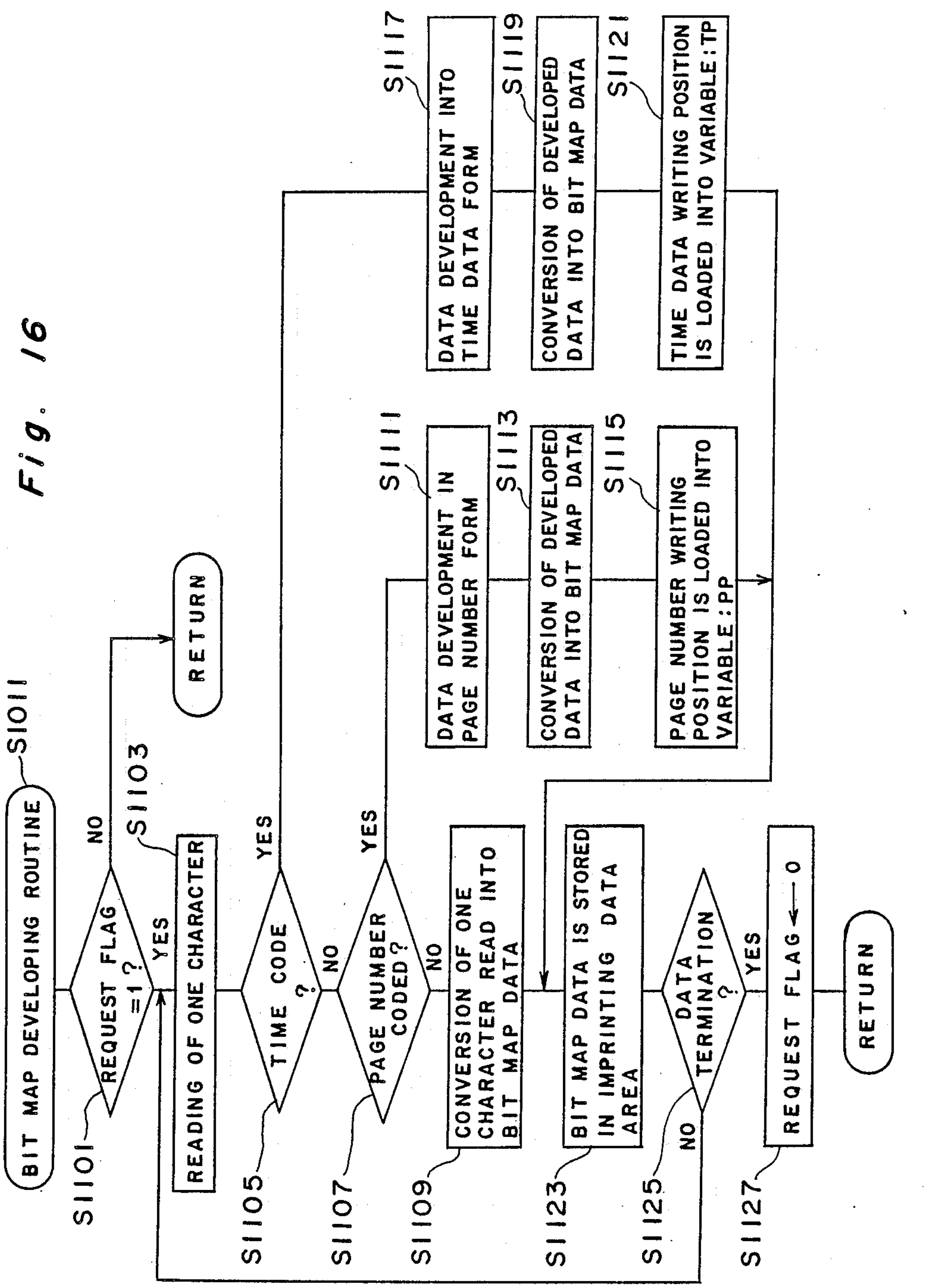
FIG. 16 is a flowchart showing a bit map developing routine to be called in the main routine of the imprinting control CPU in accordance with the first through fourth embodiment.

FIG. 16 is a flowchart of a bit map developing routine (step S1011) included in the main routine of the data imprinting CPU 21.

First, it is detected at step S1101 whether a request flag which indicates the change of the content of the imprinting data is set to "1". If the request flag is set to "0", the content of the imprinting data is not changed. If the request flag is set to "1", the content of the imprinting data is changed (refer to a communication interruption routine to be described later.) If no, the program returns to the main routine.

If yes, one character data (refer to a communication interruption routine) of data stored in the imprinting buffer is read at step S1103. Thereafter, it is detected at step S1105 whether or not the character data is the code which indicates time data and it is detected at step S1107 whether or not the character data read is the code which indicates the page data.

If yes, at step S1105, a data development is carried out at step S1117 based on a predetermined time data imprinting form, for example month  date  year **; hour  minutes  second . Numerical values are substituted into *. Developed data are converted into a bit map data at step S1119 based on font data stored in the ROM 23. At step S1121, a time data writing position is stored in the internal variable TP so that the time data can be updated in the time.page bit map developing routine which is described later.

If yes, at step S1107, similarly to the case of the time data, a data development is performed at step S1111 based on a predetermined page data imprinting form (in the embodiment, P.oo/XX, oo signifies page number and XX signifies number of total pages) and similarly to the above, the developed data is converted into bit map data at step S1113. Further, a page number writing position is stored in the internal variable PP so that the page number data can be updated in the time.page bit map developing routine which is described later.

If no, at steps S1105 and S1107, the character corresponding to the character code is converted into bit map data at step S1109 based on the font data stored in the ROM 23.

At step S1123, the bit map data converted at step S1109 is stored in the imprinting data area.

Thereafter, it is detected at step S1125 whether or not conversions of all the data stored in the imprinting data buffer into bit maps are terminated.

If no, the program returns to step S1103 at which similarly to the above-described manner, the next one character stored in the buffer is read. Thus, the conversion of developed data into bit map data is continued.

If yes, at step S1125, the request flag is set to "0" at step S1127. Then, the program returns to the main routine.

Time data and the page number data are described as imprinting data in the embodiment, however, it is possible to imprint any desired character string by executing a processing based on this flowchart. But it is necessary that a routine for processing imprinting data of a character string is prepared.

(2) Motor control routine (step S1013)

Figure 17:
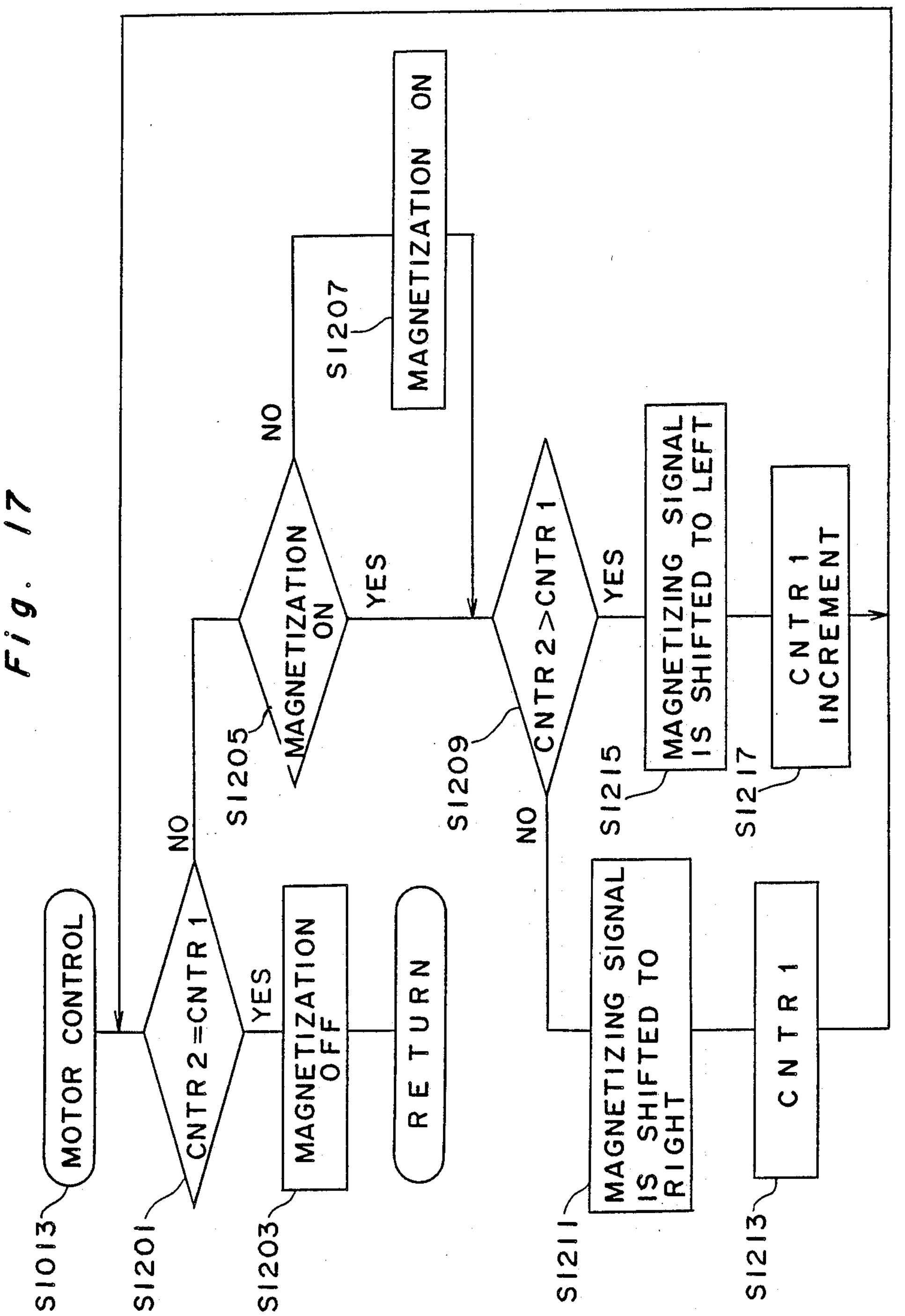
FIG. 17 is a flowchart showing a motor control routine to be called in the main routine of the imprinting control CPU in accordance with the first through fourth embodiment.

FIG. 17 is a flowchart of a motor control routine contained in the main routine of the data imprinting CPU 21.

First, it is detected at step S1201 whether or not the value of the CNTR 2 equals to that of the CNTR 1, namely, whether or not the imprinting head 201 is located at the imprinting position (target position) set by the position data outputted from the CPU 22. The CNTR 2 is step counter in which the target position of the imprinting head 200 is converted into the number of steps of the stepping motor 204. The CNTR 1 is also a step counter corresponding to the current position of the imprinting head 201.

If it is decided at step S1201 that the value of the CNTR 2 equals to that of CNTR 1, the stepping motor 204 is demagnetized at step S1203. Then, the program returns to the main routine.

If no, at step S1201, the program goes to step S1205 at which it is detected whether or not the stepping motor 204 is magnetized. Thereafter, the program goes to step S1209.

At step S1209, the value of the CNTR 2 and that of the CNTR 1 are compared with each other. If it is decided at step S1209 that CNTR 2<CNTR 1, a signal for magnetizing the imprinting head 201 is processed at step S1211 so that the imprinting head 201 is shifted to the right and the step counter CNTR 1 is decremented at step S1213.

If it is decided at step S1209 that CNTR 2>CNTR 1, a signal for magnetizing the imprinting head 201 is processed at step S1215 so that the imprinting head 201 is shifted to the left and the step counter CNTR 1 is incremented at step S1217.

The imprinting head 201 is located at a predetermined position by repeating the above-described processings until the value of the CNTR 2 becomes equal to that of the CNTR 1.

(3) Time.page bit map developing routine (step S1021)

FIG. 18-I is a time.page bit map developing routine contained in the main routine of the imprinting CPU 21.

<Time data>

It is detected at step S1301 whether or not the time imprinting data is changed.

If yes, S1301, the time data outputted from the timer IC is stored at step S1303 and the time data is developed into a character string at step S1305. Thereafter, the time data developed into the character string is converted into bit map data at step S1307 and a time data writing position is read from the internal variable TP at step S1309. Then, at step S1311, imprinting the data area is reloaded.

<Page data>

It is detected at step S1313 whether or not the page imprinting data is changed.

If yes, the program goes to step S1315 so that the substitution of the data into the variable NUMBER OF PAGES is performed at step S1315 through S1323.

That is, it is detected at step S1315 whether or not the mode is under the original document moving copy mode. If no, the page number data is stored at step S1317 (refer to step S215.) If yes, it is detected at step S1319 whether or not the copying operation of one group of original documents is started in the original document moving copy mode. If yes, the number of total pages is substituted into the variable NUMBER OF PAGES (refer to step 1009) at step S1321. If no, the data of the variable NUMBER OF PAGES is decremented at step S1323.

At step S1325, the page number data stored as described above is developed into a character string and at step S1327, the page number data developed into the character string is converted into bit map data at step S1327. Thereafter, a page number writing position is read from the variable PP at step S1329. Then, imprinting data is reloaded at step S1331.

Thereafter, the program returns to the main routine.

The time data can be controlled so that time data is not changed during a series of copying operations.

(4) Image area interruption routine

Figure 19:
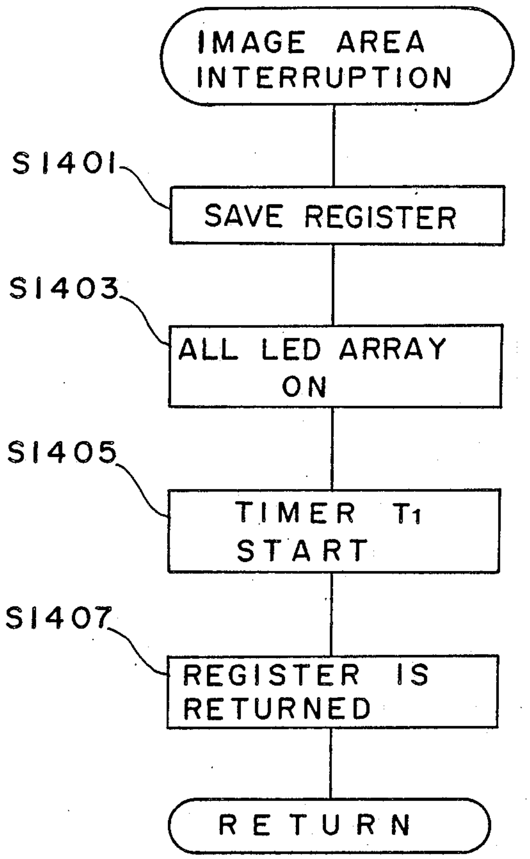
FIG 19 is a flowchart showing an interruption service routine to be processed by the imprinting control CPU in response to an interruption request signal to be produced in the timer interruption during copying operation routine in accordance with the first through fourth embodiments.

FIG. 19 is a flowchart of an interruption service routine which the imprinting CPU 21 performs in response to an interruption request signal generated in the timer interruption routine during copying operation (refer to FIG. 13.)

Upon receipt of the interruption request signal from the CPU 22, the CPU 21 suspends the processing the CPU 21 is being executing so that the processing is executed by the image area interruption routine.

First, at step S1401, the content of registers of the CPU 21 are saved at step S1401 so that the CPU 21 resumes the suspended processing after the interruption processing in terminated.

Next, at step S1403, all the elements of the data imprinting LED array 204 of the imprinting head 201 are turned off.

At step S1405, a timer T1 to be controlled by the timer IC is started. The predetermined value t1 is the period of time which corresponds to the time the electrophotoreceptor drum 2 is required to rotate from the leading edge portion of an image of an original document to a data imprinting starting position.

The timer IC produces a hardware interruption request signal to the CPU 21 when the counting of the timer is terminated. Upon receipt of the timer interruption request signal, the CPU 21 actuates a timer interruption routine which is described later.

After the above-described processings are terminated, the registers are returned to resume operations at step S1407, thus the CPU 21 terminating this routine and returns to execute the suspended processing.

(5) Timer interruption routine

FIG. 20-I is a flowchart showing a timer interruption routine.

The timer interruption routine is an interruption service routine to be executed by the CPU 21 in response to an interruption request signal produced by the timer IC at the time of the termination of the timer Ta which starts in the image area interruption routine or at the time of the termination of the timer T2, T3, and T4 which start in the timer interruption routine.

That is, upon receipt of the interruption request signal from the timer IC, the CPU 21 suspends the processing the CPU 21 is executing so that the processing is executed by the timer interruption routine.

First, the content of the registers are saved at step S1501 so that the suspended processing is resumed after the processing to be executed in the interruption routine is terminated.

Next, it is detected at step S1503 whether or not the output (output of the shift register) is terminated.

<Rise time>

If no, at step S1503, the program goes to step S1515 at which it is decided at step S1505 whether or not the charger 202 of the imprinting head 201 is OFF (an interruption due to the termination of the timer T1). At step S1515, the charger 202 is turned on and at step S1517, all the elements of the imprinting LED array 204 are turned on. At step S1519, the timer T2 starts its operation, whereby the unstable portion of the charger 202 is deelectrified by the LED array 203 is carried out. The value t2 of the timer T2 is set so that data is not written in an unstable portion of the charger when the charger 202 rises (refer to FIG. 21-I.)

Thereafter, at step S1521, the data corresponding to the first of imprinting data (data for controlling the turn on/off corresponding to one dot of respective LEDs) is outputted to the shift register in the imprinting head 201.

After these processings are terminated, at step S1535, the registers are returned to resume operations, thus the CPU 21 terminating the execution in this routine. Then, the CPU 21 returns to resume the processing which has been suspended.

<Data imprinting>

Next, when this routine is executed upon termination of the timer T2, i.e., when the unstable portion of the charger 202 is deelectrified when the charger 202 rises, processing is executed from step S1503 and S1505 to S1507. At step S1507, a latch pulse is outputted to the shift register, whereby an ON/OFF control signal is outputted from the shift register to the driver of the LED array 203.

Then, at step S1509, the timer T3 starts its operation. The value t3 of the timer T3 is the period corresponding to one dot of a dot matrix font. That is, the timer interruption of the next line occurs upon termination of the counting of the timer T3.

It is detected at step S1511 whether or not the output of the last line of the font data to the shift register is terminated.

If no, the font data of the next one line is outputted to the shift register at step S1513. Thereafter, the program goes to step S1535 at which the registers resume operations. Thus, the CPU 21 terminates the execution of this routine. Then, the CPU 21 returns to resume the suspended processing.

When this routine is executed upon termination of the counting of the timer T3, i.e., when the data imprinting is continually executed, the processings to be executed at steps S1503, S1505, S1507, S1509, S1511, S1513, and S1535 are repeatedly executed.

If it is decided at step S1511 that all data is outputted, the program jumps to step S1535 at which the registers resume operations because all data is outputted. Thus, the CPU 21 terminates the execution of this routine. Then, the CPU returns to resume the suspended processing.

<Fall time>

If it is decided at step S1503 that all data is outputted, the program goes to step S1525 if it is decided at step S1523 that the charger 202 of the imprinting head 201 is ON (the last interruption due to the termination of the timer T3). At step S1525, all the elements of the data imprinting LED array 203 are turned on and at step S1527, the charger 202 is turned off. Then, at step S1529, the timer T4 starts its operation, whereby the charger 202 is deelectrified by the LED array 204 until the counting of the timer T4 is terminated. The value t4 of the timer T4 is set to deelectrify unstable portion of the charger 202 when the charger 202 falls (refer to FIG. 21-I.)

After these operations are terminated, the registers resume operations at step S1535. Thus, the CPU 21 terminates the execution of this routine. Then, the CPU 21 resumes the suspended processing.

Next, when this routine is executed upon termination of the counting of the timer T4, that is, when the unstable portion of the charger 202 has been deelectrified at the time of the fall of the charger 202, the program goes from step S1503, step S1523 to step S1531. At step S1531, all the elements of the LED array 203 are turned off. Then, at step S1533, the counting of the timer is stopped and the timer interruption is masked.

Thus, the timer interruption processing is executed.

The timers T1, T2, T3, and T4 are controlled by the timer IC.

(6) Communication interruption routine

Figure 22:
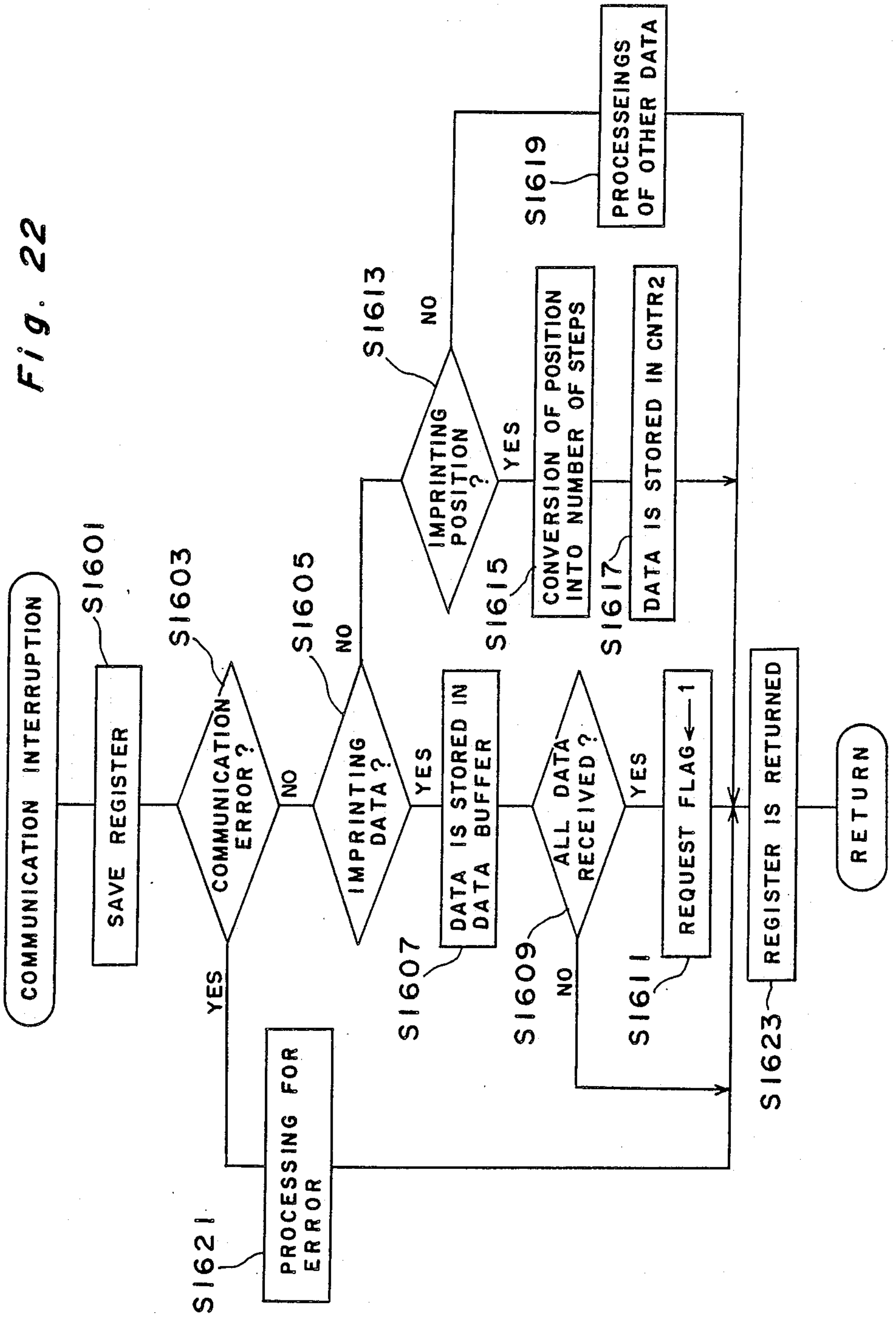
FIG. 22 is a flowchart showing an interruption service routine to be executed by the imprinting control CPU in resonse to a communication request signal of data outputted in the communication routine of the host CPU in accordance with the first through fourth embodiments.

FIG. 22 is a flowchart of an interruption service routine which the imprinting CPU 21 executes in response to the communication interruption request signal of data outputted in the communication routine of the host CPU 22.

Upon receipt of the communication interruption request signal, the CPU 21 suspends the processing the CPU 21 has been performing so that the control is performed in this routine.

The content of the registers are saved at step S1601 so that no trouble occurs when the CPU 21 resumes the suspended processing when the execution of the interruption processing is terminated.

Next, it is detected at step S1603 whether or not an error occurs during the data communication. If yes, the program goes to step S1621 at which a processing to correct the error is executed.

If no, it is detected at step S1605 whether or not data transmitted to the CPU 21 is imprinting data.

If yes, the data is stored in the imprinting data buffer at step S1607. When the final imprinting data is received at step S1609, a request flag indicating the change of the imprinting data is set to "1" at step S1611.

If no, the program goes to step S1613 at which it is detected whether or not the received data is the data which indicates a position to be imprinted.

If yes, the received position data is converted into the number of steps of the stepping motor 204 for controlling the positioning of the imprinting head 201 at step S1615. At step S1617, the converted data is stored in the step counter CNTR 2.

If it is detected at steps S1605 and S1613 that the data outputted from the CPU 22 is neither the imprinting data (step S1605) nor the imprinting position data (step S1613), the program goes to step S1619 at which the processings of other data are executed.

In the above-described data processing, the host CPU 22 codes the presence and non-presence of imprinting time.page data, thus outputting the coded data as serial data.

The control CPUs of this copying apparatus execute processings as described above.

In this embodiment, the number of original documents is counted by utilizing the RDH 400. However, the number of the original documents may be counted by other means, for example, means for counting bills.

According to this embodiment, if the original document moving copy mode is not set under the page data imprinting mode, the page data imprinting mode is cancelled, however, the embodiment may be modified as follows: there is a case in which a certain period of time elapses after the page data imprinting mode is selected and another case as well in which the original document moving copy mode has not been set in a predetermined period of time although the copy start key or the ten-key for inputting the number of sheets to be copied are operated after the page data imprinting mode is selected. In these cases, the page data imprinting mode may be cancelled.

Since the number of original documents are counted in only the original document moving copy mode in this embodiment, the page data imprinting mode is cancelled if the original document moving copy mode is set. But the following modification may be employed: a page counting mode for counting the number of original documents is additionally provided so that the counting mode can be selected even in the ADF mode. Thus, the number of original documents can be counted and the page data imprinting mode can be set in the ADF mode.

Second embodiment

Next, the second embodiment of the present embodiment is described with reference to FIGS. 1-I, 2, 3, 4, 5, 6, 6A, 9-I, 10A, 10B, 12, 13, 15-I, 16, 17, 18-I, 19, 20-I, 21-I, and 22 common to the first embodiment and also FIGS. 6B, 6C, 6D, 6E, 7-II, 8-II, 10E, 10F, 11-II, and 14-II which show the feature of the second embodiment.

Since the description of the first embodiment made referring to FIGS. 1-I, 2, 3, 4, 5, 6, and 6A are applicable to that of the second embodiment, the description of the second embodiment based on these figures are omitted.

<Jam correcting routine (step S108)>

The jam correcting routine (step S108) of the first embodiment shown in FIG. 6 is constructed as shown in FIG. 6B in the second embodiment.

FIG. 6B is the flowchart showing a jam correcting routine (step S108 in FIG. 6) contained in the analyzing routine (step S9).

In this routine, control of jam processing under the page mode is made; the resumption of a copying operation is processed after a jam reset is performed; and a page number data is corrected.

That is, if it is decided at step S2001 that a jam occurs under the page mode, the program goes to step S2003 at which a correction.resumption interruption routine is called.

Thereafter, the program returns to the analyzing routine.

Figure 6C:
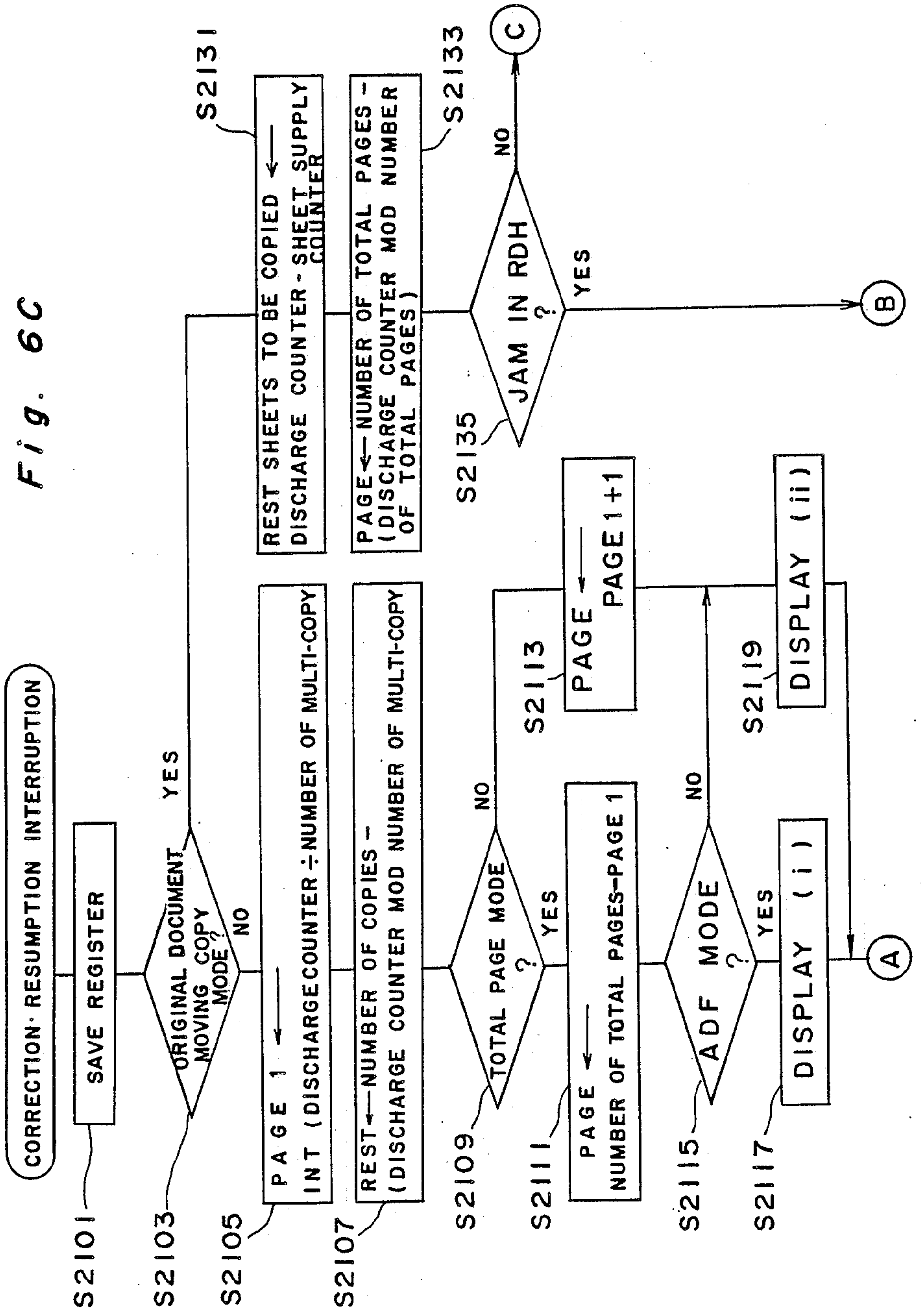
FIGS. 6C, 6D, and 6E are flowcharts showing a correction.resumption interrupting routine to be operated in the jam correcting routine in accordance with the second embodiment.
Figure 6D:
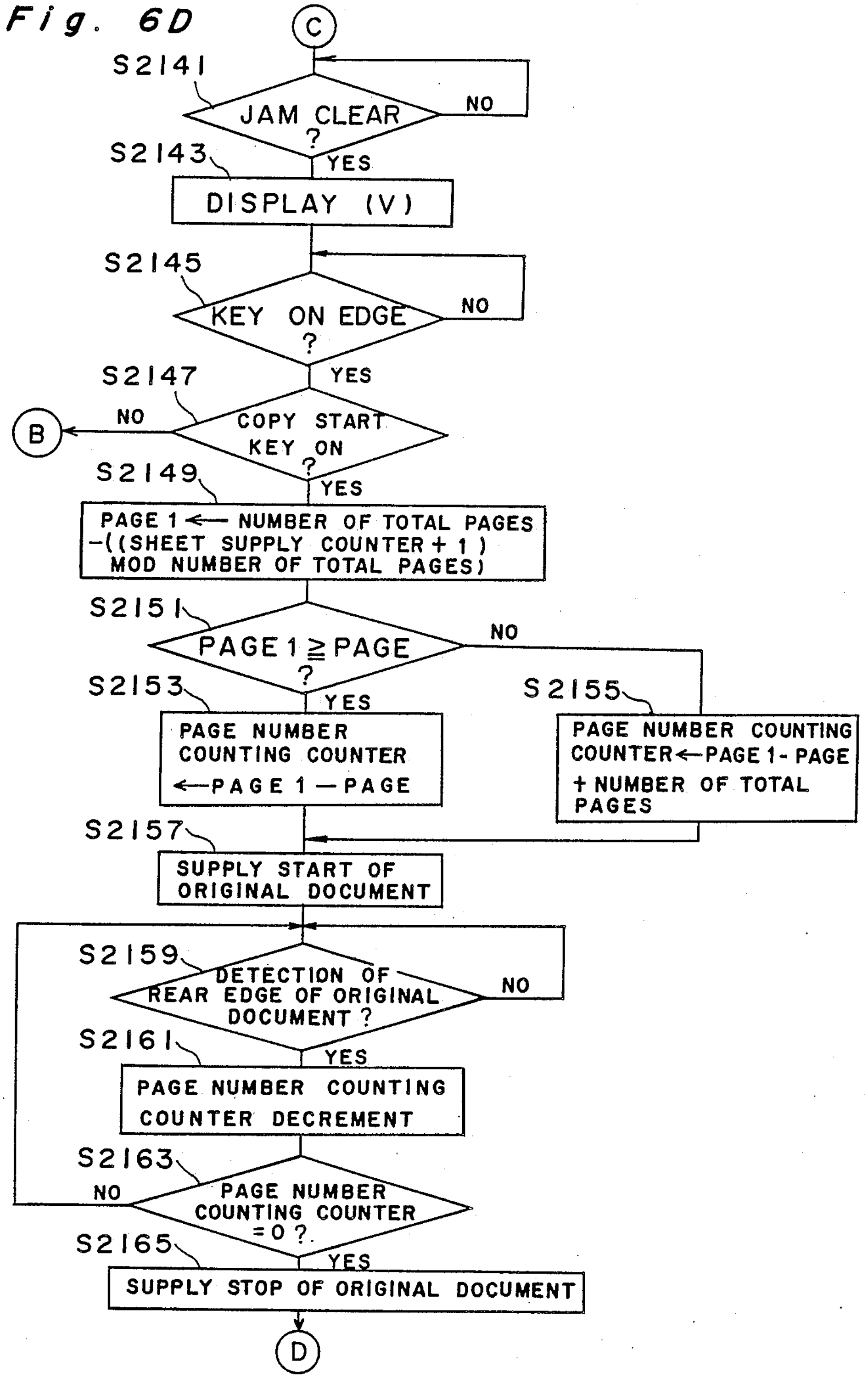
Figure 6E:
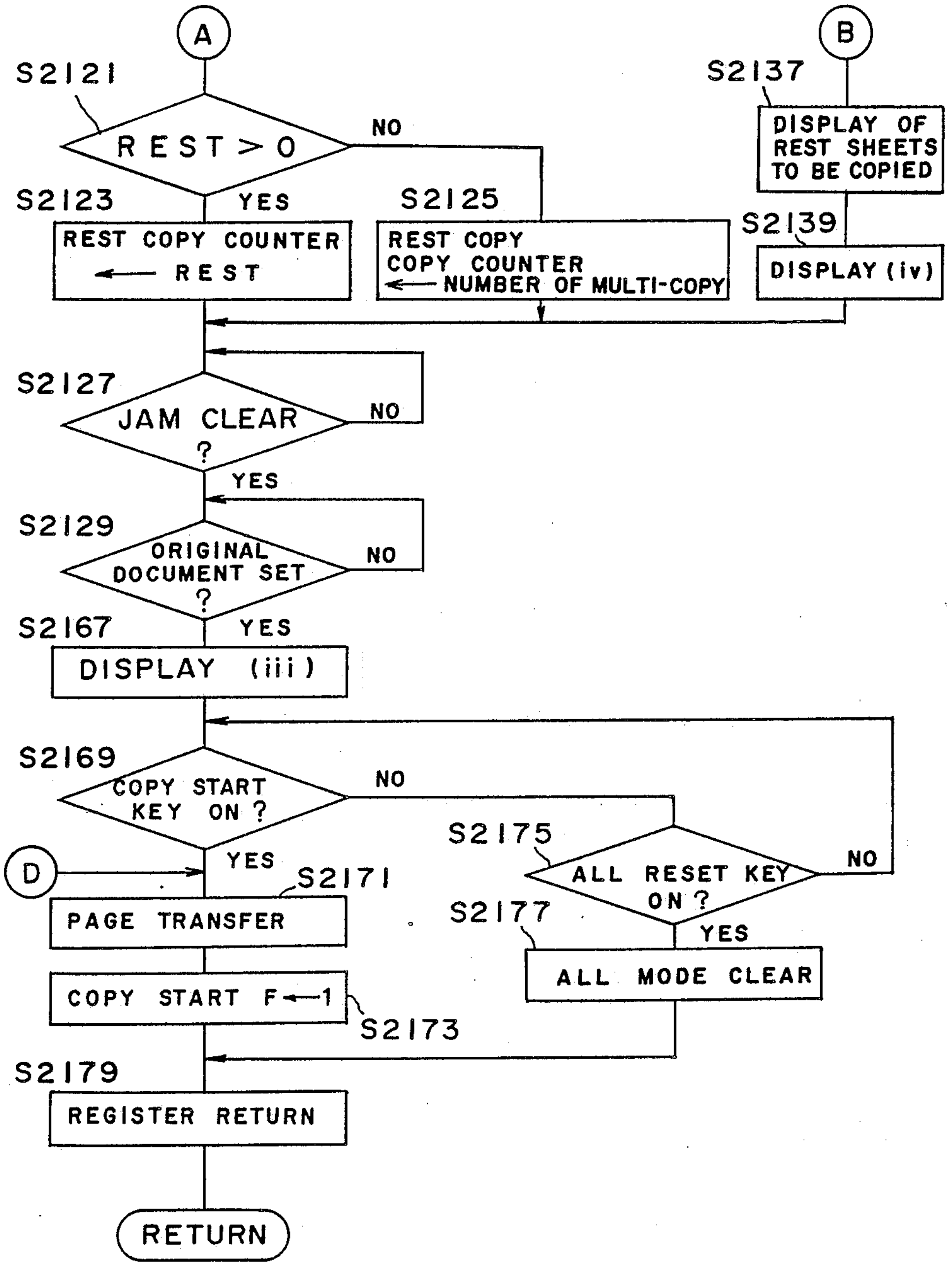

The detail of the correction.resumption interruption routine is described referring to FIGS. 6C and 6D.

<Correction.resumption interruption routine>

FIGS. 6C and 6D are the flowcharts of the correction.resumption interruption routine to be called in the jam correcting routine.

This interruption routine is executed upon a software interruption request in the host CPU 21 when a jam occurs in the page mode. In this routine, the host CPU waits until a copy resumption instruction or a copy operation suspension instruction is executed after a jam reset is performed.

When this routine is called at step S2101, the content of the registers are saved.

It is detected at step S2103 whether or not an interruption is caused by a jam occurrence while a copying operation is being carried out in the original document moving copy mode.

<i> Original document unmoving copy mode

If it is decided at step S2103 that the jam occurs not under the original document moving copy mode, processings are executed at step S2105 through step S2125. Thereafter, the program goes to step S2127 at which the host CPU 21 waits until a jammed copy sheet is removed from the copying apparatus.

At step S2105 through step S2125, page data is corrected under the original document unmoving copy mode.

First, at step S2105, INT (value of discharge counter divided by number of copy sheets per original document) is calculated and the result is substituted into the internal variable PAGE 1.

In the above, INT is a function of taking out integers of a numerical value which is passed thereto as an argument and giving back the integer; discharge counter counts the number of sheets on which images of original documents have been copied and discharged from the copying apparatus after a copying operations are completed (refer to step S225 of page counting routine shown in FIG. 7-II.); PAGE 1 is an internal variable which indicates to which of original documents a jammed copy sheet corresponds (for example, 0 for a first original document, 1 for a second original document, n-1 for an n-th original document).

At step S2107, {(number of copy sheets per original document)-(discharge counter MOD number of copy sheets per original document)} is calculated and the result is substituted into an internal variable REST.

In the above, MOD is an operator for finding a remainder obtained by dividing a left term by a right term; REST is an internal variable which indicates the number of remaining sheets to be copied per original document due to a jam occurrence (0 indicates the number of copy sheets per one original document in a multi-copy).

Thereafter, the program goes to step S2109 at which it is detected whether or not the total page mode is selected.

If yes, the program goes to step S2111 at which {(number of total pages)-(PAGE 1)} is calculated and the result is substituted into an internal variable PAGE.

In the above, PAGE is an internal variable into which the next page number of an original document to be copied.

Thereafter, if it is detected at step S2115 that the ADF mode is selected, a pattern (i) (FIG. 14-II) is displayed on the liquid crystal display section 330 of the operation panel so as to inform the operator that the original document should be reset in the RDH 400. If the ADF mode is not selected, a pattern (ii) (refer to FIG. 14-II) is displayed on the liquid crystal display section 330 of the operation panel at step S2119 so as to inform the operator that the original document should be reset on the original document setting table 16.

If it is decided at step S2109 that the total page mode is not selected, the program goes to step S2113 at which the equation of (PAGE1 + 1) is calculated and the result is substituted into the internal variable PAGE. Thereafter, at step S2119, the pattern (ii) (refer to FIG. 14-II) is displayed on the liquid crystal display section 330 of the operation panel so as to request the operator to reset the original document on the original document setting table 16.

Referring to FIG. 6D, the program goes from step S2117 or S2119 to step S2121 at which it is detected whether REST > 0 or REST < 0.

If REST > 0, the numerical value of REST is substituted into the rest copy counter at step S2123. If REST = 0, a predetermined number of a multi-copy (the number of copy sheet to copied per original document) is substituted into the rest copy counter at step S2125. It is to be noted that the number of the multi-copy includes "1", i.e., the number of copy is one per original document.

At step 2127, the jam is cleared and the termination of the setting of the original document is waited at step S2129. Thereafter, the program goes to step S2167 at which a pattern (iii) (refer to FIG. 14-II) is displayed on the liquid crystal display section 330.

Thereafter, if it is decided at step S2169 that the copy start key 308 is at an ON edge, page data is transferred at step S2171 and the copy start flag is set to "1" at step S2173. If it is decided at step S2169 that the copy start key 308 is not at an ON edge, the program goes to step S2175 at which it is detected whether or not that an all reset key 321 is at an ON edge. If yes, all modes are cleared at step S2177. Then, the program goes to step S2179 at which the content of registers is returned. Thus, the program returns.

<ii> Original document moving copy mode

If it is decided at step S2103 that a jam has occurred under the original document moving copy mode, the calculation of {(value of discharge counter)-(value of sheet supply counter)} is performed at step S2131 and the result is substituted into a variable REMAINING NUMBER OF SHEETS TO BE RECOPIED at step S2131.

At this time, the calculation of:

{(number of total page)-(value of discharge counter MOD number of total page)} is performed and the result is substituted into the internal variable PAGE.

Then, the program goes to step S2135 at which it is detected whether the jam has occurred in the RDH 400 (jam of original document) or in the main body of the copying apparatus (jam of copy sheet).

If it is decided that an original document is jammed, the remaining number of sheets to be copied is displayed on the numerical value display section 319 at step S2137 and a pattern (iv) (refer to FIG. 14-II) is displayed on the liquid crystal display section 330 at step S2139. Then, the program goes from step S2139 to step S2127 from which the same processing as those described above are executed.

If it is decided at step S2135 that a copy sheet is jammed, the program goes to step S2141 at which the clearance of the jam is waited. When the jam is cleared, a pattern (v) (refer to FIG. 14-II) is displayed on the liquid crystal display section 330 at step S2143 so that the operator selects an automatic resuming mode or a manual mode. The manual mode in this case is that the original document is manually returned to the original document setting table 16 so as to resume a copying operation. The automatic resuming mode is referred to as a mode in which the operator presses a copy start key 308 so that the page number counting operation is performed, i.e., original documents are fed from the original document setting tray 412 of the RDH to the original document setting table 16 and the original document moving copy mode is resumed from the point at which the transportation of the number of original documents corresponding to a calculated result is terminated (refer to steps S2153 and S2155.)

At step S2145, the CPU 21 waits at step S2145 until the pressing of any one of the keys of the operation panel is detected.

If the ON edge of any one of the keys is detected at step S2145 and if it is detected at step S2147 that a key other than the copy start key 308 is at an ON edge, the program goes to step S2137 from which the same processings as those described above are executed.

If it is decided at step S2147 that the copy start key 308 is at an ON edge, the program goes to step S2149 from which processings are executed under the automatic resuming mode.

That is, at step S2149, the calculation of:

[(number of total pages)-{(value of sheet supply counter +1) MOD (number of total pages)} is performed and the result is substituted into the internal variable PAGE 1.

In other words, the internal variable PAGE 1 is substituted by the latest page number of original documents already supplied.

Then, the program goes to step S2151 at which it is detected at which the value of PAGE 1 and that of PAGE are compared with each other.

If PAGE 1≧PAGE, (PAGE 1- PAGE) is calculated and the calculated result is substituted into the counter for counting the number of original documents (hereinafter referred to as page number counter.)

If PAGE 1<PAGE, (PAGE 1- PAGE+number of total pages) is calculated and the result is substituted into the page number counter at step S2155.

In other words, at steps S2153 and S2155, calculations are performed to obtain the number of original documents to be fed employing the RDH 400 so that an original document to be supplied first after the jam occurs serves as the first page in resuming a copying operation.

At step S2157, a signal indicative of the start of a page counting operation is produced.

If it is decided at step S2159 that the rear edge of the original document is detected, the value of the page number counter is decremented at step S2161. The decrements are repeated until the value of the page number counter becomes "0" at step S2163. Thereafter, the pattern (iii) (refer to FIG. 14-II) is displayed at step S2167.

Thereafter, as described previously, the copy start flag is set to "1" or all modes are cleared by executing processings at step S2169 through step S2177. Then, the content of registers is returned at step S2179 and the program returns.

In the second embodiment, the page mode reset checking routine (step S105) is the same as that of the first embodiment, but in the second embodiment, the page counting routine (step S101) and the page mode checking routine (step S103) are modified as shown in FIGS. 7-II and 8-II.

<Page counting routine (step S101)>

FIG. 7-II is the flowchart showing the page counting routine (step S101) contained in the analyzing routine (step S9).

An imprinting page number under the page mode and a control counter necessary in a jam correction are controlled in this routine. In the original document moving copy mode, a page number is controlled not by the host CPU 22 but the CPU 21 in view of a data imprinting speed. This is described later.

First, it is detected at step S201 whether or not the page LED 304 is ON. If no, i.e., if the page data imprinting mode is not selected, the program returns without executing the processing of this routine.

If yes, i.e., if the page data imprinting mode is selected, the program goes to step S203 at which it is detected whether or not the number of total pages is changed, i.e., it is detected at step S203 whether or not the number of the total pages is established according to the input of new data on the number of total pages and the count processing (refer to FIG. 12) of the number of original documents employing the RDH 400.

If yes, the changed number of the total pages is substituted into the internal variable PAGE at step S227, and at step S229, the transfer processing of the page data is executed. Then, the program returns to the analyzing routine (step S9).

If no, the program goes to stop S207 if it is decided at step S205 that the original document moving copy mode is not selected. At step S207 through step S217, the page data is incremented or decremented.

More specifically, if it is decided at step S207 that the last copy sheet in the multi-copy operation passes through the timing roller 13, the program goes to step S209 at which it is detected whether or not the multi-copy operation is terminated. If yes, the program goes to step S211 at which it is detected whether or not the total page mode is selected. If yes, the page data is decremented at step S213. If no at step S211, the program goes to step S215 at which the page data is incremented. Thereafter, the page data is transferred at step S217.

If it is decided at step S205 that the original document moving copy mode is selected, the program goes to step S218.

At step S218 through step S221, the counter is controlled when a page number counting is carried out after a jam reset is performed in the original document moving copy mode.

That is, if it is decided at step S218 that the mode for performing a copying operation is not acceptable, the program goes to step S219 at which it is detected whether or not the leading edge of an original document is detected by the sensor 421 of the RDH 400 at step S219, the value of a sheet supply counter is incremented at step S221. The sheet supply counter is used to control the page number counting after a jam reset is effected (refer to FIGS. 6C 6D and 6E, step S2149).

Thereafter, the program goes to step S225 if it is decided at step S223 that the discharges of copied sheets are terminated. At step S225, the value of the discharge counter is incremented. Then, the program returns to the analyzing routine (step S9). The discharge counter is used to correct the page data after the jam reset is made (refer to FIGS. 6C, 6D and 6E, steps S2105, S2107, S2131, and S2133.)

<Page mode checking routine (step S103)>

FIG. 8-II is a flowchart showing the page mode checking routine (step S103) contained in the analyzing routine (step S9).

First, it is detected at step S301 whether or not the page LED 304 is ON.

If no, that is, if the imprinting mode of page data is not selected, the program goes to step S321 at which the liquid crystal display section 330 (FIG. 14-II) is turned off. Then, the program returns.

If yes, the program goes to step S303 at which it is detected whether or not the original document moving copy mode is selected.

If yes, a pattern (a) (refer to FIG. 14-II) is displayed on the liquid crystal display section 330 at step S309. Thereafter, the program returns to the analyzing routine.

If no, the program goes to step S305 at which it is detected whether or not the ADF mode is selected.

If yes at step S305 and if it is decided at step S307 that the flag indicating that the number of total pages has been inputted is set to "1", the program goes to step S330 at which the pattern (a) (refer to FIG. 14-II) is displayed on the liquid crystal display section 330. Then, the program returns to the analyzing routine.

If it is decided at step S307 that the flag indicating that the data on the number of total pages has been inputted is set to "0" in the ADF mode, the program goes to step S311 at which the insertion flag is set to carry "1" and at step S313, a pattern (b) (refer to FIG. 14-II) is displayed on the liquid crystal display section 330 so that the operator inputs the number of total pages. Then, the program returns.

If it is decided at step S303 that the original document moving copy mode is not selected and it is decided at step S305 that the ADF mode is not selected, that is, if original documents are manually supplied, the program goes to step S315 at which it is detected whether or not the flag indicating that the data on the number of total pages has been inputted is set to "1". If yes, a pattern (c) (refer to FIG. 14-II) is displayed on the liquid crystal display section 330 at step S317. If no, a pattern (d) (refer to FIG. 14-II) on the liquid crystal display section 330 at step S319. Then, the program returns.

As described above, in the second embodiment, the page number counting operation is performed in the original document moving copy mode so as to count the number of pages of the original documents. Therefore, it is detected at step S307 whether or not the original document moving copy mode is selected. In performing a copying operation in the original document moving copy mode, if an operator desires to selectively set "a mode for counting the number of original documents by performing the page number counting operation prior to the copying operation" or "a mode for carrying out a copying operation by feeding original documents from the original document setting tray 412 to the original document setting table 16 without effecting the page number counting operation", a control a little different from the above-described control must be adopted and the pattern of the liquid crystal display section 330 must be changed. This method is fundamentally based on the above-described concept.

The flowchart of the key-inputted data processing routine (step S15) of the first embodiment shown in FIGS. 10A and 10B are common to those of the second embodiment, but the flowchart (mode control and other processings) of the first embodiment shown in FIGS. 10C and 10D are modified as shown in FIGS. 10E and 10F in the second embodiment. These flows are described in detail hereinbelow.

<Mode control>

Referring to FIGS. 10E-(1), (2), it is detected at step S545 whether or not the date flag is set to "1".

If yes, the program goes to step S549 providing that it is decided at step S547 that the imprinting unit 200 is mounted on the copying apparatus. At step S549, a date LED 303 is turned on. The date LED 303 displays that date data is selected as imprinting data, that is, the date imprinting mode is set.

If no at step S545 or if no at step S547, the program goes to step S551 at which the date LED 303 is turned off.

It is detected at step S553 whether or not the page flag is set to "1".

If yes, the program goes to step S557 providing that it is decided at step S555 that the imprinting unit 200 is mounted on the copying apparatus. At step S557, it is detected whether or not the page LED 304 is OFF. The page LED 304 displays that the page number data is selected as the imprinting data, i.e., the page imprinting mode is set.

If yes at step S557, the page imprinting mode is set at step S558 through step S565.

That is, if it is decided at step S558 that the ADF mode is selected, the insertion flag is set to carry "1" at step S559. If no at step S558, the program goes to step S560 at which the value of the sheet supply counter is reset to "0". At step S561, the value of the discharge counter is reset to "0". Then, the program goes to step S563 at which the flag indicating that the data on the number of the total pages has been inputted is reset to "0". Thereafter, the page LED 304 is turned on at step S565 and the value of the variable PAGE is set to "1" at step S566.

If no at step S553 or if no at step S555, the page imprinting mode is cancelled and the page LED 304 is turned off at step S567 because the imprinting of page data is not (cannot be) carried out.

It is detected at step S569 whether or not the insertion flag is set to "1".

If yes, it is detected at step S573 whether or not the page LED 304 is off. If no, the program goes to step S579 at which an inserting LED 306 is turned on. The inserting LED 306 displays whether or not the insertion mode is selected. Then, the program goes to step S581 at which the number of the total pages is displayed on the numerical value display section 319.

If the flag is set to "0" at step S569 or the page LED 304 is OFF at step S573, the insertion mode is cancelled and the inserting LED 306 is turned off at step S575. At step S577, the number of copy sheets is displayed on the numerical value display section 319.

Referring to FIGS. 10F-(1), (2), it is detected at step S583 whether or not the color flag is set to "1".

If yes, the program goes to step S585 at which it is detected whether or not the color developing unit corresponding to a selected color is mounted on the copying apparatus. If yes, the program goes to step S587 at which the data on the selected color is stored in the variable COPY COLOR. At step S589, the color selecting LEDs 316 through 318 are turned off. Then, at step S591, the color selecting display LED corresponding to the selected color is turned on.

It is detected at step S593 whether or not the ten-key flag is set to "1".

If yes, the program goes to step S595 at which it is detected whether or not the insertion mode is set.

If no, an inputted numerical value is stored at step S603 because the data on the number of copy sheets has been inputted.

If yes, it is detected at step S597 whether or not the mode for imprinting the page number data is selected. If yes, the inputted numerical value is stored as the number of the total pages at step S599 and the flag indicating that the data on the number of the total pages has been inputted is set to carry "1" at step S601.

Thereafter, the numerical value inputted as the number of the total pages or the number of sheets to be copied is displayed on the numerical value display section at step S605.

<Other processings>

It is detected at step S607 whether or not the copy start key 308 for starting a copying operation is at an ON edge.

If yes, the program goes to steps S608 through S617.

The page mode is cancelled and the page LED 304 is turned off at step S611 providing that it is decided at step S608 that the ADF mode is selected; the page mode is set at step S609; and the flag indicating that the data on the number of total pages has been inputted is set to "0". At step S612, a pattern (f) (refer to FIG. 14-II) is displayed on the liquid crystal display section 330 so as to inform the operator that the number of the total pages has not been inputted. In this case, data input of the copy start key is inhibited.

If no at step S608, the program goes to step S613 at which it is detected whether or not the original document moving copy mode is selected.

If yes, an RDH counting flag is set to "1" at step S617. According to the RDH counting flag, the number of original documents are counted employing the RDH 400.

The program goes to step S615 at which the copy start flag is set to carry "1" if it is decided that the ADF mode is not selected at step S608 and the original document moving copy mode is not selected at step S613; if it is decided at step S609 that the page mode is not selected although it is decided at step S608 that the ADF mode is selected; or if it is decided at step S610 that the number of total pages is inputted although it is decided at step S608 that the ADF mode is selected and that the page mode is selected at step S609. The copy start flag controls the starts of a series of copying operations not the starts of respective copying operations.

At step S619 through step S623, processings for data input through keys other than the keys referred to in describing the flow from step S501 to step S617 are executed.

That is, if it is detected at step S619 that any one of the other keys is at an ON edge, a processing corresponding to inputted data is executed at step S623 providing that the insertion mode is not set at step S621.

Thereafter, the program returns to the main routine.

The copy start routine (step S19) shown in FIG. 11-I of the first embodiment is modified as shown in FIG. 11-II. This routine is described in detail hereinbelow.

<Copy start routine (step S19)>

FIG. 11-II is the flowchart showing the copy start routine (step S19) contained in the main routine of the host CPU 22. As described previously, this routine is called providing that the copy start flag is set to "1" at step S17. The starts of respective copying operations are not controlled but the starts of a series of copying operations are controlled by this routine.

It is detected at step S701 whether or not the RDH counting flag is reset to "0".

If no, the processing of the RDH counting routine is executed at step S713. As will be described later, original according to the RDH counting routine, documents are transported employing the RDH 400 before a copying operation is performed to count the number of the original documents.

If yes, the program goes to step S707 at which the timer counting variable t1 is reset to "0", then at step S709, the timer for allowing a timer interruption during a copying operation is actuated at step S709. Thus, "timer interruption processing during a copying operation" to be described later is actuated, whereby the copying operation processing is started. At step S711, the copy start flag is reset to carry "0" and the liquid crystal display section 330 is turned off at step S715.

Thereafter, the program returns to the main routine.

The flows of the first embodiment shown in FIGS. 12, 13, 15-I, 16, 17, 18-I, 19, 20-I, 21, 22 and the illustration thereof shown in FIG. 21-II are the same as those of the second embodiment.

Third embodiment

A third embodiment of the present invention is described referring to FIGS. 1-I, 2 through 6A, 8, 9, 10A, 10B, 12, 13, 16, 17, 19, 20, 21-I, and 22 which are common to the first embodiment and FIGS. 7-III, 10G, 10H, 10I, 10J, 11-III, 14-III, 15-II, 18-IIA, and 18-IIB showing the feature of the third embodiment.

Since the description made based on FIGS. 1-I, 2 through 6A of the first embodiment are common to the third embodiment, the description thereof is omitted.

In the third embodiment, the page counting routine (step S101) shown in FIG. 7-I is modified as shown in FIG. 7-III.

<Page counting routine (step S101)>

FIG. 7-III is the flowchart showing the page counting routine contained in the analyzing routine (step S9).

The page number to be imprinted in the page mode is controlled in this page counting routine. If the page number is controlled by the host CPU 22 under the original document moving copy mode, a data transfer speed cannot be accomplished at a high speed. Accordingly, the page number to be imprinted is controlled by the data imprinting control CPU 21 which is described later.

First, it is detected at step S201 whether or not the page LED 304 is ON.

If the page LED 304 is not ON, that is, if the page data imprinting mode is not selected, the program returns to the analyzing routine (step S9) without executing this routine.

If yes, that is, if the page data imprinting mode is selected, the program goes to step S203 at which it is detected whether or not the number of total pages is changed, i.e., it is detected whether or not new data on the number of total pages is inputted or the number of total pages is established by counting the number of original documents when the RDH 400 is used, which is described later.

If yes, the changed number of total pages is substituted into the internal variable PAGE at step S213. Then, the program goes to step S215 at which the transfer of the page data is executed.

If no at step S203, the program goes to step S204*a*.

It is detected at step S204*a* whether or not a flag indicating that the data on a jammed page has been inputted is set to "1". The flag indicating that the data of a jammed page has been inputted is set to "1" when the data on a page number is inputted by the operator after a jam correcting operation, namely, to remove a jammed sheet is completed (refer to steps S598*a*, S598*b*, S598*c* in FIG. 10I, FIGS. 10A, 10B, 10G, 10H, and 10J.)

If yes, the program goes to step S204*b* at which a value of (page number of a jam page +1) is substituted into the variable PAGE. The "jammed-page number" is a numerical value to be stored at step S598*b* (refer to FIGS. 10A, 10B, 10G, 10I, and 10J) and instructs the data of a first page when a copying operation is resumed. Thereafter, the flag indicating that jammed-page number has been inputted is reset to "0" at step S204*c*. Then, the program goes to step S205.

If no at step S204*a*, the program goes to step S205.

It is detected at step S205 whether or not the original document moving copy mode is selected with the RDH 400 employed. If no, the data of the variable PAGE is decremented at step S211 providing that the copy sheet passes through the timing roller 13 at step S207 and that the copying operation of a predetermined number of sheets to be copied is completed at step S209. Then, the program goes to step S215 at which the page data is transferred.

If yes at step S205, if no at step S207 or if no at step S209, the program returns to the analyzing routine.

As far as the total page mode checking routine (step S103) and the page mode reset routine (step S105) shown in FIGS. 8 and 9, respectively are concerned, the third embodiment is the same as the first embodiment.

The flows (mode control and other processings) of the key-inputted data processing routine (step S15) of the first embodiment shown in FIGS. 10A and 10B are modified in the third embodiment as shown in FIGS. 10G, 10H, 10I, and 10J. These flows are described in detail hereinbelow.

<Mode control>

Referring to FIG. 10C, it is detected at step S545 whether or not the date flag is set to "1". If yes, a date LED 303 is turned on at step S547 providing that the imprinting unit 200 is mounted on the copying apparatus. The date flag displays that date data is selected as imprinting data, i.e., the date imprinting mode is set.

If no at step S545 or if no at step S547, the date LED 303 is turned off at step S551.

It is detected at step S553 whether or not the page flag is set to "1".

If yes, the program goes to step S555 at which it is detected whether or not the imprinting unit 200 is mounted on the copying apparatus. If yes, the program goes to step S557 at which it is detected whether or not a page LED is turned off. The page LED 304 displays that the page number data is selected as imprinting data, i.e., that the page imprinting mode is set.

If yes at step S557, i.e., if the page LED 304 is OFF, the page imprinting mode is set. That is, it is detected at step S559 whether or not the RDH 400 is used. If no, the insertion flag is set to "1" at step S561 because the input of the number of total pages is required. Since the total page data is not established, the flag indicating that the data on the number of total pages has been inputted is reset to "0" at step S563. Thereafter, the page LED 304 is turned on at step S565. Thus, the page imprinting mode is set.

If it is decided at step S553 that the page flag is reset to "0" or if it is decided at step S555 that the data imprinting unit 200 is not mounted on the copying, the page LED 304 is turned off at step S567 because the page data is not inputted (cannot be inputted). Thus, the page imprinting mode is cancelled.

It is detected at step S569 (FIG. 10H) whether or not the insertion flag is set to "1".

If it is decided at step S569 that the insertion flag is set to "1", it is detected at step S573 whether or not the page LED 304 is OFF. If it is decided at step S573 that the page LED 304 is ON, the inserting LED 306 is turned on at step S579. The inserting LED 305 displays whether or not the insertion mode is selected.

The program goes from step S579 to step S580*a* at which it is detected whether or not a flag for indicating that jammed-page number has been inputted is set to "1". This flag is set to "1" at step S598*c* (FIG. 10I) when data of a jammed-page number is inputted, which is described later.

Figure 10I:
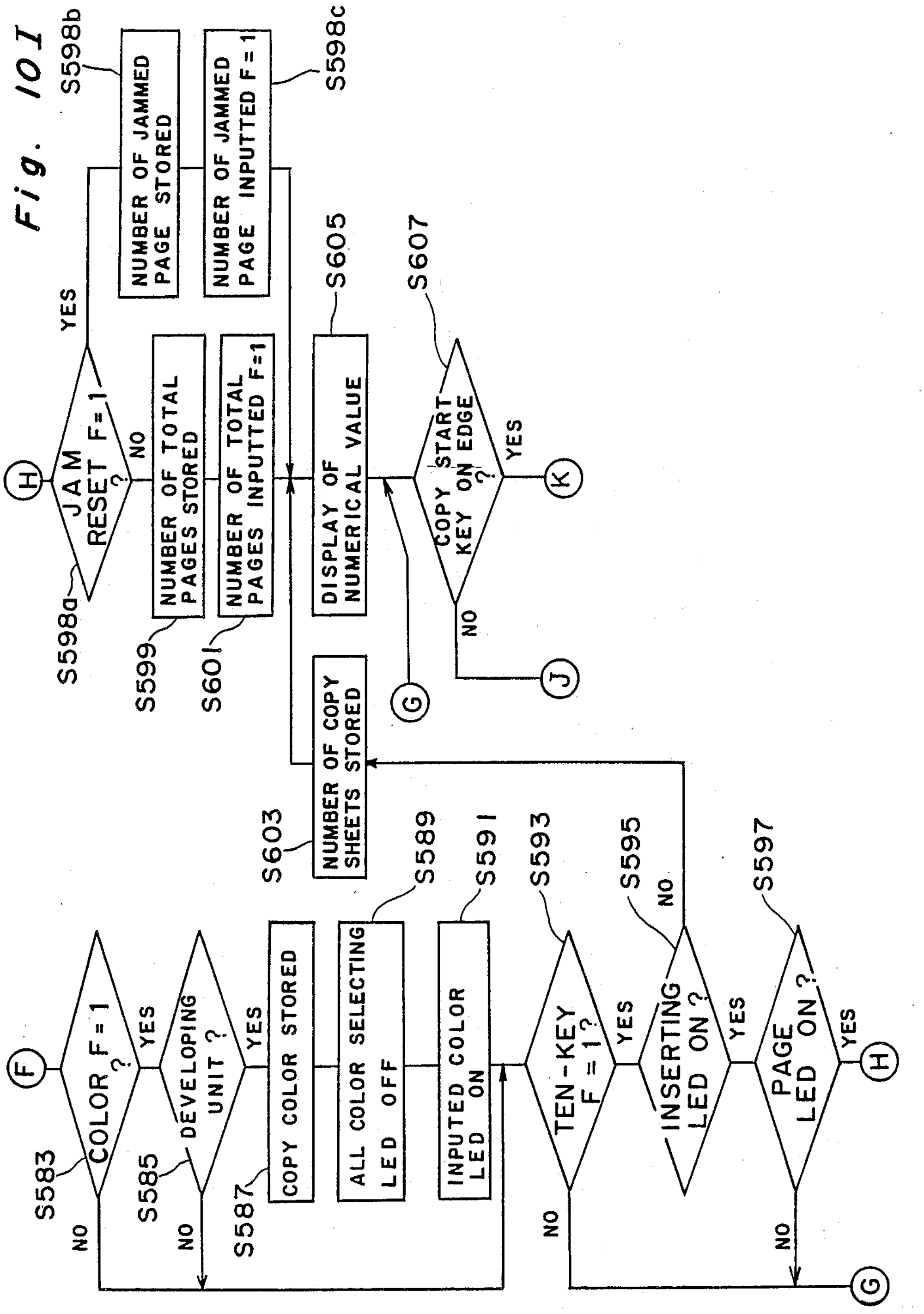
Figure 10J:
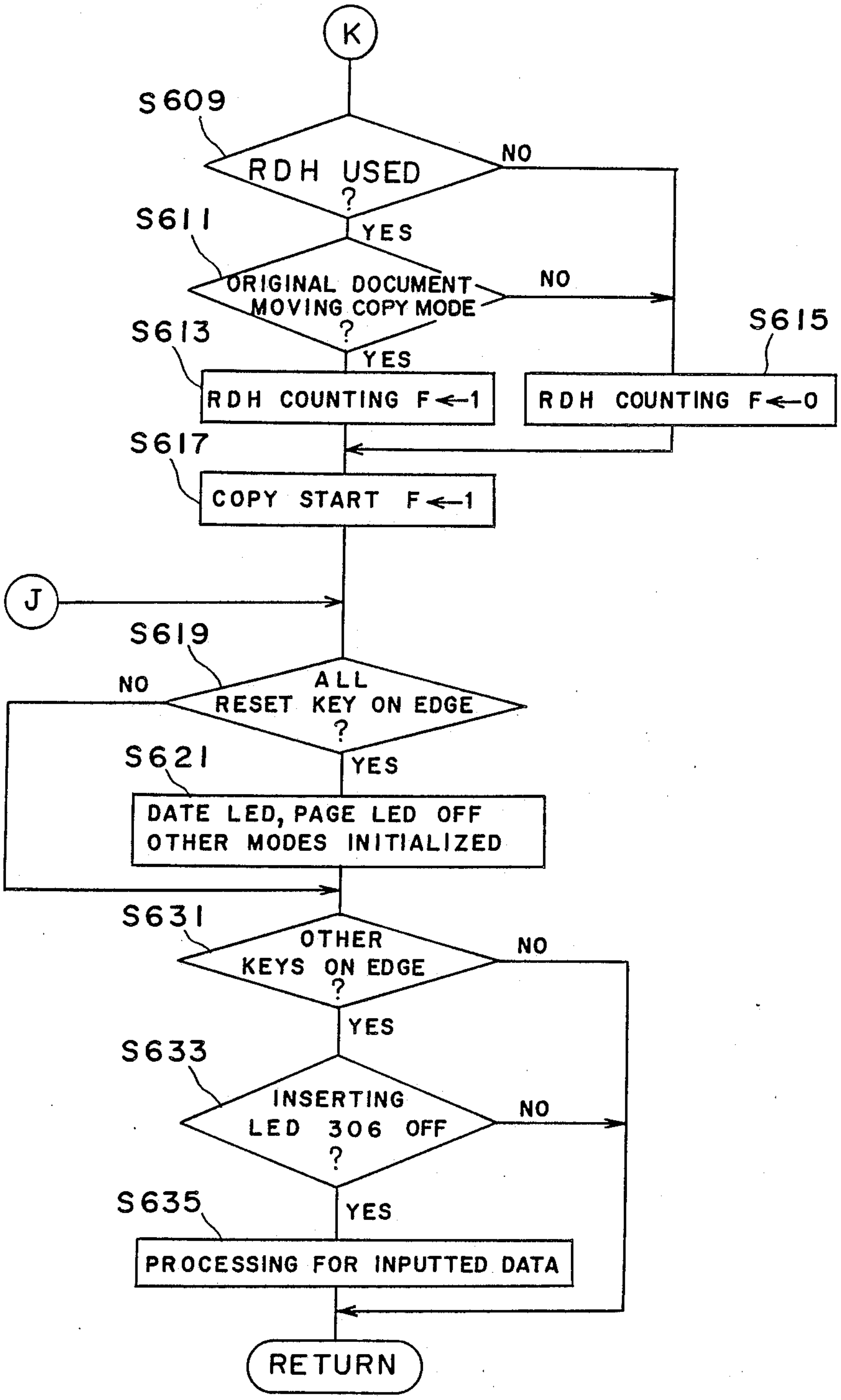

If yes at step S580*a*, the program goes to step S583 (FIG. 10I). If the jam reset flag is not set to "1" at step S580*a* (FIG. 10H), the pattern (f) (refer to FIG. 14-II) is displayed on the liquid crystal display section 330 at step S580*b*.

If no at step S569 or if it is decided at steps S571 and S573 that the date LED 303 and the page LED 304 are both OFF, the inserting LED 306 is turned off at step S575, whereby the insertion mode is cancelled.

Referring to FIG. 10I, it is detected at step S583 whether or not the color flag is set to "1".

If yes, it is detected at step S585 whether or not a color developing unit mounted on the copying apparatus corresponds to a selected color. If yes, at step S587, the selected color is stored in the variable COPY COLOR and the display LED 316 through 318 are turned off at step S589. Then, at step S591, a display LED which corresponds to the selected color is turned on.

At step S593, it is detected whether or not the ten-key flag is set to "1".

If yes, the program goes to step S595 at which it is detected whether or not the insertion mode is set, that is, it is detected whether or not the inserting LED is ON.

If no, the inputted numerical value is stored at step S603 because the data on the number of sheets to be copied has been inputted.

If yes at step S595, the program goes to step S598*a* providing that the page number data imprinting mode is selected at step S597. At step S598*a*, it is detected whether or not the jam reset flag is set to "1".

If it is decided at step S598*a* that the jam reset flag is reset to "0", the inputted numerical value is stored at step S599 and the flag indicating that the number of the total pages has been inputted is set to "1" at step S601.

If it is decided at step S598*a* that the jam reset flag is set to "1", the inputted numerical value is stored as a jam page number at step S598*b* and the flag indicating that the number of the total pages has been inputted is set to "1" at step S598*c*.

Thereafter, at step S605, the numerical value stored as the number of total pages, the jam page number or the number of the sheets to be copied is displayed on the numerical value displaying section 319.

<Other processings>

Referring FIGS. 10I-(1), (2), it is detected at step S607 whether or not the copy start key 308 starting a copying operation is at an ON edge.

If yes, it is detected whether or not it is necessary to employ the RDH 400 to count the number of original documents.

That is, it is detected at step S609 whether or not the RDH 400 is used. If yes, it is detected at step S611 whether or not the RDH 400 is used in the original document moving copy mode. If yes at steps S609 and S611, the RDH counting flag is set to "1" at step S613. According to the RDH counting flag, original documents are counted by the RDH 400.

If it is decided at step S609 that the RDH 400 is not used or if it is decided at step S611 that the RDH 400 is used in the ADF mode, the RDH counting flag is reset to "0" at step S615.

Thereafter, the copy starting flag is set to "1". As described later, the copy start flag does not control the start respective copying operations, but controls the start of a series of copying operations.

It is detected at step S619 whether or not the all reset key 321 is at an ON edge. If yes, the date LED 303 and the page LED 304 are turned off at step S621 so as to cancel the date mode and page mode. At step S621, other modes are initialized.

At step S631 through step S635, processings are executed in response to data input by keys other than the keys referred to in describing the flow at step S501 through step S617.

That is, if it is detected at step S631 that any one of the keys is at an ON edge, the program goes to step S633 at which it is detected whether or not the insertion mode is set. If no, a processing corresponding to data inputted by the key is executed at step S635.

After the above-described processings are executed, the program returns to the main routine.

The copy start routine (step S17) shown in FIG. 11-I of the first embodiment is modified as shown in FIG. 11-III in the third embodiment.

<Copy start routine (step S17)>

FIG. 11-III is the flowchart showing the copy start routine (step S19) contained in the main routine of the host CPU 22. As described previously, this routine is called providing that the copy start flag is set to "1" at step S17 of the main routine. In this routine, the starts of respective copying operations are not controlled, but the start of a series of copying operations are controlled.

It is detected at step S700 whether or not the jam reset flag is set to "1". In the embodiment, the condition of the jam reset flag is automatically detected by the sheet detecting sensors provided in the copying apparatus. Since this is known, the detailed description thereof is omitted. Whether a jam has occurred or not may be detected manually, namely, by operating the key of the operation panel.

If it is decided at step S700 that the jam reset flat is set to "1", the program goes to step S701. If it is detected that the jam reset flag is reset to "0", the program returns.

Next, it is detected at step S701 whether or not the RDH counting flag is set to "1".

If no, an RDH counting routine is executed at step S713. As described later, in the RDH counting routine, page number counting is carried out before a copying operation is performed to count the number of original documents.

That the RDH counting flag is set to "0" at step S701 means the case in which the RDH 400 is not used, the RDH 400 is used in the ADF mode or the counting of the number of original documents is terminated in the RDH counting routine. If the RDH counting flag is set to "0", the program goes to step S703 at which it is detected whether or not the page LED 304 is ON.

If it is detected at step S703 that the page imprinting mode is selected, the program goes to step S705 at which it is detected whether or not the flag indicating that the data on the number of total pages has been inputted is set to "0". If yes, a timer counting variable t1 is reset to "0" at step S707 and a timer for allowing a timer interruption during a copying operation is operated at step S709. Thus, "timer interruption processing during copying operation" which is described later is actuated, whereby a copy operation processing is started. Thereafter, the program goes to step S711 at which the flag for starting a copying operation is set to carry "0" at step S711. Then, at step S715, the liquid crystal display section 330 (refer to FIG. 14-I) is turned off.

If it is decided at step S705 that the flag indicating that the number of total pages has been inputted is set to "0", that is, if the RDH 400 is not used or the data on the number of total pages is not inputted although the page data imprinting mode is selected with the RDH 400 used in the ADF mode, a pattern (c) (refer to FIG. 14-II) is displayed on the liquid crystal display section 330 of the operation panel at step S717 and the copy start flag is set to "0" at step S719 so that a copying operation cannot be carried out.

If it is decided at step S706*a* that the flag indicating that a jam page number has been inputted is not set to "1", i.e., if it is decided at step S706*a* that the jam page number is not inputted although a jam reset has a been performed in the page data imprinting mode, the pattern (f) (refer to FIG. 14-III) is displayed on the liquid crystal display section 330 at step S706*b* and the copy start flag is reset to "0" at step S719. Thus, the start of a copying operation is cancelled.

If it is decided at step S703 that the page LED 304 is OFF or if it is decided at step S706*a* that the jam reset flag is reset to "0", processings are immediately executed at step S707 through step S715. In this case, a copying operation is effected without performing a page imprinting copying operation.

Thereafter, the program returns to the main routine.

The flows shown in FIGS. 12 and 13 of the first embodiment are the same as the third embodiment.

The main routine of the imprinting CPU 21 shown in FIG. 15-I of the first embodiment is modified as shown in FIG. 15-II in the third embodiment. This flow is described in detail hereinbelow.

<Main routine of imprinting CPU 21>

FIG. 15-II is the flowchart of the main routine of the imprinting control CPU 21.

FIG. 15-II is a flowchart showing the main routine of the processing to be executed by the data imprinting control CPU 21.

The CPU 21 initiates the execution of processings by the turn-ON of the power switch. First, at step S1001, the CPU 21 initializes the register flags.

At step S1003, it is detected whether or not data is transmittd thereto from the host CPU 22, namely, whether a data imprinting mode is selected. If no, at step S1003, CPU 21 is disabled for an image area interruption request which controls the start timing of a data imprinting at step S1025. Thereafter, the program returns to step S1003.

If yes at step S1003, the program goes to step S1005.

At step S1005, it is detected whether or not imprinting data and position imprinting data are changed.

If no at step S1005, the program jumps step S1007 through step S1015, thus going to step S1016*a*.

If yes at step S1005, a processing corresponding to the change is executed through step S1007 through step S1015.

That is, at step S1007, the CPU 21 inhibits the execution of a copying operation and at step S1009, stores the data on the number of total pages transmitted thereto from the host CPU 22. Next, at step S1011, a bit map of fixed imprinting data is developed at step S1011. At step S1013, the processing of a motor control routine for controlling the position of the data imprinting head 201 is executed. Thereafter, at step S1015, a copying operation is permitted.

At step S1016a, it is checked at step S1016a whether or not a jam reset signal (refer to FIGS. 10A, 10B, 10G through 10J) outputted from the host CPU 22 to the CPU 21 is detected. If yes, the imprinting jam flag is set to "1" at step S1016b and the data on a jam page number (refer to step S215 shown in FIG. 7-III) outputted from the host CPU 22 to the CPU 21 is stored at step S1016c. Thereafter, the program goes to step S1017.

It is detected at step S1017 whether or not a copying operation for an individual original document can be started.

If no, the program jumps step S1019 through S1023, thus returns to step S1003.

If yes, it is detected at step S1019 whether or not imprinting time data and page number data are changed. If yes, the bit map development of the changed data is executed at step S1021.

Thereafter, the image area interruption is allowed at step S1023, then the program returns to step S1003.

The bit map developing routine (step S1011), the motor control routine (step S1013), and the time.page data bit map developing routine (step S1021) are described in detail later.

The flows shown in FIGS. 16 and 17, namely, the flows of the bit map developing routine and the motor control routine in the subroutine of the imprinting CPU 21 are the same as those of the third embodiment.

The time.page bit map developing routine of the first embodiment shown in FIG. 18-I is modified as shown in FIGS. 18-IIA and 18-IIB in the third embodiment. These flows are described in detail hereinbelow.

<Time.page bit map developing routine>

FIGS. 18-IIA and 18-IIB are the flowcharts showing the time.page bit map developing routine (step S1021) contained in the main routine of the imprinting CPU 21.

<Time data>

It is detected at step S1301 whether or not the time imprinting data is changed.

If yes, S1301, the time data outputted from the timer IC is stored at step S1303 and the time data is developed into a character string at step S1305. Thereafter, the time data developed into the character string is converted into bit map data at step S1307 and a time data writing position is read from the internal variable TP at step S1309. Then, at step S1311, imprinting the data area is reloaded.

<Page data>

It is detected at step S1313 whether or not the page imprinting data is changed.

If yes, the program goes to step S1315 so that the substitution of the data into the variable PAGE NUMBER is performed at step S1315 through S1323.

That is, it is detected at step S1315 whether or not the original document moving copy mode is selected. If no, the page number data is stored at step S1317 (refer to step S215.) If yes, it is detected at step S1319 whether or not the copying operation of one group of original documents is started in the original document moving copy mode. If yes, the number of total pages is substituted into the variable PAGE NUMBER (refer to step 1009) at step S1321. If no, the program goes to step S1322a at which the imprinting jam flag is set to "1". If no, the value of the variable PAGE NUMBER is decremented at step S1323. If yes, i.e., if a first copying operation is performed after a jam correcting operation is completed, the program goes to step S1322b at which the numerical value of {(a jam page number)+1} is substituted into the variable PAGE NUMBER (refer to step S1016c, in FIG. 15-II).

At step S1325, the page number data stored as described above is developed into a character string and at step S1327, the page number data developed into the character string is converted into bit map data at step S1327. Thereafter, a page number writing position is read from the variable PP at step S1329. Then, imprinting data is reloaded at step S1331.

Thereafter, the program returns to the main routine.

The time data can be controlled so that time data is not changed during a series of copying operations.

The flows shown in FIGS. 19, 20-I, 22, and an illustration of the first embodiment shown in FIG. 21-I are the same as those of the third embodiment.

Fourth Embodiment

The fourth embodiment of the present invention is described with reference to FIGS. 2 through 6A, 10A, 10B, 13, 16, 17, 19, 21 common to the first embodiment and FIG. 8-II common to the second embodiment, and FIGS. 15-II common to the third embodiment, and FIGS. 1-II, 7-IV, 9-II, 10K, 10L, 10M, 11-IV, 14-IV, 18-III, 20-IIA, 20-IIB, 21-II showing the feature of the fourth embodiment.

In the fourth embodiment, an automatic document feeder (hereinafter referred to as ADF 400) is employed instead of the recirculation document handler (RDH) described previously. This can be understood by comparing FIG. 1-II of the fourth embodiment with FIG. 1-I of the first embodiment. More specifically, an original document is automatically fed to the original document setting table of glass 16. While the optical system 101 is scanning the original document, the original document is stationary on the original document setting table 16. Thereafter, the original document is automatically discharged therefrom to a discharge tray 406.

Referring to FIG. 1-II, the copying apparatus and the ADF 400 in accordance with the fourth embodiement is described hereinbelow.

The copying apparatus comprises an optical system 101 disposed in the upper portion thereof, an image forming arrangement 102 disposed in the middle portion thereof, a sheet re-supply unit 103 disposed in the lower portion thereof, and a sheet supply unit 104 disposed in the lowermost portion thereof. The automatic document feeder ADF 400 is removably mounted on the original document setting table or glass 16.

(1) Optical system 101

The optical system 101 is described hereinbelow. The optical system 101 including an exposing lamp 10, a reflecting mirror 11a, 11b, 11c, 11d, and a lens 12 exposes and scans an original document set on the original document setting table 16 (an original document is manually set on the original document setting table 16 or automatically fed thereto by the ADF 400). A light reflected from the image of the original document is guided to the electrophotoreceptor drum 2 of the image forming arrangement 102. Thus, an electrostatic latent image is formed on the surface of the electrophotoreceptor drum 2.

In performing a copying operation, the exposing lamp 10 and the reflecting mirror 11*a* reciprocate at a speed of V/N (V: peripheral speed of the electrophotoreceptor drum 2 and N: copying magnification) along the bottom surface of the original document setting table 16. The reflecting mirror 11*b* and 11*c* reciprocate at a speed of V/2N along the bottom surface of the original document setting table 16. Thus, the original document is exposed and scanned.

A copying magnification is set by adjusting the position of the lens 12. An image forming position is corrected by adjusting the angle of the reflecting mirror 11*d*.

(2) Image forming arrangement 102

Referring to FIG. 1-II, an image forming is accomplished in the image forming arrangement 102 by an electrophotographic process. That is, an electrostatic latent image formed on the electrophotoreceptor drum 2 is developed into a toner image which is transferred and then fixed to a copy sheet. Then, the copy sheet is discharged from the copying apparatus.

As shown in FIG. 1-II, the image forming arrangement 102 comprises electrophotoreceptor drum 2 rotatable counterclockwise in FIG. 1-II and the following members disposed in the periphery therof: an erasing lamp 7, a charger 6, a data imprinting unit 200, a developing device 3*a* (accommodating a black toner in the embodiments), a developing device 3*b* (accommodating a red toner in the embodiments), a transfer charger 5*a*, a separating charger 5*b*, a cleaning device 4, a belt 8 for transporting a copy sheet to which a toner image has been transferred, and a fixing device 9 for fixing the toner image transferred to the copy sheet and transported thereto by the belt 8. The data imprinting unit 200 will be described in detail later.

A pair of timing rollers 13 transports a copy sheet supplied thereto the portion between the space electrophotoreceptor drum 2 and the transfer charger 5*a* in synchronization with the rotation of the electrophotoreceptor drum 2 at a predetermined interval. Two pairs of roller 14 and 15 discharge from the image forming arrangement 102 the copy sheet to which the toner image has been fixed. According to a change-over lever 41 to be operated by a solenoid (not shown), the copy sheet is discharged from the image forming arrangement 102 either to a sheet discharge tray 36 or to a sheet re-supply tray 58 which will be described later.

(3) Sheet re-supply unit 103

The sheet re-supply unit 103 is used to carry out either of the following two copying methods: one is that an image is formed on the same side or face of a copy sheet by a two-time or more successive image forming processes (hereinafter referred to as composite copy) and the other is that an image is formed on both sides or faces of a copy sheet by a two-time consecutive image forming process (hereinafter referred to as both-face copy.)

In a composite copy, a copy sheet to which a toner image has been transferred and fixed is discharged into the sheet re-supply tray 58 through a sheet transporting path 530. In a both-face copy, a copy to which a toner image has been transferred and fixed sheet is discharged into the sheet re-supply tray 58 through the sheet tranporting paths 530 and 531. That is, in the composite copy, the copy sheet is accommodated in the sheet re-supply tray 58 with the face on which the image has been copied downward, and in the both-surface copy, the sheet is accommodated in the sheet re-supply tray 58 with the face on which the image has been copied upward.

According to this embodiment, in the composite copy mode, a re-supply tray is provided to distinguish between a first time copying operation and a second time copying operation or more. That is, the discharge of a copy sheet to the re-supply tray means that copying operations are to be performed.

Thereafter, the copy sheet is fed from the sheet resupply tray 58 and then transported to a pair of the timing roller 13 through the sheet supply path 540. Then, the copy sheet is supplied at a predetermined timing to the space between the electrophotoreceptor drum 2 and the transfer charger 5*a*. Thereafter, as described previously, a toner image is transferred to the copy sheet and the toner image transferred thereto is fixed. In performing the composite copy, the face on which the image has been formed faces the electrophotoreceptor drum 2. In carrying out the both-surface copy, the face on which the image has been formed faces the transfer charger 5*a*.

(4) Sheet supply uniy 104

The sheet supply unit 104 has an upper sheet supply tray 42 and a lower sheet supply tray 43 which accommodate copy sheets of different sizes. Each of copy sheets accommodated in the trays 42 or 43 is fed therefrom by the sheet supply roller 18 or the sheet supply roller 19 is transported to a pair of the timing rollers 13 of the image forming arrangement 102 by an automatic sheet supply mechanism. Thereafter, the copy sheet is transported to the gap between the electrophotoreceptor drum 2 and the transfer charger 5*a* in response to a predetermined timing signal outputted from the optical system 101 and in synchronization with the rotation of the electrophotoreceptor drum 2. Consequently, a toner image is transferred thereto.

<ADF 400>

An ADF 400 comprises an original document setting section 451, an original document transporting section 452, and an original document inverting section 453.

The original document setting section 451 comprises an original document setting tray 405, an original document supply roller 403, a motor 401 for driving the roller 403, and a sensor 411 for detecting an original document.

In the original document transporting section 452, the original document fed from the original document setting section 451 is set on the original document setting table or glass 16 and discharged therefrom. The original document transporting setting section 451 comprises an original document transporting belt 404, a motor 402 for driving the belt 404, an the original document discharge tray 406 disposed on the upper portion thereof. An original document discharged to the discharge tray 406 is detected by a sensor 413.

In the original document inverting section 453, the original document fed from the original document transporting section 452 is turned over and returned to the original document transporting section 452. The original document inverting section 453 includes a transporting belt 421 and a motor 420 for driving the belt 421. A change-over lever 407 actuated by a solenoid 408 serves as a means for discharging the original document from the original document transporting section 452 to the discharge tray 406 or feeding it therefrom to the inverting section 453. A sensor 412 detects the original document when it is fed to the inverting section 453.

The ADF 400 having the above-described construction starts supplying the original document in response to, for example, an ADF start signal outputted thereto from the control CPU of the copying apparatus. When the original document is set on the original document setting table or glass 16 at a predetermined position thereof, for example, a signal indicating that the original document is located at the predetermined position thereof is outputted therefrom to the CPU. Thus, a predetermined operation is performed.

Since the constructions shown in FIGS. 2 through 6, 6A of the first embodiment are common to those of fourth embodiment, the descriptions thereof are omitted.

The page counting routine (step S101) of the first embodiment shown in FIG. 7-I is modified in the fourth embodiment as shown in FIG. 7-IV. The flow shown in FIG. 7-IV is described hereinbelow in detail.

<Page counting routine (step S101)>

FIG. 7-IV is the flowchart showing the page counting routine contained in the analyzing routine (step S9).

In this routine, the imprinting page number is controlled when the page mode is selected.

First, it is detected at step S201 whether or not the page LED 304 is ON.

If no, i.e., if the page data mode is not selected, the program returns without executing this routine.

If yes, the program goes to step S203 at which it is detected whether or not the number of the total pages is changed, i.e., it is detected whether or not the number of the total pages is established by a new data input of the number of total pages.

If yes, the changed number of the total pages is substituted into the internal variable PAGE at step S227. Then, the page data is transferred at step S229.

If no, the program goes to step **S210*a* providing that is is decided at step S207 that a copy sheet passes through the timing roller 13 and it is decided at step S209 that a predetermined multi-copy operation is terminated. Then, the program goes to step S210*a***.

It is detected at step **S210*a* whether or not a composite copy mode display LED 321** is ON.

If no, the program goes to step S211 and steps subsequent thereto at which processings for changing the page data are executed.

If yes, the program goes to step **S210*b*** at which it is detected whether copy sheets are supplied from a normal supply entrance or a re-supply entrance.

If yes, the program goes to step S211 and steps subsequent thereto at which the processing for changing the page data is performed because a supplied copy sheet is subjected to a first copying operation.

If no at step **S210*b***, the program returns without changing the page data because the supplied sheet is subjected to a second copying operation.

At step S211 through step S215, the page data is changed.

It is detected at step S211 whether or not the total page mode is selected. If yes, that is, if a copying operation starts from the last page of original documents, the data of the internal variable PAGE is decremented at step S213. Then, the program goes to step S217 at which the page data is transferred.

If no at step S211, that is, if it is decided that the copying operation is started from the first page of the original documents, the data of the internal variable PAGE is incremented at step S215. Then, the program goes to step S217 at which the page data is tranferred.

If it is decided at step S207 that the copy sheet does not pass through the timing roller 13 or if it is decided at step S209 that the multi-copy operation of the predetermined number of copy sheets is not terminated, the program returns to the analyzing rountine.

The page mode check routine (step S103) of the fourth embodiment is identical to that of the second embodiment shown in FIG. 8-II. The page mode reset routine (step S105) of the first embodiment shown in FIG. 9-I is modified as described below, which is described in detail hereinbelow.

<Page mode reset (step S105)>

FIG. 9-II is the flowchart showing the page mode reset checking routine contained in the analyzing routine (step S9).

In this routine, the page mode is cancelled correspondingly to the termination of a series of copying operations under the page mode.

First, at step S401, it is detected at step S401 whether or not the page LED 304 is ON.

If no, i.e., if the page imprinting mode is not set, the program returns without executing this routine.

If yes, the program goes to step S411 providing that it is decided at step S407 that the flag indication the number of total pages has been inputted is set to "1", i.e., the total pages mode is selected and it is decided at step S409 that the internal variable PAGE is reset to "0".

If these conditions are all satisfied, i.e., if it is admitted that a series of copying operations are terminated under tht page mode, the page LED 304 is turned off at step S411 so as to reset the page mode and at step S413, a display pattern (e) (refer to FIG. 14-IV) is displayed on the liquid display section 330 on the operation panel in order to inform the operator that the page mode has been reset.

It is detected at steps S415 and S417 whether or not a mode for imprinting page data in a color different from that of the original document is set.

That is, if it is decided at step S415 that the composite copy mode is selected not under the normal composite copy mode (copying operation for forming images of two original documents on the same side or face of a copy sheet), that is, if the mode for imprinting data (mode for imprinting data and copying the image of the original document in different colors) is selected, the composite copy mode is cancelled and the composite copy mode display LED 321 is turned off at step S419.

If yes, that is, if the normal composite copy mode (not the mode for imprinting data and copying the image of an original document) which is set by the key-input of the operation panel is selected, the composite copy mode is not cancelled.

Thereafter, the program returns to the analyzing routine.

Figure 10K:
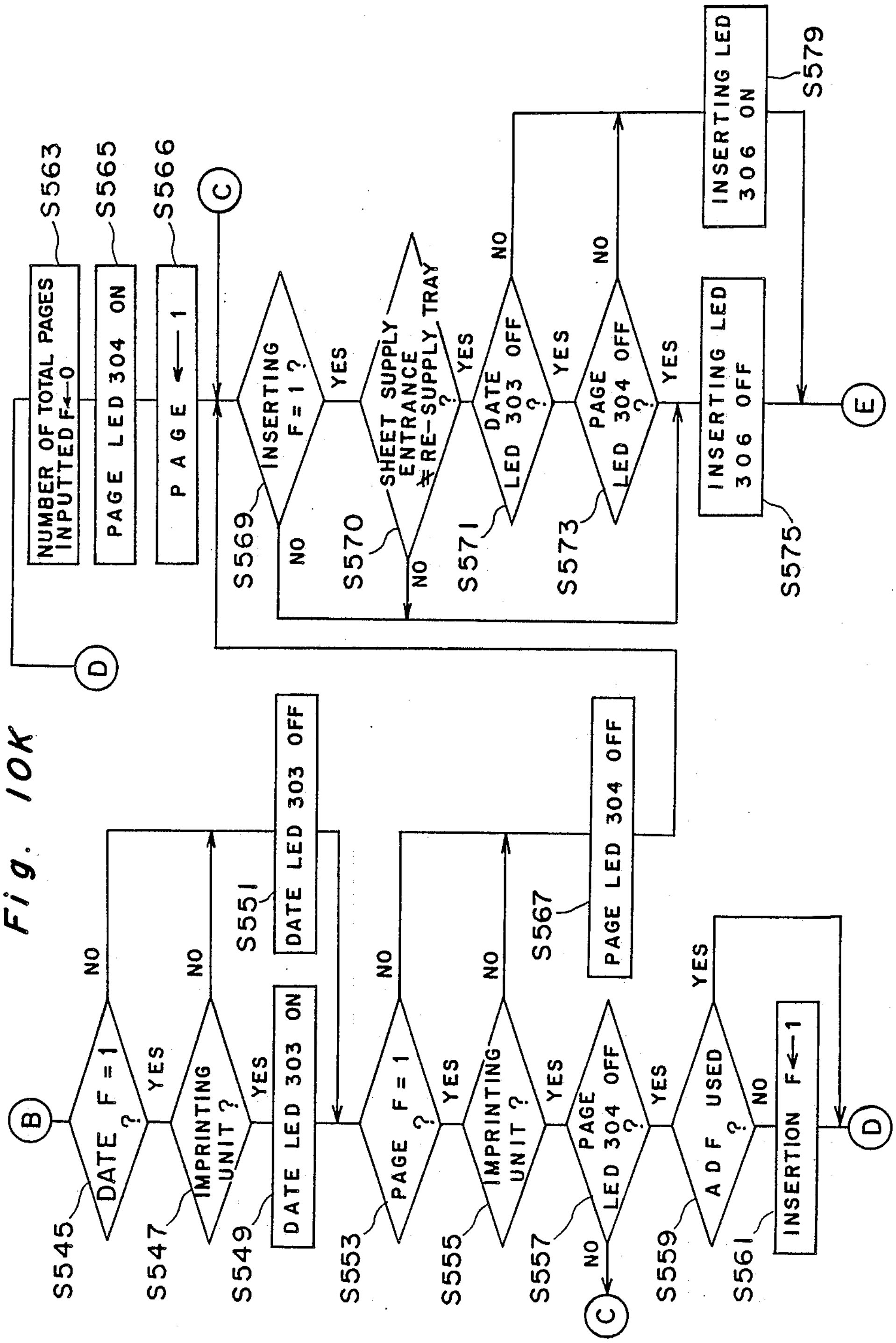
Figure 10L:
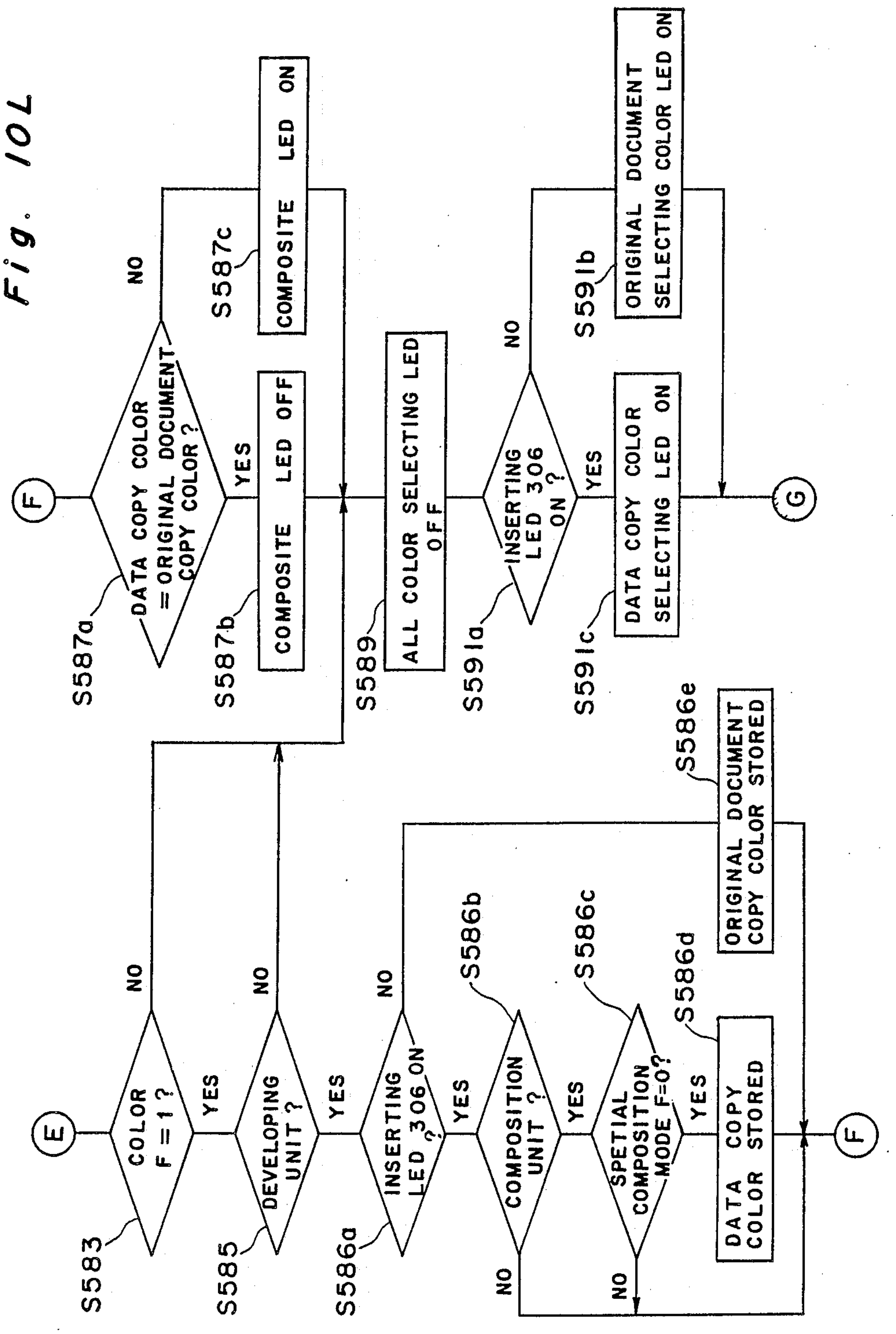

The flow of the key-inputted data processing routine (S15) of the first embodiment shown in FIGS. 10A and 10B is the same as that of the fourth embodiment, but the flows of the first embodiment shown in FIGS. 10C and 10D are modified as shown in FIGS. 10K, 10L, and 10M in the fourth embodiment. The descriptions of the flows shown in FIGS. 10A and 10B are omitted. Only the flows of the mode control and other processings as shown in FIGS. 10K, 10L and 10M are described in detail hereinbelow.

<Mode control>

Referring to FIG. 10C, it is detected at step S545 whether or not the data flag is set to "1".

If yes, the program goes to step S547 at which it is detected whether or not the data imprinting unit 200 is mounted on the copying apparatus. If yes, the data LED 303 is turned on at step S549. If the date data is selected as imprinting data, i.e., if the data imprinting mode is set, the LED 303 displays that this mode is selected.

If no at step S545 or it is detected at step S547 that the data imprinting unit 200 is not mounted on the copying apparatus, the data LED 303 is turned off at step S551.

At step S553, it is detected whether or not the page flag is set to "1".

If yes at step S553, the program goes to step S557 providing that is is decided at step S555 that the data imprinting unit 200 is mounted on the copying apparatus. At step S557, it is detected whether or not the page LED 304 is OFF. If the page number data is selected as imprinting data, i.e., if the page imprinting mode is set, the page LED 304 displays the selection.

If yes, the page imprinting mode is set. That is, it is detected at step S559 whether or not the ADF mode is selected. If yes, the insertion flag is set to carry "1" at step S561 because the data of the number of total pages is required to be imputted. Since the data on the number of total pages is not established, the flag indicating that the data on the number of total pages has been inputted is reset to "0" at step S563. Thereafter, the page LED 304 is turned on at step S565. At step S566, "1" is substituted into the internal variable PAGE (refer to the page counting routine in FIG. 7-IV) for controlling a page number. Thus, the page imprinting mode is set.

If it is decided at step S553 that the page flag is reset to "0" or if it is decided at step S555 that the data imprinting unit 200 is not mounted on the copying apparatus, the page LED 304 is turned off at step S567 because the page data is not inputted (cannot be inputted). Thus, the page imprinting mode is cancelled.

It is detected at step S569 whether or not the insertion flag is set "1".

It is detected at step S569 whether or not the insertion flag is set to "1".

If yes, it is detected at step S570 whether or not a copy sheet is supplied from the re-supply entrance, i.e., it is detected whether or not the copying operation is being performed in the composite copy mode.

If no, the program goes to step S575 at which the insertion mode is cancelled to inhibit the input of color data by the inserting key.

If yes, that is, if the composite copy mode is not changed, it is detected at steps S571 and S573 whether or not the data LED 303 and the page LED 304 are OFF. If it is decided that either the LED 303 or the LED 304 is ON, the inserting LED 306 is turned on at step S579. The inserting LED 306 displays whether or not the insertion mode is selected.

If no at step S569 or if it is decided at steps S571 and S573 that both the data LED 303 and the page LED 304 are OFF, the inserting LED 306 is turned off at step S575, whereby the insertion mode is cancelled.

Referring to FIG. 10L, it is detected at step S583 whether or not the color flag is set to "1".

If yes, it is decided at step S586*a* whether or not the inserting LED 306 is ON providing that it is decided at step S585 that the color developing unit corresponding to a selected color is mounted on the copying apparatus. If yes, i.e., if the color of the imprinting data is set, the data on the selected color is stored in the variable DATA COPY COLOR at step S586*d* providing that the sheet re-supply unit 103 is mounted on the copying apparatus (step S586*b*) and the composite copy mode flag for imprinting color data is reset to "0" at step S586*c*. The color of the original document is stored at step S586*d* as the color data.

If it is decided at step S586*a* that the inserting LED 306 is OFF, that is, if it is decided that the color of the original document is set, the selected color is stored in the variable ORIGINAL DOCUMENT COPY COLOR at step S586*e*.

It is detected at step S587*a* whether or not the data color copy set at step S586*d* and the color of the original document is identical to each other. If yes, the composite copy mode is cancelled and the composite copy LED is turned off at step S587*b*. If no, the composite copy mode is set and the composite copy LED is turned on at step S587*c*.

Thereafter, the color selecting LEDs 316 through 318 are turned off at step S589. Then, at step S591*a*, it is detected whether or not the inserting LED 306 is ON. If no, that is, if the insertion mode is not selected, either of the color selecting LEDs 316 through 318 corresponding to the color of the original document is turned on at step S591*b*.

If yes at step S591*a*, either of the color selecting LEDs 316 through 318 corresponding to color imprinting data is turned on at step S591*c*.

In this embodiment, the color of the original document is preferentially copied over the imprinting color data because the input of imprinting color is inhibited when the composite copy mode, namely, the mode for imprinting color data and copying the image of the original document in different colors is set. That is, the imprinting of color data of, for example, a date, a page and the like is carried out after the color of the original document is terminated.

To the contrary, the imprinting of color data may be effected prior to the copying of the color of the original document.

Referring to FIG. 10M, it is detected at step S593 whether or not the ten-key flag is set to "1".

If yes, the program goes step S595 at which it is detected whether or not the inserting LED 306 in ON.

If no, i.e., if the insertion mode is not set, an inputted numerical value is stored at step S603 as the number of sheets to be copied because the number of sheets to be copied has been inputted.

If yes, the inputted numerical value is stored as the number of total pages at step S599 providing that it is decided at step S597 that the mode for carrying out the imprinting of page number data is set. Then, at step S601, the flag indicating that the number of total pages has been inputted is set to "1".

Thereafter, the numerical value stored as the number of the total pages or the number of sheets to be copied is displayed on the numerical value displaying section 319.

<Other processings>

It is detected at step S607 whether or not the copy start key 308 for starting a copying operation is at an ON edge.

If yes, it is detected at subsequent steps whether or not the number of total pages has been inputted in the page imprinting mode employing the ADF 400.

In detail, it is detected at step S608 whether or not the ADF mode is selected. If yes, the page LED 304 is turned off at step S611 providing that the page mode is set (step S609) and the flag indicating that the number of total pages has been inputted is set to "0". Then, at step S612, the pattern (f) (refer to FIG. 14-IV) is displayed on the liquid crystal display section 330 so as to inform the operator that the number of total pages has not been inputted. Thereafter, the copy start flag is set to "1" at step S615.

The program goes to step S615 at which the copy start flag is set to "1" if it is decided at step S608 that the ADF mode is not selected; if the page mode is not selected (decided at step S609) in the ADF mode (decided at step S608); or if the number of total pages is not imputted (decided at step S610) in the ADF mode (decided at step S608) and in the page mode (decided at step S609).

The copy start flag does not control the start of each of copying operations, but controls the start of a series of copying operations.

At step S619 through step S623, processings are executed in response to data input by keys other than the keys referred to in the description of the flow at step S501 through step S617.

That is, if it is detected at step S619 that any key is at an ON edge, the program goes to step S621 at which it is detected whether or not the insertion mode is set. If no, a processing corresponding to data inputted by the key is executed at step S623.

After the above-described processings are executed, the program returns to the main routine.

The copy start routine (step S17) of the first embodiment shown in FIG. 11-I is modified as shown in FIG. 11-IV in the fourth embodiment. The flow shown in FIG. 11-IV is described in detail hereinbelow.

<Copy start routine (step S17)>

FIG. 11-IV is the flowchart showing the copy start routine (step S19) contained in the main routine of the host CPU 22. As described previously, this routine is called if the copy start flag is set to "1" at step S17 and controls the start of a series of copying operations, not the start of each of copying operations.

First, a timer counting variable t1 is set "0" at step S707 and a timer for allowing a timer interruption during a copying operation is operated at step S709. Thus, "timer interruption processing during copying operation" which will be described later is actuated, whereby a copy operation processing is started. Thereafter, the program goes to step S711 at which the flag for starting a copying operation is reset to "0" at step S711. Then, at step S715, the liquid crystal display section 330 (refer to FIG. 15-II) is turned off. Then, the program returns to the main routine.

Since the ADF system is adopted in the fourth embodiment, needless to say, no RDH counting routine shown in FIG. 12 is provided.

The timer interruption routine during copying operation of the fourth embodiment is the same as that of the first embodiment shown in FIG. 13. Therefore, the description thereof is omitted.

The flows of the bit map developing routine (step S1011) and the motor control routine (step S1013) of the fourth embodiment to be called in the main routine of the imprinting CPU 21 of the first embodiment are the same as those shown in FIGS. 16 and 17 while the time.page bit map developing routine shown in FIG. 18-I is modified as shown in FIG. 18-III in the fourth embodiment.

<Time.page bit map developing routine>

FIG. 18-III is the flowchart of the time.page bit map developing routine (step S1021) contained in the main routine of the imprinting CPU 21.

<Time data>

At step S1031, it is detected whether or not the time data inputted as imprinting data is changed.

If yes, S1301, the time data outputted from the timer IC is stored at step S1303 and the time data is developed into a character string at step S1305. Thereafter, the time data developed into the character string is converted into bit map data at step S1307 and a time data writing position is read from the internal variable TP at step S1309. Then, at step S1311, imprinting the data area is reloaded.

<Page data>

It is detected at step S1313 whether or not the page imprinting data is changed.

If yes, the program goes to step S1315 so that the substitution of the data into the variable PAGE NUMBER is performed at step S1315 through S1323.

First, at step S1317, data of the number of pages is stored (refer to step S215).

At step S1325, the page number data stored as described above is developed into a character string and at step S1327, the page number data developed into the character string is converted into bit map data at step S1327. Thereafter, a page number writing position is read from the variable PP at step S1329. Then, imprinting data is reloaded at step S1331.

Thereafter, the program returns to the main routine.

The time data can be controlled so that time data is not changed during a series of a copying operation.

The image area interruption routine of the first embodiment is common to that of the fourth embodiment. Thus, the flow of this routine shown in FIG. 19 is applicable to the fourth embodiment.

The timer interruption routine of the first embodiment shown in FIG. 20-I is modified as shown in FIGS. 20-IIA and 20-IIB in the fourth embodiment. The flow of this routine is described in detail hereinbelow.

<Timer interruption routine>

FIGS. 20-IIA and IIB are the flowcharts showing the timer interruption routine.

The timer interruption routine is a service routine to be executed by the CPU 21 is response to an interruption request signal produced by the timer IC at the time of the termination of the timer T1 which starts in the image area interruption routine or upon termination of the time T2, T3, T4 and T5 (refer to FIG. 21-II) which start in the timer interruption routine.

That is, upon receipt of the interruption request signal from the timer IC, the CPU 21 suspends the processing which it has been executing so that the processing is executed in the timer interruption routine.

First, the content of the registers are saved at step S1501 so that the suspended processing is resumed after the processing to be executed in the interruption routine are terminated.

Next, it is detected at step S1503 whether or not the composite copy mode is set. This is because the processing to be executed when the copying operation of an original document is different from the processing to be performed when data imprinting is carried out under the composite copy mode. That is, when the image of the original document is copied, the masking processing (refer to step S1539 through step S1547) of the data imprinting area is carried out, whereas in the data imprinting operation, a processing for imprinting data to a predetermined area is executed (refer to step S1509 through step S1525).

If it is decided at step S1503 that the composite copy mode is set, the program goes to step S1505 at which it is detected whether or not the data imprinting operation can be carried out.

<1> During copying operation of original document

If it is decided at step S1503 that data imprinting is not executed but the image of an original document is copied under the composite copy mode, the program goes to step S1539 and steps subsequent thereto so as to mask the imprinting area.

The masking processing is executed to prevent the imprinting data and the image of the original document from being overlapping each other in the imprinting area.

That is, if it is decided at step S1539 that none of the LED elements of the LED array are turned on, all the LED elements are turned on at step S1541 and the counting is started by the timer T5 at step S154. Thus, the imprinting area is deelectrified by the LED array 203 while the timer t5 counts the period of t5. During this period, the electrophotoreceptor drum 2 travels or rotates from one end of the data imprinting area to the other end thereof.

FIG. 21-II shows the relationship between the length of the imprinting area and the value t5 of the timer T5. As apparent from FIG. 21-II, the imprinting area during the masking period includes the rise and fall portions of the charger 202.

After the above-described processings are terminated, the registers become active at step S1549. Thus, the execution of this routine is terminated and the host CPU 21 resumes the execution of the suspended processing.

When this routine is executed upon termination of the counting of the timer T5, that is, when the imprinting area is deelectrified, the program goes to steps S1501, S1503, S1505, and S1539 to step S1545 at which all the LED elements are turned off. At step S1547, the timer counting is stopped and a timer interruption is masked.

<2> Data imprinting time

If it is decided at step S1503 that the composite copy mode is not set or if it is decided at step S1503 that the data imprinting is set and that data imprinting is executed at step S1505, it is detected at step S1507 whether or not the output of the imprinting data (output to the shift register) is terminated.

(a) Rise time

If yes at step S1507, the program goes to step S1511 providing that it is decided at step S1509 that the charger 202 of the imprinting unit 200 is OFF (interruption due to the termination of the counting of the timer T1). At step S1513, the charger 202 is turned on and all the LED elements of the imprinting LED array 203 are turned on. Then, the timer T2 is actuated, whereby the imprinting area is deelectrified by the LED array 203 until the timer T2 terminates the counting. The value t4 of the timer T4 is set to appropriately deelectrify unstable portion of the charger 202 when the charger 202 rises (refer to FIG. 21-II.)

Thereafter, at step S1517, the imprinting data of a first line (data for controlling turn-on and turn-off of the LED element corresponding to the length of one dot) is outputted to the shift register provided in the imprinting unit 200.

Thereafter, the register become active at step S1549. Thus, the execution of this routine is terminated and the CPU 21 resumes the execution of the suspended processing.

(b) Data imprinting

When this routine is executed upon termination of the counting of the timer T2, i.e., when the unstable portion of the charger 202 has been deeletrified at the time of the rise thereof, the program goes from step S1507, S1509 to step S1519 at which a latch pulse is outputted to the shift register, whereby the ON/OFF control signal is outputted from the shift register to the driver of the LED array 203.

At step S1521, the counting of the timer T3 is started. The period corresponding to the length of one dot of dot matrix font is set as the value of the time T3. That is, upon termination of the counting of the timer T3, the timer interruption occurs with respect to the next line.

It is detected at step S1523 whether or not the latch pulse of the last line of the font data is outputted to the shift register.

If no, the next one line of the font data is outputted to the shift register at step S1525. Then, the program goes to step S1549 at which the registers resume operations. Upon termination of the execution of this routine, the CPU 21 resumes the execution of the suspended processing.

Next, when this routine is executed upon termination of the timer T3, that is, while the data imprinting is continuing, processings are repeatedly executed at steps S1507, S1509, S1519, S1521, S1523, S1525, and S1549.

If it is decided at step S1523 that the data is outputted to the shift register, the program goes to step S1549 because no imprinting data is stored in the CPU 21. Thus, the execution of this routine is terminated with the registers resuming operations and the CPU 21 resumes the execution of the suspended processing.

(c) Fall time

If it is decided at step S1507 that output of data to the shift register is not terminated, the program goes to step S1529 providing that it is decided at step S1527 that the charger 202 of the imprinting unit 200 is ON (last interruption due to termination of the counting of the timer T3). At step S1531, all the LED elements of the data imprinting LED array 203 are turned on and the charger 202 is turned off. The timer T4 starts counting. Thus, the charger 202 is deelectrified by the LED array 203 until the timer T4 completes the counting. The value t4 of the timer T4 is set to appropriately deelectrify the unstable portion of the charger 202 at the time of the fall thereof (refer to FIG. 21-II.)

Thereafter, the execution of this routine is terminated with the registers active and the CPU 21 resumes the execution of the suspended proccesing.

Next, when this routine is executed upon termination of the counting of the timer T4, that is, when the unstable portion of the charger 202 is deelectrified at the time of the fall time thereof, the program goes from step S1507 and S1527 to step S1535 at which all the LED elements are turned off and the timer counting is stopped at step S1537 and the timer interruption is masked.

Thus, the timer interruption processing is executed.

The timer interruption occurs as described above.

As apparent from the above, the value of t5 of the timer T5 is expressed as follows using the t2, t3, and t4:

$$t5 = t2 + t3\ X(\text{number of all lines of imprinting area}) + t4$$

The timers T2, T3, T4, and T5 as well as the timer T1 are controlled by the timer IC.

The communication interruption routine of the first embodiment shown in FIG. 22 is the same as the fourth embodiment. Therefore, the description thereof is omitted.

What is claimed is:

1. A copying apparatus for imprinting page data together with an image of an original document on a copy sheet comprising:

original document feeding means for sequentially supplying original documents from an original document setting tray to an original document setting table and collecting the original documents from the original document setting table;

original document count instructing means for actuating said original document feeding means before the image of each of the original documents is copied on a copy sheet;

count means for counting the number of all original documents fed by said original document feeding means according to the instruction of said original document count instructing means;

image forming means for forming the image of each of the original documents supplied to the original document setting table on a copy sheet corresponding to each of the original documents;

page data controlling means for generating page data to be imprinted on each of copy sheets corresponding to each of the original documents according to the number of the original documents counted by said count means;

page data imprinting means for imprinting on the copy sheet data generated by said page data controlling means and the image of each of the original documents formed by said image forming means;

selecting means for selecting a page data imprinting mode using said page data imprinting means; and cancelling means for cancelling a selected page data imprinting mode when said instructing means does not generate the instruction.

2. A copying apparatus as claimed in claim 1, wherein said original document feeding means has a mechanism for feeding the original documents from the last page thereof.

3. A copying apparatus as claimed in claim 1, wherein said original document feeding means further includes means for returning the original document from the original document setting table to the original document setting tray.

4. A copying apparatus as claimed in claim 1, wherein the page data consists of the combination of the number of pages corresponding to respective original documents and the number of the total pages of the original documents.

5. A copying apparatus for imprinting page data together with an image of an original document on a copy sheet comprising:

original document feeding means for sequentially supplying original documents from an original document setting tray to an original document setting table and collecting the original document from the original document setting table;

original document count instructing means for actuating said original document feeding means before the image of each of the original documents is copied on a copy sheet;

count means for counting the number of all original documents fed by said original document feeding means according to the instruction of said original document count instructing means;

page data controlling means for generating page data to be imprinted on each copy sheet corresponding to each of the original documents according to the number of the original documents counted by said count means;

image forming means for forming the image of each of the original documents supplied to the original document setting table on a copy sheet corresponding to each of the original documents;

page data imprinting means for imprinting on the copy sheet page data generated by said page data controlling means and the image of each of the original documents formed by said image forming means;

selecting means for selecting a page data imprinting mode using said page data imprinting means; and instructing means for instructing an operator to allow said original document count instructing means and said count means to be operational when said page data imprinting mode is selected by said selecting means.

6. A copying apparatus for imprinting page data and the image of an original document on a copy sheet comprising:

image forming means for forming the image of each of the original documents on a copy sheet corresponding to each of the original documents;

page data imprinting means for imprinting on the copy sheet page data and the image of each of the original documents formed by said image forming means;

selecting means for selecting a mode for imprinting page data using said page data imprinting means; and cancelling means for automatically cancelling a page data imprinting mode when said page data imprinting mode is selected by said selecting means and a series of copying operations in connection with a page data imprinting operation are terminated.

7. A copying apparatus for imprinting page data and the image of an original document on a copy sheet comprising:

image forming means for forming the image of each of the original documents on the copy sheet;

data imprinting means for copying on the copy sheet the image of the original document formed by said image forming means and imprinting data consisting of the combination of variable data which changes each time a copying operation is carried out and fixed data which does not change each time a copying operation is performed;

a memory for storing imprinting data in the form of a bit pattern, said memory including a first area for storing the fixed data and second area for storing the variable data;

a first data controlling means for converting the fixed data into a bit pattern before a series of copying operations in connection with a data imprinting operation are performed and storing the bit pattern in the first area of said memory;

a second data controlling means for converting the variable data into a bit pattern before respective copying operations are effected and storing the bit pattern in the second area of said memory; and a data prcessing means for transferring to said data imprinting means the bit pattern stored by said first data controlling means and the bit pattern stored by said second controlling means.

8. A copying apparatus as claimed in claim 7, wherein the variable data is a page number corresponding to each of the original documents and the fixed data is the number of the total pages of the original documents.

9. A copying apparatus for imprinting page data and the image of an original document on a copy sheet comprising:

image forming means for forming the image of each of the original documents on the copy sheet;

page data imprinting means for imprinting on the copy sheet page data and the image of each of the original documents formed by said image forming means;

setting means for setting the number of the total pages of the original documents; and page data controlling means for decrementing "1" from the number of the total pages inputted as an initial value each time a series of copying operations are terminated, thereby using a decremented numerical value as page data when the number of the total pages of the original documents is set in said setting means and incrementing "1" from an initial value of "1" each time a series of copying operations are terminated, thus using an incremented numerical value as page data when the number of the total pages of the original documents is not set in said setting means.

10. A copying apparatus as claimed in claim 9, wherein said setting means includes numerical value inputting means for inputting the number of original documents and storing means for storing the number of original documents inputted by said numerical value inputting means.

11. A copying apparatus as claimed in claim 10, wherein said numerical value inputting means includes an inputting key for setting the number of sheets to be copied and an instructing key for instructing the transfer of a numerical value inputted by said inputting key to page data storing means.

12. A copying apparatus as claimed in claim 9 further comprising:

original document feeding means for sequentially supplying original documents from an original document setting tray to an original document setting table and collecting the original documents from the original document setting table;

original document count instructing means for actuating said original document feeding means before the image of each of the original documents is copied on a copy sheet;

count means for counting the number of all original documents fed by said original document feeding means according to the instruction of said original document count instructing means;

said numerical value inputting means including said count means.

13. A copying apparatus for imprinting page data and the image of an original document on a copy sheet comprising:

image forming means for forming the image of each of the original documents on the copy sheet;

page data imprinting means for imprinting on the copy sheet page data and the image of each of the original documents formed by said image forming means;

selecting means for selecting a mode for imprinting page data using said page data imprinting means;

setting means for setting the number of the total pages of the original documents;

page data controlling means for decrementing "1" from the number of the total pages of the original documents inputted as an initial value each time a series of copying operations are terminated, thereby using a decremented numerical value as page data when the number of the total pages thereof is set in said means for setting the number of the total pages thereof; and display means for displaying an order of supplying the original documents supplied to an original document setting table either ascendingly or descendingly when the page data imprinting mode is selected by said selecting means.

14. A copying apparatus as claimed in claim 13 further comprising:

cancelling means for automatically cancelling a page data imprinting mode when the page data imprinting mode is selected by the selecting means and a series of copying operations in connection with a page data imprinting operation are terminated.

15. A copying apparatus for imprinting page data and the image of an original document on a copy sheet comprising:

image forming means for forming the image of each of the original documents on the copy sheet;

page data imprinting means for imprinting on the copy sheet page data and the image of each of the original documents formed by said image forming means;

selecting means for selecting a mode for imprinting page data using said page data imprinting means;

setting means for setting the number of the total pages of the original documents;

page data controlling means for decrementing "1" from the number of the total pages of the original documents inputted as an initial value each time a series of copying operations are terminated, thereby using a decremented numerical value as page data when the number of the total pages thereof is set in said setting means; and display means for displaying an order of supplying the original documents supplied to an original document setting table either ascendingly or descendingly according to whether or not the number of original documents is set in said setting means.

16. A copying apparatus as claimed in claim 15, wherein the order of supplying original documents starts from the last page of the original documents when the number of original documents are stored in said setting means and starts from the first page of the original documents when the number of original documents are not stored in said setting means.

17. A copying apparatus as claimed in claim 15 further comprising:

cancelling means for automatically cancelling a page data imprinting mode when the page data imprinting mode is selected by said selecting means and a serier of copying operations in connection with a page data imprinting operation are terminated.

18. A copying apparatus for imprinting page data and the image of an original document on a copy sheet comprising:

image forming means for forming the image of each of the original documents on the copy sheet;

page data imprinting means for imprinting on the copy sheet page data and the image of each of the original documents formed by said image forming means;

selecting means for selecting a mode for imprinting page data using said page data imprinting means;

jam reset means for resetting a jammed condition which has occurred while said image forming means is operating;

numerical value inputting means for inputting a numerical value;

page data storing means for using a numerical value inputted by said numerical value inputting means as imprinting page data; and page data reset means for allowing a numberical value reset means to reset page data after the jammed condition is reset by said jam reset means under the page data imprinting mode selected by said selecting means.

19. A copying apparatus as claimed in claim 18, wherein said numerical value inputting means includes an inputting key for setting the number of sheets to be copied and an instructing key for instructing the transfer of a numercial value inputted by said inputting key to said page data storing means.

20. A copying apparatus as claimed in claim 18 further comprising:

original document feeding means for sequentially supplying original documents from an original document setting tray to an original document setting table and collecting the original documents from the original document setting table;

original document count instructing means for actuating said original document feeding means before the image of each of the original documents is copied on a copy sheet; and count means for counting the number of all original documents fed by said original document feeding means according to the instruction of said original document count instructing means;

said numerical value inputting means including said means for counting the number of all original documents.

21. A copying apparatus for imprinting page data and the image of an original document on a copy sheet comprising:

image forming means for forming the image of each of the original documents on the copy sheet;

page data controlling means for generating page data to be copied on each of copy sheets corresponding to each of the original documents;

page data imprinting means for imprinting on the copy sheet page data and the image of each of the original documents formed by said image forming means;

page data imprinting mode selecting means for selecting a mode for imprinting page data using said page data imprinting means; and composite copy selecting means for selecting a composite copy mode in which different images are compositely formed on the same face of a copy sheet by a plural copying operations;

said page data controlling means including means for selecting a mode for generating page data for each of the original documents when said page data imprinting mode is selected and the composite copy mode is not selected and a mode for generating page data for each of copy sheets subjected to the composite copy operation when both the page data imprinting mode and the composite copy mode are selected.

22. A copying apparatus as claimed in claim 21, wherein the page data generated by said page data controlling means is imprinted onto a copy sheet in the first time copying operation of a plural copying operations.

23. A copying apparatus as claimed in claim 21, further comprising:

cancelling means for automatically canelling a page data imprinting mode when the page data imprinting mode is selected by said selecting means and a series of copying opeations in connection with a page data imprinting operation are teminated.

24. A copying apparatus for imprinting page data and the image of an original document on a copy sheet comprising:

original document feeding means for sequentially feeding original documents set on an original document setting tray to an original document setting table from the last page of original documents and sequentially collecting the original documents from the original document setting table;

image forming means for forming on the copy sheet the image of each of the original documents supplied to the original document setting table;

page data imprinting means for imprinting on the copy sheet page data and the image of each of the original documents formed by said image forming means;

setting means for setting the number of the total pages of original documents;

deciding means for deciding whether or not original documents are set in said setting means;

selecting means for selecting a mode for imprinting page data using said page data imprinting means; and warning means for giving a warning when said page imprinting mode is selected by said selecting means and when said deciding means decides that original documents are not set in said setting means.

25. A copying apparatus as claimed in claim 24, wherein said warning means gives a warning to a display unit.

26. A copying apparatus for imprinting page data and the image of an original document on a copy sheet comprising:

original document feeding means for sequentially feeding original documents set on an original document setting tray to an original document setting table from the last page of original documents and sequentially collecting the original documents from the original document setting table;

image forming means for forming on the copy sheet the image of each of the original documents supplied to the original document setting table on a copy sheet;

page data imprinting means for imprinting on the copy sheet page data and the image of each of the original documents formed by said image forming means; and setting means for setting the number of the total pages of original documents;

deciding means for deciding whether or not original documents are set in said setting means;

selecting means for selecting a mode for imprinting page data using said page data imprinting means; and cancelling means for cancelling said page data imprinting mode when the page imprinting mode is selected by said selecting means and when said deciding means decides that original documents are not set in said setting means.

* * * * *